US009310470B2

(12) United States Patent
Moriuchi et al.

(10) Patent No.: US 9,310,470 B2
(45) Date of Patent: Apr. 12, 2016

(54) RADAR APPARATUS AND SIGNAL PROCESSING METHOD

(71) Applicant: FUJITSU TEN LIMITED, Kobe-shi, Hyogo (JP)

(72) Inventors: Takumi Moriuchi, Kobe (JP); Masayuki Kishida, Kobe (JP); Hisateru Asanuma, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 340 days.

(21) Appl. No.: 14/064,577

(22) Filed: Oct. 28, 2013

(65) Prior Publication Data

US 2014/0247180 A1 Sep. 4, 2014

(30) Foreign Application Priority Data

Dec. 6, 2012 (JP) ................................. 2012-267357

(51) Int. Cl.
 *G01S 13/93* (2006.01)
 *G01S 7/41* (2006.01)
 *G01S 7/35* (2006.01)
 *G01S 13/34* (2006.01)
 *G01S 13/42* (2006.01)
 (Continued)

(52) U.S. Cl.
 CPC . *G01S 7/41* (2013.01); *G01S 7/354* (2013.01); *G01S 13/345* (2013.01); *G01S 13/42* (2013.01); *G01S 13/726* (2013.01); *G01S 13/931* (2013.01); *G01S 7/03* (2013.01)

(58) Field of Classification Search
 CPC ........ G01S 7/41; G01S 13/726; G01S 13/345; G01S 13/42; G01S 13/931; G01S 7/354; G01S 7/03

USPC .................. 342/70–72, 128–133, 139–141, 342/145–146, 195; 701/301; 340/435–436, 340/903
See application file for complete search history.

(56) References Cited

U.S. PATENT DOCUMENTS 8,174,432 B2 * 5/2012 Kawasaki ............... G01S 7/032
 342/175
8,482,455 B2 * 7/2013 Kemkemian .......... G01S 13/003
 342/107

(Continued)

FOREIGN PATENT DOCUMENTS

JP A-2001-141812 5/2001
JP 2009-186233 A 8/2009

OTHER PUBLICATIONS

Jul. 15, 2015 Extended European Search Report issued in European Patent Application No. 13190803.0.

*Primary Examiner* — John B Sotomayor
(74) *Attorney, Agent, or Firm* — Oliff PLC

(57) ABSTRACT

There is provided a radar apparatus. A derivation unit derives this time-decided transverse distance of the target of this time processing, by filtering, with a predetermined filter constant, this time transverse distance of paired data of this time processing, and a predicted transverse distance. A change unit changes, when the transverse distance of an object moving target moving in a traveling direction of a vehicle mounted with the radar apparatus and the transverse distance of a specific target satisfy a predetermined relation, the filter constant for filtering this time transverse distance and the predicted transverse distance of the object moving target so that a reflection amount of this time transverse distance is reduced in comparison to before the change.

12 Claims, 29 Drawing Sheets

(51) Int. Cl.
    *G01S 13/72*     (2006.01)
    *G01S 7/03*     (2006.01)

(56) References Cited

U.S. PATENT DOCUMENTS

| | | | |
|---|---|---|---|
| 2009/0207071 A1* | 8/2009 | Kinoshita | G01S 13/4454 342/156 |
| 2011/0156947 A1 | 6/2011 | Kanamoto | |
| 2011/0175767 A1 | 7/2011 | Tsunekawa | |
| 2012/0223855 A1 | 9/2012 | Kurono et al. | |
| 2013/0229300 A1* | 9/2013 | Izumi | G01S 7/4026 342/156 |
| 2014/0028493 A1* | 1/2014 | Isumi | G01S 13/4454 342/149 |
| 2014/0247180 A1* | 9/2014 | Moriuchi | G01S 7/41 342/70 |

\* cited by examiner

RADAR APPARATUS AND SIGNAL PROCESSING METHOD

CROSS-REFERENCE TO RELATED APPLICATIONS

This application is based on and claims priority from Japanese Patent Application No. 2012-267357 filed on Dec. 6, 2012.

TECHNICAL FIELD

The invention relates to signal processing for derivation of a target.

BACKGROUND

Traditionally, a radar apparatus mounted on a vehicle emits a transmission wave from a transmission antenna and receives a reflected wave from a target, which reflects the emitted transmission wave, at a reception antenna to thus derive position and relative speed information (hereinafter, referred to as 'target information') of the target with respect to the vehicle (radar vehicle). Specifically, in this time target deriving processing (hereinafter, referred to as 'this time processing'), the reflected wave received at the reception antenna is received as a reception signal and a peak signal generated from the reception signal is subject to pairing processing. Then, when there is a target of previous time target deriving processing (hereinafter, referred to as 'previous time processing') having temporal continuity with the paired data, the target information of the paired data of this time processing and predicted information, which is obtained by predicting the target information of this time paired data from the target of the previous time processing, are filtered by a predetermined filter constant, so that the target information of the target of this time processing is derived (for example, (the target information of the paired data×a filter constant 0.25)+(the predicted information×a filter constant 0.75)=the target information of the target of this time processing). Here, the filter constant of the predicted information is larger than the filter constant of the target information of the paired data of this time processing. The reason is as follows: since the target information of the paired data of this time processing is derived only by this time processing but the target information of the target of the previous time processing corresponding to the predicted information is derived by filtering the target information of the paired data of the previous time processing and the target information derived in processing (processing before last) before the previous time processing, it is thought that the predicted information has higher reliability than the target information of only this time processing.

The radar apparatus outputs the target information of the target of this time processing, which is derived as a result of the filtering processing, to a vehicle control device mounted on the vehicle. When the target information input from the radar apparatus indicates a moving target that is moving in the same direction as a traveling direction of the vehicle, the vehicle control device to which the target information is input performs control such as ACC (Adaptive Cruise Control) so that the vehicle follows up the moving target (for example, a preceding vehicle that is traveling at the front of the vehicle in an own traffic lane), which is to be controlled. In the meantime, Patent Document 1 discloses a technology relating to the invention.

Patent Document 1: Japanese Patent Application Publication No. 2001-141812A

However, in a case where another target (for example, a stationary target such as a wall in a tunnel and a guard rail or a moving target (hereinafter, referred to as an 'adjacent moving target') moving in the same direction as the traveling direction of the vehicle in an adjacent traffic lane adjacent to the own traffic lane) (hereinafter, the 'stationary target' and the 'adjacent moving target' are collectively referred to as a 'specific target') exists at the periphery of the moving target, when an angle of the moving target approaches an angle of the specific target, a signal level value of an angle spectrum corresponding to the angle of the moving target may become larger than a signal level value of an angle spectrum of the specific target and at least a part of the angle spectrum of the moving target may be buried in the angle spectrum of the specific target.

When a peak signal of the specific target having a relatively large signal level value exists in the vicinity of a frequency of a peak signal of the moving target, a mis-pairing of pairing the peak signal of the moving target and the peak signal of the specific target may be caused although peak signals of the moving target should be originally paired each other. Also, when deriving the angle of the moving target, an angle (for example, an angle that is substantially the same as the specific target) different from an actual angle of the moving target may be derived due to the mis-pairing.

As a result, regarding a distance (hereinafter, referred to as a 'transverse distance') from the vehicle to the target in a vehicle width direction of the vehicle, which is derived by the angle of the target and a distance (hereinafter, referred to as a 'longitudinal direction') from the vehicle, at which the reflected wave from the target is received at the reception antenna of the radar apparatus, to the target, a transverse distance (for example, a transverse distance that is substantially the same as the specific target) different from an actual transverse distance of the moving target may be derived. In the meantime, the longitudinal distance and the transverse distance are data that is included in the position information, which is the target information.

As described above, when the transverse distance (hereinafter, referred to as 'this time transverse distance') of the paired data of this time processing corresponding to the target (for example, the moving target) of this time processing is different from the actual transverse distance of the target, this time transverse distance different from the actual transverse distance of the target of this time processing and information (hereinafter, referred to as 'predicted transverse distance'), which is obtained by predicting this time transverse distance from a transverse distance (hereinafter, referred to as 'previous time-decided transverse distance') of the target (for example, the moving target) of the previous time processing, are filtered with predetermined filter constants, so that a transverse distance (hereinafter, referred to as 'this time-decided transverse distance') of the target (hereinafter, referred to as 'this time-decided target') of this time processing is derived (for example, (this time transverse distance of the paired data corresponding to the specific target×a filter constant 0.25)+(the predicted transverse distance of the paired data corresponding to the moving target×a filter constant 0.75)=this time-decided transverse distance of the moving target).

As a result, this time-decided transverse distance of the target (for example, the moving target) may be derived as a transverse distance different from a transverse distance of a position at which the target actually exists. As a result, the vehicle control device that performs the vehicle control on the basis of the target information of the target from the radar apparatus may not perform correct control upon performing the control such as ACC.

SUMMARY

It is therefore an object of the invention to securely derive a target irrespective of surrounding situations.

(1) According to a first aspect of the embodiments of the present invention, there is provided a radar apparatus configured to emit a transmission wave relating to a transmission signal to be frequency-modulated, to receive a reflected wave coming from a target at which the transmission wave is reflected as a reception signal, and to derive target information including at least a transverse distance of the target from peak signals based on the reception signal, the radar apparatus comprising: a derivation unit configured to derive this time-decided transverse distance which is a transverse distance of the target of this time processing, by filtering, with a predetermined filter constant, this time transverse distance which is a transverse distance of paired data of this time processing, obtained by pairing the peak signals, and a predicted transverse distance which is obtained by predicting a transverse distance of the target of this time processing from a previous time-decided transverse distance which is a transverse distance of the target of previous time processing; and a change unit configured to change, when the transverse distance of an object moving target moving in a traveling direction of a vehicle mounted with the radar apparatus and the transverse distance of a specific target which is a target except for the object moving target satisfy a predetermined relation, the filter constant for filtering this time transverse distance and the predicted transverse distance of the object moving target so that a reflection amount of this time transverse distance is reduced in comparison to before the change.

(2) The radar apparatus according to (1), wherein when the specific target is a stationary target and a difference value between the transverse distance of the object moving target and the transverse distance of the stationary target is below a first value, the change unit changes the filter constant.

(3) The radar apparatus according to (2), wherein when the difference value between the transverse distance of the object moving target and the transverse distance of the stationary target is below a second value which is smaller than the first value, the change unit changes the filter constant of this time transverse distance to zero.

(4) The radar apparatus according to (2) or (3), wherein when the difference value between the transverse distance of the object moving target and the transverse distance of the stationary target in this time processing is smaller than the difference value between the transverse distance of the object moving target and the previous time transverse distance of the stationary target in the previous time processing, the change unit changes the filter constant.

(5) The radar apparatus according to any one of (1) to (4), wherein when the specific target is an adjacent moving target which is a moving target more distant from the vehicle than the object moving target with respect to a transverse distance relative to the vehicle and the object moving target exists in the vicinity of the adjacent moving target, the change unit changes the filter constant.

(6) The radar apparatus according to (5), wherein when the transverse distance of the adjacent moving target is within a first distance range and the transverse distance of the object moving target is within a second distance range that is not included in the first distance range, the change unit changes the filter constant.

(7) According to a second aspect of the embodiments of the present invention, there is provided a signal processing method of emitting a transmission wave relating to a transmission signal to be frequency-modulated, receiving a reflected wave coming from a target at which the transmission wave is reflected as a reception signal, and deriving target information including at least a transverse distance of the target from peak signals based on the reception signal, the signal processing method comprising: deriving this time-decided transverse distance which is a transverse distance of the target of this time processing, by filtering, with a predetermined filter constant, this time transverse distance which is a transverse distance of paired data of this time processing, obtained by pairing the peak signals, and a predicted transverse distance which is obtained by predicting a transverse distance of the target of this time processing from a previous time-decided transverse distance which is a transverse distance of the target of previous time processing; and when the transverse distance of an object moving target moving in a traveling direction of a vehicle mounted with the radar apparatus and the transverse distance of a specific target which is a target except for the object moving target satisfy a predetermined relation, changing the filter constant for filtering this time transverse distance and the predicted transverse distance of the object moving target so that a reflection amount of this time transverse distance is reduced in comparison to before the change.

(8) According to a third aspect of the embodiments of the present invention, there is provided a radar apparatus configured to emit a transmission wave relating to a transmission signal to be frequency-modulated, to receive a reflected wave coming from a target at which the transmission wave is reflected as a reception signal, and to derive target information including at least a transverse distance of the target from peak signals based on the reception signal, the radar apparatus comprising: a derivation unit configured to derive this time-decided transverse distance which is a transverse distance of the target of this time processing, by filtering, with a predetermined filter constant, this time transverse distance which is a transverse distance of paired data of this time processing, obtained by pairing the peak signals, and a predicted transverse distance which is obtained by predicting a transverse distance of the target of this time processing from a previous time-decided transverse distance which is a transverse distance of the target of previous time processing; and a change unit configured to change, when the transverse distance of this time processing of an object moving target moving in a traveling direction of a vehicle mounted with the radar apparatus is shorter than the transverse distance of the previous time processing, the filter constant for filtering this time transverse distance and the predicted transverse distance of the object moving target so that a reflection amount of this time transverse distance is increased in comparison to before the change.

(9) The radar apparatus according to (8), wherein when an in-traffic lane existence value indicating a degree that the object moving target exists in a traveling traffic lane of the vehicle is above a predetermined value, the change unit changes the filter constant.

(10) The radar apparatus according to (8) or (9), wherein when the in-traffic lane existence value is below the predetermined value and a difference value between this time transverse distance and the predicted transverse distance of the object moving target is smaller than a predetermined value, the change unit changes the filter constant.

(11) The radar apparatus according to any one of (8) to (10), wherein when a speed of the object moving target is below a predetermined speed, the change unit changes the filter constant.

(12) According to a fourth aspect of the embodiments of the present invention, there is provided a signal processing method of emitting a transmission wave relating to a transmission signal to be frequency-modulated, receiving a reflected wave coming from a target at which the transmission wave is reflected as a reception signal, and deriving target information including at least a transverse distance of the target from peak signals based on the reception signal, the signal processing method comprising: deriving this time-decided transverse distance which is a transverse distance of the target of this time processing, by filtering, with a predetermined filter constant, this time transverse distance which is a transverse distance of paired data of this time processing, obtained by pairing the peak signals, and a predicted transverse distance which is obtained by predicting a transverse distance of the target of this time processing from a previous time-decided transverse distance which is a transverse distance of the target of previous time processing, and when the transverse distance of this time processing of an object moving target moving in a traveling direction of a vehicle mounted with the radar apparatus is shorter than the transverse distance of the previous time processing, changing the filter constant for filtering this time transverse distance and the predicted transverse distance of the object moving target so that a reflection amount of this time transverse distance is increased in comparison to before the change.

According to the aspect defined in (1) to (7), the filter constant filtering this time transverse distance and the predicted transverse distance of the object moving target is changed so that the reflection amount of this time transverse distance is reduced in comparison to before the change. Thereby, it is possible to securely derive the object moving target and to perform the appropriate vehicle control for a target that is to be controlled.

Also, in particular, according to the aspect defined in (2), when the difference value between the transverse distance of the object moving target and the transverse distance of the stationary target is below a first value, the filter constant is changed. Thereby, it is possible to securely derive the object moving target even when the stationary target exists in the vicinity of the object moving target.

Also, in particular, according to the aspect defined in (3), when the difference value between the transverse distance of the object moving target and the transverse distance of the stationary target is below a second value smaller than the first value, the filter constant of this time transverse distance is changed to zero. Thereby, it is possible to securely derive the object moving target even when the stationary target and the object moving target come closer to each other.

Also, in particular, according to the aspect defined in (4), when the difference value between the transverse distance of the object moving target and the transverse distance of the stationary target in this time processing is smaller than the difference value between the transverse distance of the object moving target and the previous time transverse distance of the stationary target in the previous time processing, the filter constant is changed. Thereby, it is possible to securely derive the object moving target by changing the filter constant only when it is necessary to change the filter constant.

Also, in particular, according to the aspect defined in (5), when the object moving target exists in the vicinity of the adjacent moving target, the filter constant is changed. Thereby, it is possible to securely derive the object moving target without being influenced by the adjacent moving target.

Also, in particular, according to the aspect defined in (6), when the previous time transverse distance of another moving target is within a first distance range and the previous time transverse distance of the specific moving target is within a second distance range that is not included in the first distance range, the filter constant is changed. Thereby, it is possible to securely derive the object moving target existing in a predetermined range without being influenced by the adjacent moving target.

Also, according to the aspect defined in (8) to (12), when the transverse distance of this time processing of an object moving target is shorter than the transverse distance of the previous time processing, the filter constant filtering this time transverse distance and the predicted transverse distance of the object moving target is changed so that a reflection amount of this time transverse distance is increased in comparison to before the change. Thereby, it is possible to securely derive the object moving target and to perform the appropriate vehicle control for a target that is to be controlled.

Also, in particular, according to the aspect defined in (9), when an in-traffic lane existence value is above a predetermined value, the filter constant is changed. Thereby, when the object moving target exists in the traveling traffic lane of the vehicle, it is possible to securely derive the object moving target.

Also, in particular, according to the aspect defined in (10), when a difference value between this time transverse distance and the predicted transverse distance of the object moving target is smaller than a predetermined value, which is a case where the in-traffic lane existence value is below the predetermined value, the filter constant is changed. Thereby, even when the object moving target exists in a traffic lane different from the traveling traffic lane of the vehicle, it is possible to securely derive the object moving target.

Also, in particular, according to the aspect defined in (11), when a speed of the object moving target is below a predetermined speed, the filter constant is changed. Thereby, even when the object moving target slows down and then moves to another traffic lane from the traveling traffic lane of the vehicle, it is possible to securely derive the object moving target.

DETAILED DESCRIPTION OF THE EMBODIMENTS

Hereinafter, illustrative embodiments of the invention will be described with reference to the drawings. The below illustrative embodiments are just exemplary and the technical scope of the invention is not limited thereto.

<First Illustrative Embodiment>
<1. Configuration and the Like>
<1-1. Vehicle Overall View>

Figure 1:
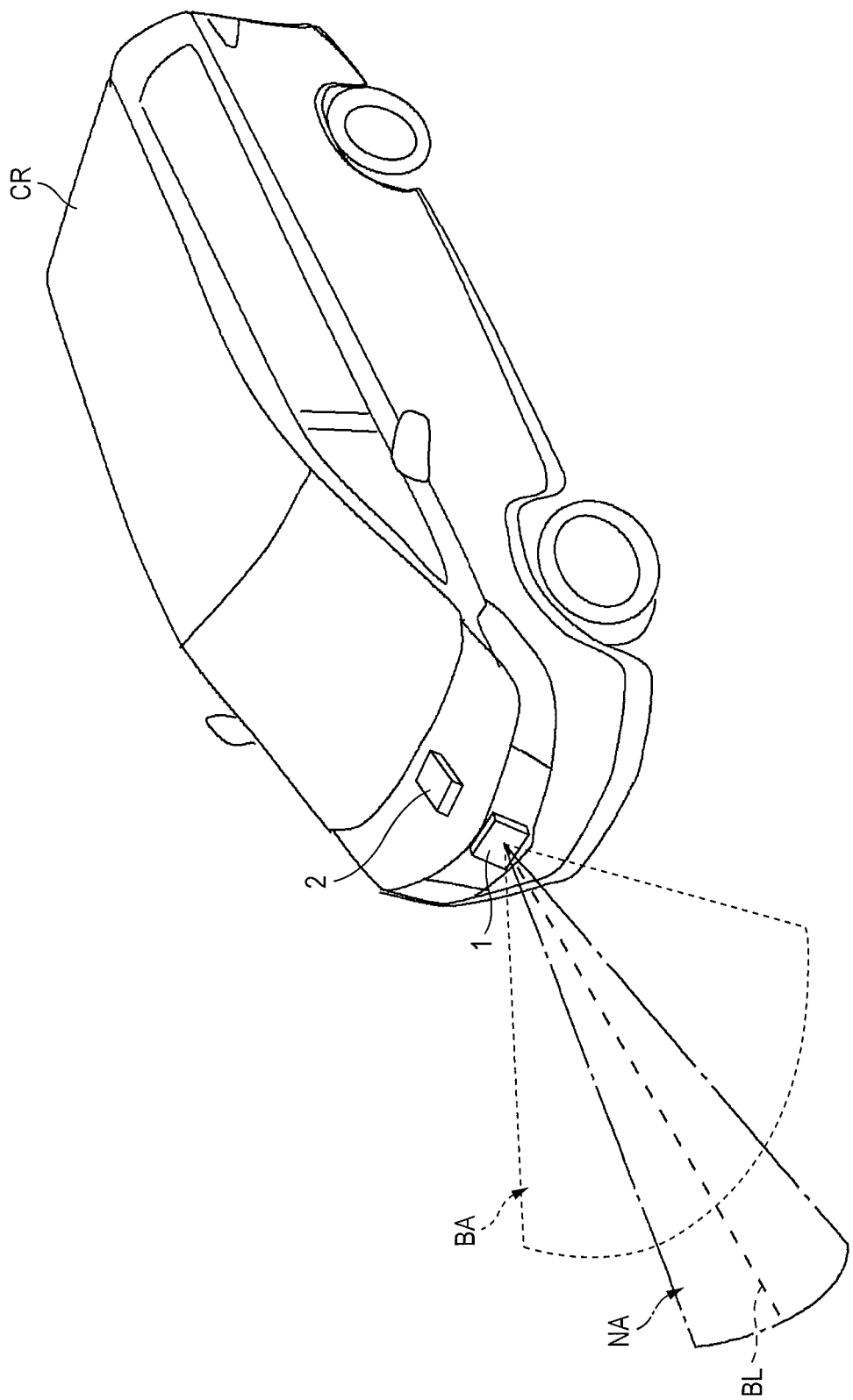
FIG. 1 is an overall view of a vehicle.

FIG. 1 is an overall view of a vehicle CR. The vehicle CR mainly has a radar apparatus 1 and a vehicle control device 2, which are included in a vehicle control system 10 of this illustrative embodiment. The vehicle CR has the radar apparatus 1 in the vicinity of a front bumper of the vehicle. The radar apparatus 1 scans a predetermined scanning scope by one scanning to thus derive a distance between the vehicle CR and a target in a vehicle traveling direction, i.e., a longitudinal distance that is a distance until a reflected wave from the target arrives at a reception antenna of the radar apparatus 1. Also, the radar apparatus 1 derives a transverse distance, which is a distance between the vehicle CR and the target in a vehicle transverse direction (a vehicle width direction). Specifically, the transverse distance is a distance of the target with respect to the vehicle CR in a direction substantially orthogonal to a reference axis BL virtually extending in the traveling direction of the vehicle CR. For example, the transverse distance is a distance in which a left direction of the vehicle CR is −(minus) and a right direction thereof is +(plus) on the basis of the reference axis BL of ±0 m. In the meantime, the transverse distance is derived by performing a trigonometric function calculation, based on information on an angle and a longitudinal distance of the target with respect to the vehicle CR. Like this, the radar apparatus 1 derives the position information of the target with respect to the vehicle CR. Also, the radar apparatus 1 derives a relative speed that is a speed of the target relative to a speed of the vehicle CR.

Figure 2:
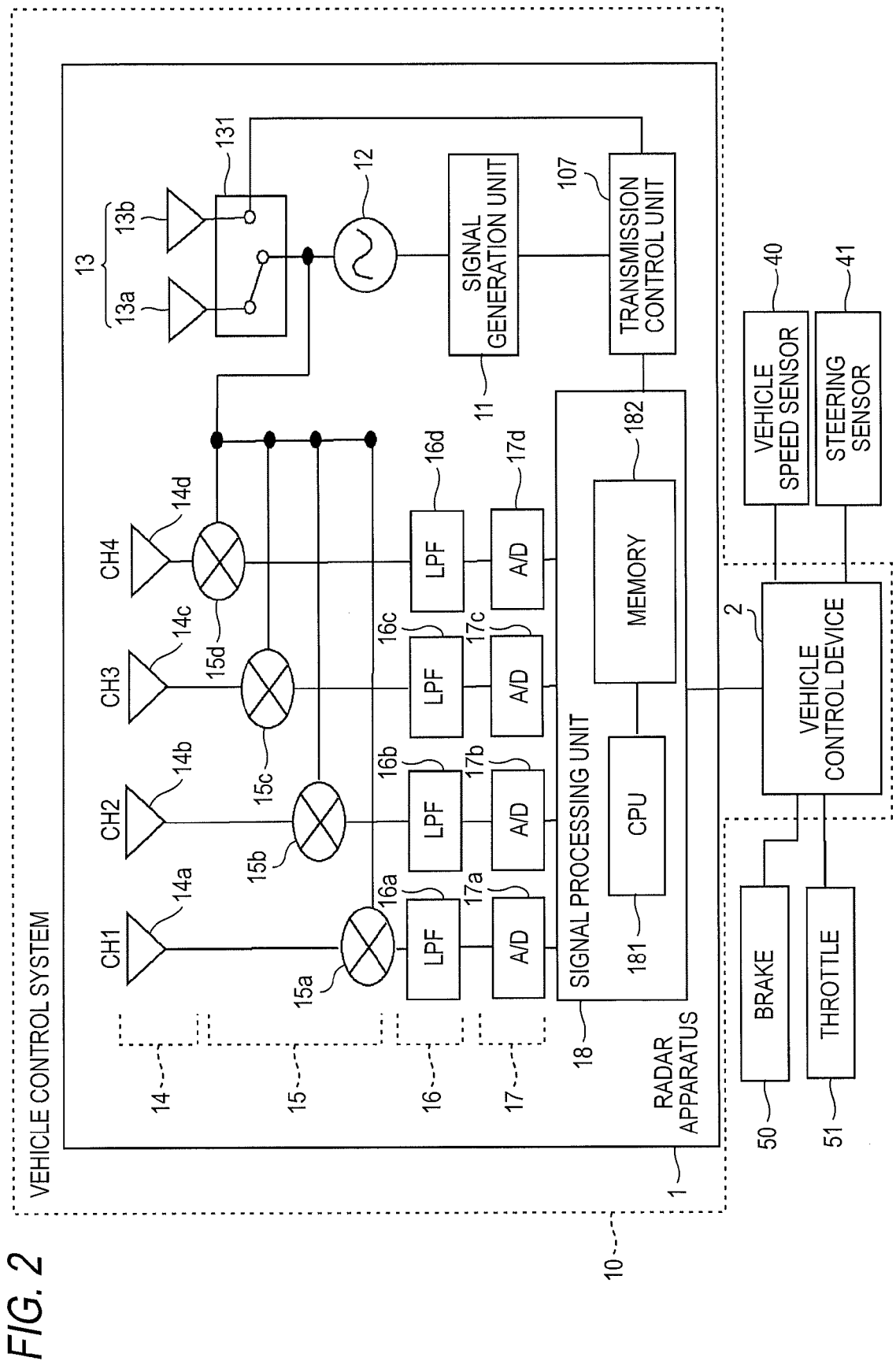
FIG. 2 is a block diagram of a vehicle control system.

In the meantime, FIG. 1 shows beam patterns of transmission waves that are transmitted from two transmission antennae (a transmission antenna 13a and a transmission antenna 13b shown in FIG. 2) of the radar apparatus 1. When the reference axis BL is ±0°, a beam pattern NA of the transmission wave output from the transmission antenna 13a has a narrower angle range (for example, ±6°) than a beam pattern NB of the transmission wave that is output from the transmission antenna 13b and is output in the shape of a relatively sharp beam pattern having a long longitudinal distance. The reason why the longitudinal distance is long is that an output level of outputting the transmission wave is relatively high.

In contrast, the beam pattern NB of the transmission wave that is output from the transmission antenna 13b has a wider angle range (for example, +10°) than the beam pattern NA of the transmission wave that is output from the transmission antenna 13a, and is output in the shape of a relatively broad beam pattern having a short longitudinal distance. The reason why the longitudinal distance is short is that an output level of outputting the transmission wave is relatively low. In each of a transmission period in which the transmission wave is output from the transmission antenna 13a and a transmission period in which the transmission wave is output from the transmission antenna 13b, the transmission waves of different beam patterns are output, so that it is possible to prevent an error of an angle derivation, which is caused due to a phase fold-back of the reflected wave from the target. Processing of deriving a target angle will be described later.

Also, the radar apparatus 1 of FIG. 1 is mounted in the vicinity of the front bumper of the vehicle. However, the radar apparatus may be mounted to another part, for example in the vicinity of a rear bumper of the vehicle CR and in the vicinity of a side mirror of the vehicle CR without being limited to the vicinity of the front bumper, inasmuch as it is possible to derive a target in accordance with a control object of the vehicle CR of the vehicle control device 2 at the corresponding mount position.

Also, the vehicle CR has the vehicle control device 2 in the vehicle CR. The vehicle control device 2 is an ECU (Electronic Control Unit) that controls respective devices of the vehicle CR.

<1-2. System Block Diagram>

FIG. 2 is a block diagram of the vehicle control system 10. The vehicle control system 10 is configured so that the radar apparatus 1 and the vehicle control device 2 are electrically connected and the target information on the position information and the relative speed, which are usually derived from the radar apparatus 1, is output to the vehicle control device 2. That is, the radar apparatus 1 outputs the target information, which is the information on the longitudinal distance, transverse distance and relative speed of the target with respect to the vehicle CR, to the vehicle control device 2. Then, the vehicle control device 2 controls operations of the various devices of the vehicle CR, based on the target information. Also, the vehicle control device 2 of the vehicle control system 10 is electrically connected to a variety of sensors provided to the vehicle CR, such as a vehicle speed sensor 40 and a steering sensor 41. Also, the vehicle control device 2 is electrically connected to a variety of devices provided to the vehicle CR, such as a brake 50 and a throttle 51.

The radar apparatus 1 mainly has a signal generation unit 11, an oscillator 12, a transmission antenna 13, a reception antenna 14, a mixer 15, an LPF (Low Pass Filter) 16, an AD (Analog to Digital) converter 17 and a signal processing unit 18.

The signal generation unit 11 generates a modulation signal of which a voltage changes in a triangular wave shape, for example, based on a control signal of a transmission control unit 107 that will be described later.

The oscillator 12 is a voltage control oscillator that controls an oscillation frequency with a voltage, frequency-modulates a predetermined frequency signal (for example, 76.5 GHz), based on the modulation signal generated from the signal generation unit 11, and outputs the same to the transmission antenna 13, as a transmission signal of a frequency band of which a central frequency is 76.5 GHz.

The transmission antenna 13 outputs a transmission wave relating to the transmission signal to the outside of the vehicle. In this illustrative embodiment, the radar apparatus 1 has two transmission antennae of the transmission antenna 13a and the transmission antenna 13b. The transmission antennae 13a, 13b are switched with a predetermined cycle by a switching operation of a switching unit 131, and the transmission wave is continuously output to the outside of the vehicle from the transmission antenna 13 connected to the oscillator 12. The transmission antenna 13a and the transmission antenna 13b have different arrangements (antenna patterns) of antenna devices. Thereby, as shown in FIG. 1, the beam patterns of the transmission waves that are transmitted from the transmission antennae 13a, 13b are different.

The switching unit 131 is a switch for switching connection between the oscillator 12 and the transmission antennae 13 and connects any one of the transmission antennae 13a and the transmission antennae 13b and the oscillator 12 according to a signal of the transmission control unit 107.

The reception antenna 14 is a plurality of array antennae that receives the reflected waves coming from the target at which the transmission waves continuously transmitted from the transmission antennae 13 are reflected. In this illustrative embodiment, the four reception antennae 14a (ch1), 14b (ch2), 14c (ch3) and 14d (ch4) are provided. In the meantime, each of the reception antennae 14a to 14d is arranged at an equal interval.

The mixer 15 is provided at each reception antenna. The mixer 15 mixes a reception signal and a transmission signal. The reception signal and the transmission signal are mixed, so that a beat signal, which is a difference signal between the reception signal and the transmission signal, is generated and is then output to the LPF 16.

Here, the reception signal and the transmission signal generating the beat signal are described with reference to an FW-CW (Frequency Modulated Continuous Wave) signal processing method shown in FIG. 3. Meanwhile, in this illustrative embodiment, the FW-CW method is described below. However, the invention is not limited to the FW-CW method and any method can be adopted inasmuch as the method derives a target by combining a plurality of sections including an UP section in which a frequency of a transmission signal ascends and a DOWN section in which a frequency of a transmission signal descends.

Also, symbols that are shown in equations and FIG. 3 for signals and beat frequencies of the FW-CW are as follows: fr: distance frequency, fd: speed frequency, fo: central frequency of transmission wave, ΔF: frequency shift width, fm: repetition frequency of modulation wave, c: light speed (speed of electric wave), T: round-trip time of electric wave between vehicle CR and target, fs: transmission/reception frequency, R: longitudinal distance, V: relative speed, θm: angle of target, θup: angle corresponding to a peak signal in an UP section, θdn: angle corresponding to a peak signal in a DOWN section.

<2. FW-CW Signal Processing>

As an example of the signal processing that is used for target deriving processing, FW-CW (Frequency Modulated Continuous Wave) signal processing is described. Meanwhile, in this illustrative embodiment, the FW-CW method is exemplified. However, the invention is not limited to the FW-CW method and any method can be adopted inasmuch as the method detects a position and the like of a target by combining a plurality of sections including a section in which a frequency ascends and a section in which a frequency descends.

Figure 3:
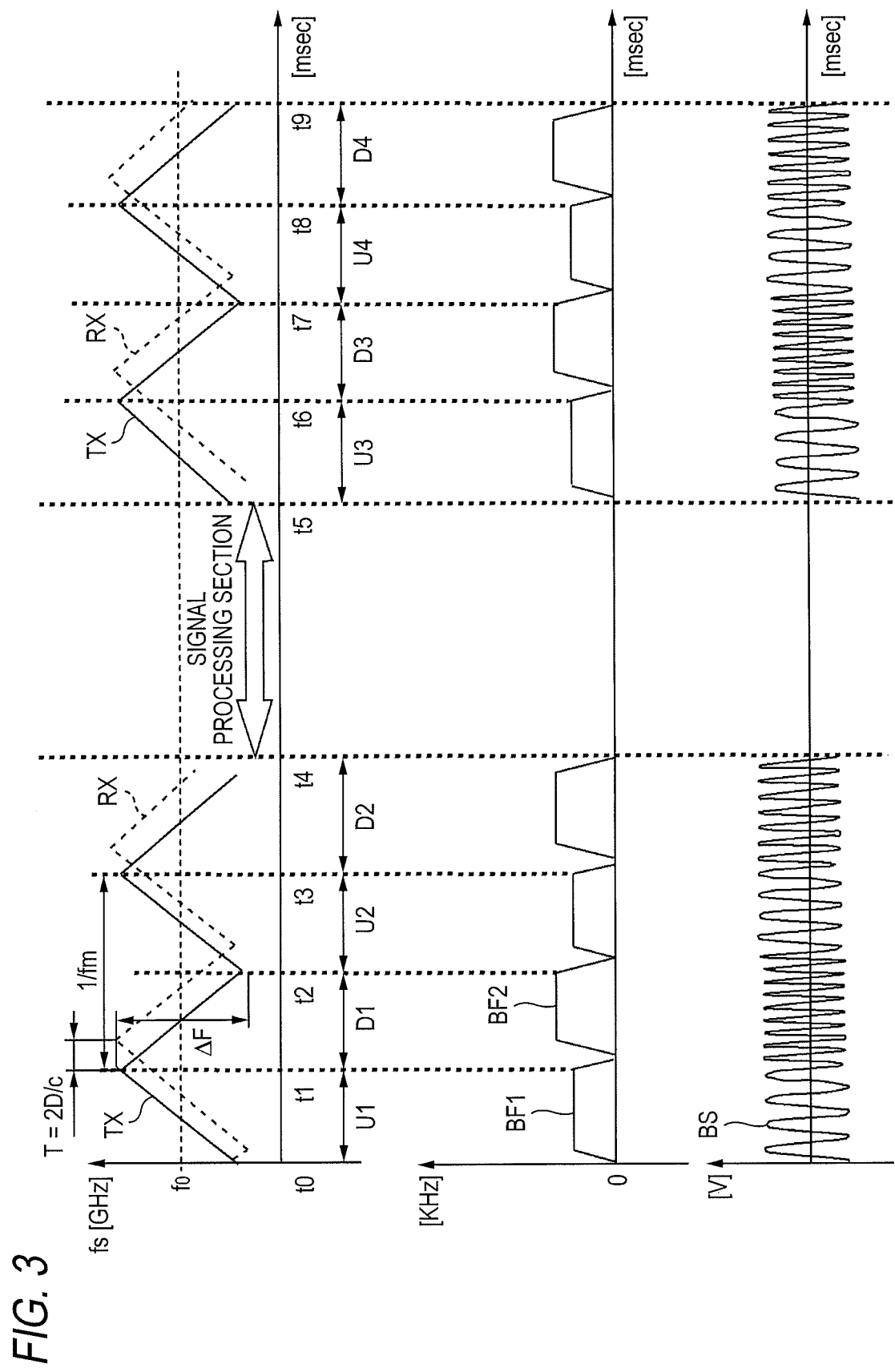
FIG. 3 is a view showing a signal of an FW-CW method.

FIG. 3 is a view showing a signal of the FW-CW method. At the upper of FIG. 3, signal waveforms of a transmission signal TX and a reception signal RX of the FW-CW method are shown. Also, at the middle of FIG. 3, a beat frequency resulting from a difference between the transmission signal TX and the reception signal RX is shown. Also, at the lower of FIG. 3, a beat signal corresponding to the beat frequency is shown.

At the upper of FIG. 3, a vertical axis indicates a frequency [kHz] and a horizontal axis indicates a time [msec]. In FIG. 3, the transmission signal TX has a central frequency fo (for example, 76.5 GHz) and repeats a constant change between 200 MHz so that it ascends up to a predetermined frequency (for example, 76.6 GHz) and then descends to a predetermined frequency (for example, 76.4 GHz). Like this, the transmission signal has a section (hereinafter, also referred to as 'UP section', for example, sections U1, U2, U3, U4 shown in FIG. 3 are UP sections) in which the frequency ascends to a predetermined frequency and a section (hereinafter, also referred to as 'DOWN section', for example, sections D1, D2, D3, D4 are DOWN sections) in which the frequency descends to a predetermined frequency after it has ascended to the predetermined frequency. Also, when the transmission wave transmitted from the transmission antennae 13 collides with an object and is then received at the reception antenna 14 as a reflected wave, the reception signal RX is input into the mixer 15 through the reception antenna 14. Like the transmission signal TX, the reception signal RX also has a section in which the frequency ascends to a predetermined frequency and a section in which the frequency descends to a predetermined frequency.

In the meantime, the radar apparatus 1 of this illustrative embodiment transmits a transmission wave, which corresponds to two cycles of the transmission signal TX in which one cycle of the transmission signal TX is a combination of one UP section and one DOWN section, to the vehicle outside. For example, in a first cycle (an UP section U1 of time t0 to t1 and a DOWN section D1 of time t1 to t2), a transmission wave having the beam pattern NA is output from the transmission antennae 13a. In a second cycle (an UP section U2 of time t2 to t3 and a DOWN section D2 of time t3 to t4) that is a next cycle, a transmission wave having the beam pattern BA is output from the transmission antennae 13b. Then, the signal processing unit 18 performs signal processing for deriving target information by the transmission signal TX and the reception signal RX (a signal processing section of time t4 to t5). After that, in a third cycle (an UP section U3 of time t5 to t6 and a DOWN section D3 of time t6 to t7), a transmission wave having the beam pattern NA is output from the transmission antennae 13a, in a fourth cycle (an UP section U4 of time t7 to t8 and a DOWN section D4 of time t8 to t9), a transmission wave having the beam pattern BA is output from the transmission antennae 13b and then the signal processing unit 18 performs the signal processing for deriving target information. Then, the same processing is repeated.

In the meantime, the reception signal RX has a temporal delay (time T), compared to the transmission signal TX, depending on the distance between the target and the vehicle CR. Also, when there is a speed difference between a speed of the vehicle CR and a speed of the target, a difference corresponding to a Doppler shift is caused in the reception signal RX relative to the transmission signal TX.

At the middle of FIG. 3, a vertical axis indicates a frequency [kHz] and a horizontal axis indicates time [msec]. In FIG. 3, a beat frequency indicating a difference between the transmission signal and the reception signal of the UP section and the DOWN section is shown. For example, in the section U1, a beat frequency BF1 is derived, and in the section D1, a beat frequency BF2 is derived. Like this, the beat frequency is derived in each section.

At the lower of FIG. 3, a vertical axis indicates an amplitude [V] and a horizontal axis indicates time [msec]. In FIG. 3, an analog beat signal BS corresponding to the beat frequency is shown. The beat signal BS is filtered in the LPF 16 that will be described later and is then converted into digital data by the AD converter 17. Meanwhile, FIG. 3 shows the beat signal BS corresponding to the reception signal RX that is received from one reflection point. When the transmission wave corresponding to the transmission signal TX is reflected on a plurality of reflection points and is received at the reception antenna 14 as a plurality of reflected waves, signals corresponding to the reflected waves are generated as the reception signal RX. The beat signal BS indicating a difference between the transmission signal TX and the reception signal RX is a signal that is obtained by combining respective differences between the plurality of reception signals RX and the transmission signal TX.

Returning back to FIG. 2, the LPF (Low Pass Filter) 16 is a filter that reduces a frequency component higher than a predetermined frequency without reducing a frequency component lower than the predetermined frequency. That is, a cutoff frequency is set so that at least a frequency component of a target, which is to be controlled, can pass. In the meantime, like the mixer 15, the LPF 16 is provided for each reception antenna.

The AD converter 17 samples the beat signal, which is an analog signal, with a predetermined cycle, thereby deriving a plurality of sampling data. Then, the AD converter quantizes the sampled data to thus convert the beat signal of the analog data into digital data, thereby outputting the digital data to the signal processing unit 18. In the meantime, the AD converter 17 is also provided to each reception antenna, like the mixer 15.

After the beat signal BS is converted into the digital data by the AD converter 17, the digital data is FFT-processed by the signal processing unit 18, so that FFT data having a signal level value or phase information for each frequency of the beat signal BS is acquired.

The signal processing unit 18 is a computer having a CPU 181 and a memory 182, performs the FFT processing for the beat signal of the digital data output from the AD converter 17 to thus acquire the FFT data and extracts a signal having a signal level value exceeding a predetermined threshold from the beat signal of the FFT data, as a peak signal. The signal processing unit 18 pairs the peak signal of the UP section and the peak signal of the DOWN section, thereby deriving the paired data.

Here, the longitudinal distance of the paired data is derived by an equation (1) and the relative speed of the paired data is derived by an equation (2). Also, the angle of the paired data is derived by an equation (3). The transverse distance of the paired data is derived by a calculation using a trigonometric function from the information on the angle derived by the equation (3) and the longitudinal distance.

[Equation 1]
$$R = \frac{(f_{up} + f_{dn}) \cdot c}{2 \times (4 \times \Delta F \times f_m)} \quad (1)$$

[Equation 2]
$$V = \frac{(f_{up} - f_{dn}) \cdot c}{2 \times (4 \times \Delta F \times f_m)} \quad (2)$$

[Equation 3]
$$\theta_m = \frac{\theta_{up} + \theta_{dn}}{2} \quad (3)$$

Also, when deriving the target information of this time processing, the signal processing unit 18 filters the target information of the paired data of this time processing and the predicted information by predetermined filter constants, thereby deriving the target information of this time processing (for example, (the target information of the paired data×a filter constant 0.25)+(the predicted information×a filter constant 0.75)=the target information of the target of this time processing). Then, when the paired data corresponding to a moving target, which is to be filter-processed, meets a predetermined condition, the signal processing unit 18 changes the predetermined filter constant in the filtering processing of the paired data and then performs the filtering processing. The processing of changing the filter constant will be specifically described later.

The memory 182 stores therein execution programs for a variety of calculation processing and the like that are executed by the CPU 181. Also, the memory 182 stores therein the plurality of target information derived by the signal processing unit 18. Specifically, the memory stores the target information of the target of the respective processing (for example, the previous time processing and the processing before the previous time processing) including this time processing. Also, the memory 182 stores therein values of the filter constants that are used to derive the target information of the target. Also, the memory 182 stores therein map data of an own traffic lane probability that is an own traffic lane existence value indicating a degree that a target exists in a traveling traffic lane of the vehicle CR by a relative transverse distance and longitudinal distance of the target (which will be described later).

The transmission control unit 107 is connected to the signal processing unit 18 and outputs a control signal to the signal generation unit 11 generating a modulation signal, based on a signal from the signal processing unit 18. Also, the transmission control unit 107 outputs a control signal to the switching unit 131, to which any one of the transmission antennae 13a and the transmission antennae 13b and the oscillator 12 are connected, based on a signal from the signal processing unit 18.

The vehicle control device 2 controls operations of various devices of the vehicle CR. That is, the vehicle control device 2 acquires information from the various sensors such as the vehicle speed sensor 40 and the steering sensor 41. The vehicle control device 2 operates a variety of devices such as the brake 50 and the throttle 51 to thus control behaviors of the vehicle CR, based on the information acquired from the various sensors and the target information acquired from the signal processing unit 18 of the radar apparatus 1.

An example of the vehicle control that is performed by the vehicle control device 2 is as follows. The vehicle control device 2 performs control of enabling the vehicle CR to follow up a preceding vehicle that is a moving target traveling at the front of the vehicle CR in an own traffic lane in which the vehicle CR is traveling. Specifically, as the vehicle CR travels, the vehicle control device 2 performs the ACC control of controlling at least one of the brake 50 and the throttle 51 and thus enabling the vehicle CR to follow up the preceding vehicle at a state where a predetermined inter-vehicular distance is secured between the vehicle CR and the preceding vehicle.

Also, the vehicle control device 2 performs control of protecting a passenger in the vehicle CR, in preparation for collision of the vehicle CR with an obstacle. Specifically, when there is a danger that the vehicle CR will collide with an obstacle, the vehicle control device performs the PCS control of displaying a warning by using a warning device (not shown) to a user of the vehicle CR or controlling the brake 50 to thus lower the speed of the vehicle CR. Also, the vehicle control device 2 performs the PCS control of fastening a passenger to a seat by a seat belt in the vehicle or fixing a headrest to thus reduce damage to the user of the vehicle CR, which is caused due to shock upon the collision.

The vehicle sensor 40 outputs a signal corresponding to the speed of the vehicle CR, based on the number of revolutions of an axle of the vehicle CR. The vehicle control device 2 acquires a current vehicle speed, based on the signal from the vehicle speed sensor 40.

The steering sensor 41 detects a rotating angle of a steering wheel resulting from an operation of a driver of the vehicle CR and transmits the angle information of the vehicle body of the vehicle CR to the vehicle control device 2. In the meantime, information on a curve radius of the traveling traffic lane of the vehicle CR, which is calculated by the vehicle control device 2 on the basis of the angle information of the vehicle body of the vehicle CR input from the steering sensor 41, is output to the radar apparatus 1.

The brake 50 decelerates the speed of the vehicle CR in response to an operation of the driver of the vehicle CR. Also, the brake 50 decelerates the speed of the vehicle CR under control of the vehicle control device 2. For example, the brake decelerates the speed of the vehicle CR so that the longitudinal distance between the vehicle CR and the preceding vehicle is kept constant.

The throttle 51 accelerates the speed of the vehicle CR in response to an operation of the driver of the vehicle CR. Also, the throttle 51 accelerates the speed of the vehicle CR under control of the vehicle control device 2. For example, the throttle 51 accelerates the speed of the vehicle CR so that the longitudinal distance between the vehicle CR and the preceding vehicle is kept constant.

<2. Processing Flow Chart>
<2-1. Overall Processing>

Figure 4:
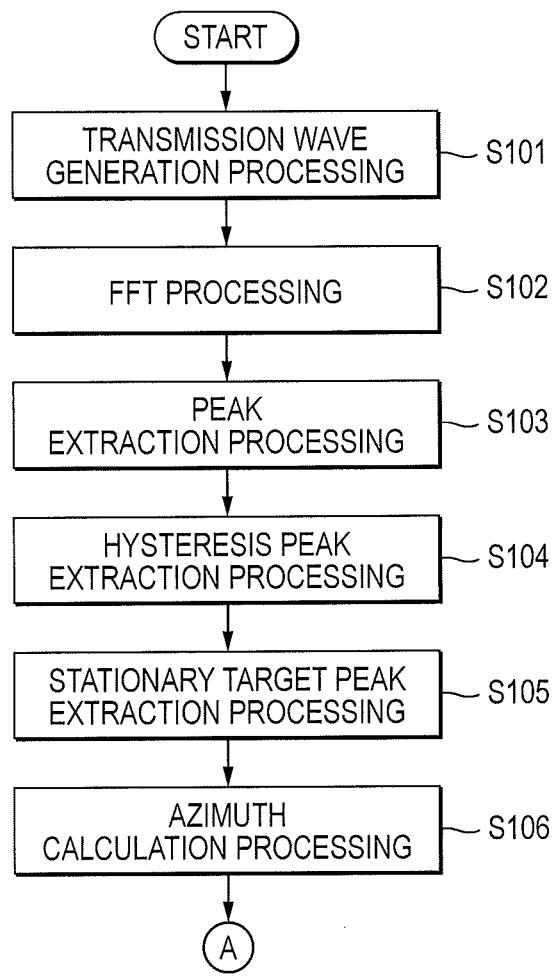
FIG. 4 is a flow chart showing target information deriving processing, which is performed by a signal processing unit.
Figure 5:
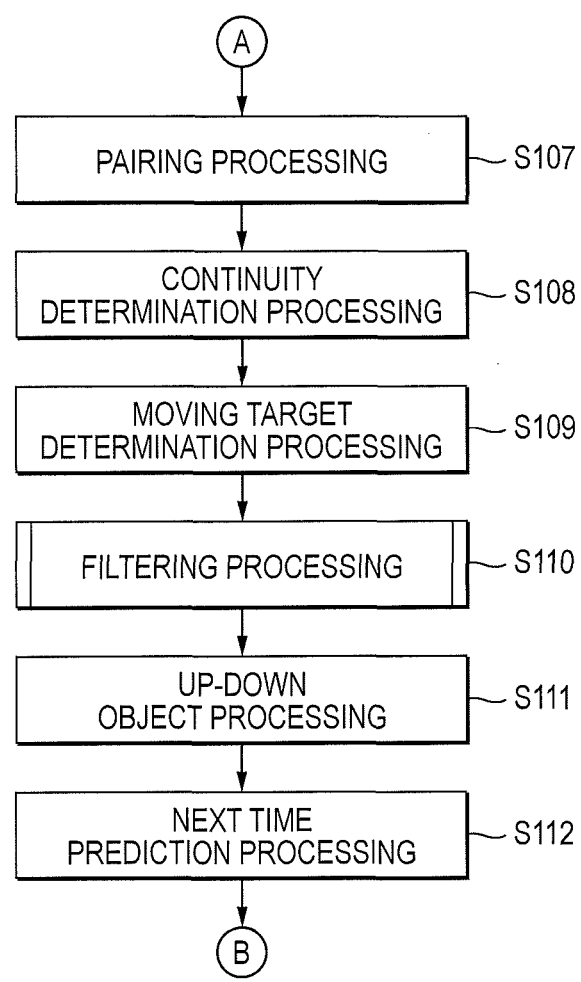
FIG. 5 is a flow chart showing the target information deriving processing, which is performed by the signal processing unit.
Figure 6:
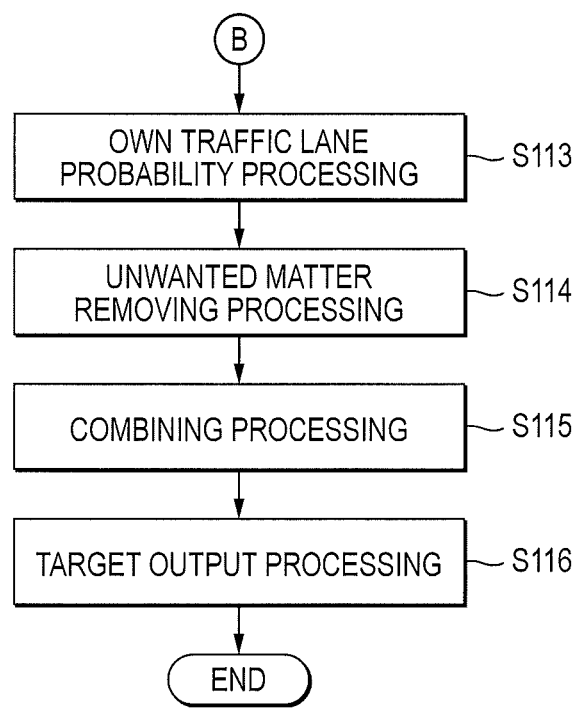
FIG. 6 is a flow chart showing the target information deriving processing, which is performed by the signal processing unit.

FIGS. 4 to 6 are flow charts of target information deriving processing that is performed by the signal processing unit 18. First, the signal processing unit 18 outputs an instruction signal for generating a transmission wave to the transmission control unit 107 (step S101). Then, the signal generation unit 11 is controlled by the transmission control unit 107 to which the instruction signal is input from the signal processing unit 18, and a transmission wave corresponding to the transmission signal TX is generated. The generated transmission wave is output to the outside of the vehicle.

Then, the reception antenna 14 receives a reflected wave coming from a target at which the transmission wave is reflected, and the reception signal RX corresponding to the reflected wave and the transmission signal TX are mixed by the mixer 15, so that a beat signal BS, which is a difference signal between the transmission signal and the reception signal, is generated. Then, the beat signal BS that is an analog signal is filtered by the LPF 16, is converted into digital data by the AD converter 17 and is then input to the signal processing unit 18.

The signal processing unit 18 performs the FFT processing for the beat signal of the digital data (step S102) and acquires the FFT data having signal level values of the beat signals of the respective frequencies.

Then, the signal processing unit 18 extracts, as a peak signal, a beat signal having a signal level value exceeding a predetermined threshold from the beat signals of the FFT data (step S103). Thereby, the number of peak signals that are processed by the signal processing unit 18 in this time processing is decided.

Then, from the peak signals of this time processing extracted in the peak extraction processing, the signal processing unit 18 extracts a peak signal of this time processing, which exists in ±3 BIN with respect to a frequency of a predicted peak signal obtained by predicting a frequency of a peak signal of this time processing from the target information of the target derived in the previous time processing, as a hysteresis peak signal having temporal continuity with the peak signal corresponding to the target of the previous time processing (step S104).

Then, from the speed information of the vehicle CR output from the vehicle speed sensor 40, the signal processing unit 18 performs processing of extracting a peak signal of each section, in which a frequency difference between the peak signal of the UP section and the peak signal of the DOWN section becomes a frequency difference corresponding to the speed, as a peak signal corresponding to a stationary target (step S105). Here, the stationary target means a target having the substantially same relative speed as the speed of the vehicle and a moving target means a target that moves at a specific speed and has a different relative speed from the speed of the vehicle.

In the meantime, the reason to perform the hysteresis peak extraction (step S104) and the stationary object peak extraction (step S105) is that the signal processing unit 18 is to select a peak signal corresponding to a target that should be preferentially output to the vehicle control device 2. For example, the peak signal of the target of this time processing having temporal continuity with the target derived in the previous time processing may have a high priority because there is a high probability that a target actually exists, compared to a newly derived target that has not been derived in the previous time processing, and also may have a high priority because a peak signal corresponding to a moving target has a high possibility that the moving object will collide with the vehicle CR, compared to a peak signal corresponding to the stationary object.

In each of the UP and DOWN sections, the signal processing unit 18 performs an azimuth calculation, based on the peak signals (step S106). Specifically, the signal processing unit 18 derives an azimuth (angle) of the target by a predetermined azimuth calculation algorithm. For example, the azimuth calculation algorithm is an ESPRIT (Estimation of Signal Parameters via Rotation Invariance Techniques), calculates an eigenvalue of a correlation matrix, an eigenvector and the like from the phase information of the reception signals received at the respective reception antennae 14a to 14d and derives an angle θup corresponding to a peak signal of the UP section and an angle θdn corresponding to a peak signal of the DOWN section. When the respective peak signals of the UP and DOWN sections are paired, an angle of the paired data is derived by the equation (3).

Also, the frequency information of one peak signal corresponds to the information of the longitudinal distance and relative speed of the target. However, the frequency of one peak signal may include a plurality of target information. For example, regarding the position information of the target with respect to the vehicle CR, a plurality of target information in which the longitudinal distances are the same and the angles are different may be included in the peak signal of the same frequency BIN. In this case, the phase information of a plurality of reflected waves coming at different angles becomes different phase information, respectively. Therefore, the signal processing unit 18 derives the target information of the plurality of targets existing at different angles for one peak signal, based on the phase information of the respective reflected waves.

Here, when performing the azimuth calculation, a phase may be 360°-rotated depending on the angle of the target, so that information on an angle different from an original angle at which the target exists may be derived. Specifically, for example, when the phase information of the reflected wave from a target, which is received at the reception antenna, is 420°, even though an actual target exists in the area of the beam pattern BA, other than the beam pattern NA shown in FIG. 1, the actual target may be determined that the phase information is 60°) (420°-360° due to the phase fold-back and erroneous angle information that the target exists in the area of the beam pattern NA not included in the beam pattern BA may be derived. Therefore, the transmission waves of the different beam patterns are respectively output from the two transmission antennae of the transmission antennae 13a, 13b and the reception levels at the respective transmission antennae as regards the same target are compared, so that a correct angle of the target is derived.

Specifically, an angle is derived as follows, based on the reflected waves with respect to the transmission waves of the respective beam patterns. When the phase information of the reflected wave is 60°, the signal level values of angle spectra corresponding to the reflected wave of the transmission wave output from the transmission antennae 13a and the reflected wave of the transmission wave output from the transmission antennae 13b are compared. When the signal level value of the angle spectrum corresponding to the reflected wave of the transmission wave output from the transmission antennae 13a is larger, an angle corresponding to the phase information of 60° in the area of the beam pattern NA except for the area of the beam pattern BA is derived as a target angle. Also, when the signal level value of the angle spectrum corresponding to the reflected wave of the transmission wave output from the transmission antennae 13b is larger, an angle corresponding to the phase information of 420° in the area of the beam pattern BA except for the area of the beam pattern NA is derived as a target angle. Like this, by the transmission waves of two cycles of the transmission signal TX, the transmission waves of the different beam patterns are output every cycle, so that it is possible to prevent the erroneous angle information of the target from being derived due to the phase fold-back upon the azimuth calculation.

Then, the signal processing unit 18 performs pairing processing of pairing the peak signals of the UP and DOWN sections shown in FIG. 5 (step S107). For the hysteresis peak signals extracted in the hysteresis peak extraction processing (step S104) from all the peak signals derived in the processing of step S103, the pairing processing is performed between the hysteresis peak signal of the UP section and the hysteresis peak signal of the DOWN section. Also, for the stationary object peak signal extracted in the stationary object peak extraction processing (step S105), the pairing processing is performed between the stationary object peak signal of the UP section and the stationary object peak signal of the DOWN section. Also, for the other peak signals except for the hysteresis peak signals and stationary object peak signals of all the peak signals extracted in the peak extraction processing, the pairing processing is performed between the other peak signals of the UP section and the other peak signals of the DOWN section.

In the meantime, the pairing processing between the peak signal of the UP section and the peak signal of the DOWN section is performed through a calculation of using a Mahalanobis distance, for example. Specifically, a plurality of normal-paired data paired in a correct combination and mispaired data paired in an incorrect combination during the experimental pairing between the peak signal of the UP section and the peak signal of the DOWN section before the radar apparatus 1 is mounted on the vehicle CR is acquired. Then, from three parameter values of 'a difference of signal level values', 'a difference of angle values' and 'a difference of signal level values of angle spectra' between the peak signal of the UP section and the peak signal of the DOWN section in the plurality of normal-paired data, average values are derived for each of the three parameters of the plurality of normal-paired data and are then stored in the memory 182 in advance.

After the radar apparatus 1 is mounted on the vehicle CR, when the signal processing unit 18 derives the target information, it derives a Mahalanobis distance with an equation (4) by using the three parameter values of all combinations of the peak signals of the UP section and the peak signals of the DOWN section of the peaks signals of the FFT data acquired in this time processing and the average values for each of the three parameters of the plurality of normal-paired data. The signal processing unit 18 derives, as the normal-paired data, paired data of this time processing having a minimum Mahalanobis distance. That is, the smaller the Mahalanobis distance, a probability of the normal-paired data becomes higher.

Here, the Mahalanobis distance is a distance for one group expressed by a multivariable vector x=(x1, x2, x3) where an average $\mu=(\mu 1, \mu 2, \mu 3)^T$ and a covariance matrix is $\Sigma$, and is derived by the equation (4). In the meantime, μ1, μ2 and μ3 indicate the three parameter values of the normal-paired data and x1, x2 and x3 indicate the three parameter values of the paired data of this time processing.

[Equation 4]

$$D_M(x) = \sqrt{(x-\mu)^T \Sigma^{-1}(x-\mu)} \quad (4)$$

Then, the signal processing unit 18 derives a transverse distance, based on the longitudinal distance, relative distance and angle of the paired data determined as the normal-paired data, by using the parameter values of the normal-paired data in the pairing processing and the equations (1) to (3). Here, the transverse distance includes an absolute transverse distance and a relative transverse distance. The absolute transverse distance is a transverse distance in which a left direction of the vehicle CR in the vehicle width direction is −(minus) and a right direction thereof is +(plus) on the basis of the reference axis BL of ±0 m. Also, the relative transverse distance is a distance that is derived from the information on a curve radius of the own traffic lane, in which the vehicle CR is traveling, and the information on the longitudinal distance and absolute transverse distance of the target, as a transverse distance of the target corresponding to the curve radius. Specifically, the relative transverse distance is a distance in which a left direction of the vehicle CR in the vehicle width direction is −(minus) and a right direction thereof is +(plus) on the basis of the reference axis BL of +0 m, which virtually changes in a linear or curved shape depending on the information on the rotating angle of the steering wheel that is input from the steering sensor 41 as a driver of the vehicle CR operates the steering wheel of the vehicle CR. In the meantime, when it is necessary to consider a curved state of the own traffic line in calculating a transverse distance, the relative transverse distance is used as the target information. In the below, when simply describing the transverse distance, it means any one of the absolute transverse distance and the relative transverse distance. In particular, if required, only one transverse distance is described. However, it is not limited to the transverse distance (for example, the relative transverse distance) and the other transverse distance (for example, the absolute transverse distance) may be also used.

Then, the signal processing unit 18 performs (continuity determination) processing of determining whether there is a temporally continuous relation between the target information of the paired data of this time processing and the predicted target (step S108). Here, the predicted information is information that is obtained as the signal processing unit 18 predicts the longitudinal distance, the transverse distance, the relative speed and the like included in the target information of the paired data of this time processing, from a change in a value of the relative speed of the target information of the target of the previous time processing or the target information until now, and the like. The case where there is a temporally continuous relation between the target information of the paired data of this time processing and the predicted information is a case where respective difference values of the longitudinal distances, transverse distances and relative speeds included in the target information of the paired data of this time processing and the predicted information are within predetermined values. In the meantime, when the plurality of predicted target information is within the predetermined values, the signal processing unit 18 determines that the predicted information, which has the smallest difference value between the predicted information and the target information of the paired data of this time processing within the predetermined value, has a temporally continuous relation with the target information of the paired data (hereinafter, referred to as the 'past correspondence paired data') of this time processing, and performs filtering processing of step S110 (which will be described later) for the paired data of this time processing having the temporal continuity with the predicted information.

Also, when the respective difference values of the longitudinal distances, transverse distances and relative speeds included in the target information of the paired data of this time processing and the predicted information are not within predetermined values, the signal processing unit 18 determines that there is no temporally continuous relation between the target information of the paired data of this time processing and the predicted information. The paired data of this time processing (hereinafter, referred to as 'new paired data') for which it is determined that there is no temporally continuous relation with the predicted information becomes paired data corresponding to a target that is first derived in this time processing. In the meantime, since the new paired data has no target of the previous time processing having the temporal continuity, the predicted information is not derived and the longitudinal distance, transverse distance and relative speed of the new paired data become the target information of the target of this time processing, in the filtering processing of step S110 (which will be described later).

Then, the signal processing unit 18 derives paired data corresponding to the moving target from the information on the speed of the vehicle CR and the relative speed of the paired data (step S109) and turns on a moving object flag of the paired data corresponding to the moving target. By this processing, it is possible to derive the paired data that should be preferentially processed.

When there is a temporally continuous relation between the target information of the paired data of this time processing and the predicted information, the signal processing unit 18 performs filtering of the longitudinal distances, transverse distances and relative speeds included in the target information of the paired data of this time processing and the predicted information (S110) and derives the target information of the target derived by the filtering processing of this time processing, as the target information of the target of this time processing.

The signal processing unit 18 performs weighting of a filter constant 0.25 for this time transverse distance, which is a transverse distance of the paired data of this time processing corresponding to the moving target, and weighting of a filter constant 0.75 for the predicted transverse distance that is obtained by predicting the transverse distance of the target of this time processing from the previous time-decided transverse distance, which is a transverse distance of the target of the previous time processing. Then, the signal processing unit derives a sum of both transverse distances after the weighting, as this time-decided transverse distance (for example, (this time transverse distance×the filter constant 0.25)+(the predicted transverse distance×the filter constant 0.75)=this time-decided transverse distance). Here, when the past correspondence paired data that is to be filter-processed satisfies a predetermined condition, the signal processing unit 18 changes a predetermined filter constant of the filtering processing of the past correspondence paired data and thus performs the filtering processing.

Specifically, when the past correspondence paired data is past correspondence paired data corresponding to a moving target such as a preceding vehicle and the like and the moving target and a specific target (for example, at least one of a stationary target such as a wall in a tunnel and a guard rail and a moving target such as an adjacent vehicle) meet a predetermined relation, the signal processing unit 18 changes a value of the filter constant. Thereby, the radar apparatus 1 can securely derive the moving target and the vehicle control device 2 to which the target information of the moving target is input from the radar apparatus 1 can perform the appropriate vehicle control for a target that is to be controlled. In the meantime, the filtering processing of the transverse distance of the target including the moving target such as a preceding vehicle will be specifically described later. The filtering processing is also performed for the longitudinal distance and the relative speed by using predetermined filter constants.

Then, the signal processing unit 18 performs up-down object processing of deriving a stationary target that is not necessary as regards the control of the vehicle CR (step S111). Specifically, the signal processing unit derives a position of a stationary target in a vehicle height direction of the vehicle CR and derives a stationary target (for example, a road marker of a cantilever or door-type provided above a roadway) having a position that is higher than a predetermined height (for example, higher than the vehicle height of the vehicle CR). Also, the signal processing unit derives a stationary target (for example, a road rivet such as chatter bar having a reflection plate attached thereto that is provided at a center divider or curve of a road) having a position lower than the vehicle height of the vehicle CR. The target information of the stationary target derived as described above is removed in an unwanted matter removing processing of step S114 (which will be described later) and is not output to the vehicle control device 2 from the radar apparatus 1, as the target information.

In processing (hereinafter, referred to as 'next time processing') that is performed next to this time processing, the signal processing unit 18 derives predicted values (predicted longitudinal distance, predicted relative speed, predicted transverse distance and the like) of the target information (step S112), which are used in the hysteresis peak extraction processing (step S104) of next time processing. Specifically, the signal processing unit derives 20 target information having a high priority when performing the vehicle control, calculates predicted values such as frequencies of the peak signals of this time processing of the respective UP and DOWN sections and uses the predicted values in the hysteresis peak deriving processing in next time processing. Regarding the priority, when performing the ACC control, a target having a transverse distance equivalent to an own traffic lane on which the vehicle CR is traveling and having a relatively short longitudinal distance to the vehicle CR has a high priority and a target having a transverse distance equivalent to an adjacent traffic lane and a relatively long longitudinal distance to the vehicle CR has a low priority. Also, when performing the PCS control, a target having a relatively short time-to-collision ('TTC') has a high priority and a target having a relatively long TTC has a low priority.

Then, as shown in FIG. 6, the signal processing unit 18 derives a probability that the target exists in the own traffic lane from two-dimensional map data of an own traffic lane probability having the relative transverse distance and longitudinal distance beforehand stored in the memory 182, as parameters (step S113). As an absolute value of the relative transverse distance of the target becomes larger, a value of the own traffic lane probability is decreased. Also, as a value of the longitudinal distance of the target becomes larger, the value of the own traffic lane probability is decreased. In the meantime, the larger value of the own traffic lane probability means that a target exists in the own traffic lane on which the vehicle CR is traveling. Therefore, the vehicle control device 2 performs the vehicle control of the ACC, for example, for the corresponding target.

Then, the signal processing unit 18 performs processing of determining a target, which is not necessary to be output to the vehicle control device 2, for the target derived in the past processing (step S114). For example, when there is a target (hereinafter, referred to as a 'not-combined target') that is not a combining object for which a plurality of targets will be united as one target, in combining processing (step S115) of the previous time processing (which will be described later), the signal processing unit 18 performs mirror determination for the not-combined target determining that, when a target to be combined (hereinafter, referred to as a 'combining target') exists in a predetermined range and the relative speeds of the not-combined target and the combining target are substantially the same, the not-combined target and the combining target are a part of the same object (for example, a side mirror attached to the vehicle body of the vehicle).

Then, the signal processing unit 18 turns on a mirror flag for the not-combined target satisfying the above-described condition, so that the not-combined target is not output from the radar apparatus 1 to the vehicle control device 2. When the not-combined target is set as an output target that is to be output to the vehicle control device 2, the combining target and the not-combined target, which are originally the information of the same object, become the target information based on two different objects, so that the correct vehicle control may not be performed by the vehicle control device 2. That is, when the not-combined target is a target corresponding to a side mirror and the like located at the own traffic lane-side of the adjacent vehicle, the vehicle control device 2 to which the target information of the not-combined target is input from the radar apparatus 1 may erroneously determine that the not-combined target is a target of the preceding vehicle existing in the own traffic lane and perform the vehicle control such as the ACC for the not-combined target. For this reason, the signal processing unit turns on the mirror flag for the not-combined target not to thus output the target information thereof to the vehicle control device 2.

Then, the signal processing unit 18 removes the target information derived in the up-down object processing of step S111 and also turns on a predetermined flag for a target corresponding to a peak signal of a ghost corresponding to a target that does not actually exist and is caused due to an interference (intermodulation) between a peak signal corresponding to an actual target existing at a predetermined distance or larger and a switching noise of a DC-DC converter of a power supply device (not shown) of the radar apparatus 1, thereby not outputting the target information to the vehicle control device 2.

Subsequently, the signal processing unit 18 performs processing of combining a plurality of target information into target information corresponding to one object (step S115). For example, when the transmission wave is emitted from the transmission antenna 13 of the radar apparatus 1 and is reflected on a target, a plurality of reflected waves is received at the reception antenna 14. That is, the reflected waves from a plurality of reflection points of the same object arrive at the reception antenna 14. As a result, the signal processing unit 18 derives a plurality of targets having different position information, based on the respective reflected waves. However, since the plurality of the targets is originally a target of one object, the signal processing unit combines the respective targets as one and treats the combined target as the target information on the same object. For this reason, when the respective relative speeds of the plurality of the targets are substantially the same and the longitudinal distances and transverse distances of the respective targets are within the predetermined ranges, the signal processing unit 18 regards the plurality of the targets as the target of the same object and performs combining processing of combining the plurality of the targets as the target corresponding to one object.

Then, the signal processing unit 18 outputs the target information having a high priority with respect to the output to the vehicle control device 2 from the target information combining-processed in the processing of step S115 to the vehicle control device 2.

<2.2 Filter Constant Change When Specific Target (Stationary Target) Exists>

In the below, the filtering processing of the past correspondence paired data described in the filtering processing (step S110) of FIG. 5 is specifically described using flow charts of FIGS. 7 to 11. First, an overall outline of the filtering processing of FIGS. 7 to 11 is described. For example, when a stationary target exists at a left side of the vehicle CR, when a difference value of the relative transverse distances between the stationary target and the past correspondence paired data corresponding to a moving target (hereinafter, referred to as an 'object moving target') moving in the same direction as the traveling direction of the vehicle CR is below a predetermined value that is a first value (when all conditions are satisfied in the processing of steps S201 to S209 shown in FIGS. 7 and 8), a filter constant (hereinafter, referred to as a 'first filter constant') (for example, a filter constant 0.75 of the predicted transverse distance and a filter constant 0.25 of this time transverse distance), which is set as a default value of the filtering processing for the past correspondence paired data corresponding to the object moving target, is changed.

The filter constant after the change becomes a filter constant (hereinafter, referred to as a 'second filter constant') (for example, a filter constant 0.95 of the predicted transverse distance and a filter constant 0.05 of this time transverse distance) that reduces a reflection amount of this time transverse distance in comparison to before the change. Also, when the difference value is below a second value smaller than the first value (when all conditions are satisfied in the processing of steps S201 to S208 shown in FIGS. 7 and 8 and the condition of step S209 is not satisfied), the filter constant becomes a filter constant (hereinafter, referred to as a 'third filter constant') (for example, a filter constant 1.0 of the predicted transverse distance and a filter constant 0 (zero) of this time transverse distance) that further reduces the reflection amount of this time transverse distance in comparison to the second filter constant.

The reason to change the filter constant as described above is as follows. As the past correspondence paired data corresponding to the object moving target of this time processing is influenced by a specific target (for example, a stationary target or adjacent moving target exists in the vicinity of the object moving target, so that an angle spectrum of the object moving target is buried in an angle spectrum of the specific target. Also, when a peak signal of the specific target exists in the vicinity of a frequency of a peak signal of the object moving target, a mis-pairing is caused), this time transverse distance of the object moving target derived by the pairing processing may be derived as a transverse distance (for example, a transverse distance of the specific target) different from an actual transverse distance of the object moving target.

Upon the filtering of this time transverse distance and predicted transverse distance of the object moving target, if the filtering is performed with the first filter constant having the filter constant of this time transverse distance larger than the other filter constant (for example, the second filter constant and the third filter constant), this time transverse distance of the object moving target may be largely different from this time-decided actual transverse distance of the object moving target. For this reason, the predicted transverse distance derived based on the previous time-decided transverse distance is filtered by using (by reducing the reflection amount of the filter constant of this time transverse distance) the second filter constant (for example, 0.95 in the case of the predicted transverse distance) or third filter constant (for example, 1.0 in the case of the predicted transverse distance) larger than the first filter constant (for example, 0.75 in the case of the predicted transverse distance). Thereby, the radar apparatus 1 can securely derive the object moving target and the vehicle control device 2 to which the target information of the object moving target is input from the radar apparatus 1 can perform the appropriate vehicle control for the target that is to be controlled.

In the below, the processing is specifically described. FIGS. 7 to 11 are flow charts showing the filtering processing of the first illustrative embodiment. The signal processing unit 18 performs the filtering processing for one past correspondence paired data from a plurality of past correspondence paired data of this time processing. The signal processing unit 18 determines whether a preceding vehicle flag of a target (hereinafter, referred to as a 'first previous time target'), which has temporal continuity with the past correspondence paired data to be filter-processed and for which the target deriving processing has completed in the previous time processing, is ON (step S201). The reason to use the information of the first previous time target relating to the past correspondence paired data of this time processing is as follows: since the past correspondence paired data of this time processing has not been completely processed yet (for example, the filtering processing or combining processing has not been completed yet) and the target information thereof is not decided, the target information of the target of the previous time processing is used as a material for determination of the filtering processing. Here, the preceding vehicle flag is an index indicating a moving target that exists within a scanning scope (for example, the scope of the beam pattern BA) of the radar apparatus 1 at the front of the vehicle CR. The signal processing unit 18 turns on the preceding vehicle flag of the moving target of the preceding vehicle that exists in the own traffic lane, or the adjacent moving target that is an adjacent vehicle existing in an adjacent traffic lane and moving in the same direction as the vehicle CR, based on the information on the longitudinal distance, transverse distance and relative speed of the target.

Then, when the preceding vehicle flag of the first previous time target is ON (Yes in step S201), the signal processing unit 18 performs processing of deriving a representative transverse distance of the specific target at the left and right of the vehicle CR by using other correspondence paired data different from the past correspondence paired data to be filter-processed (step S202). On the other hand, when the preceding vehicle flag of the first previous time target is OFF (No in step S201), the signal processing unit executes processing of step S216 shown in FIG. 8.

Figure 8:
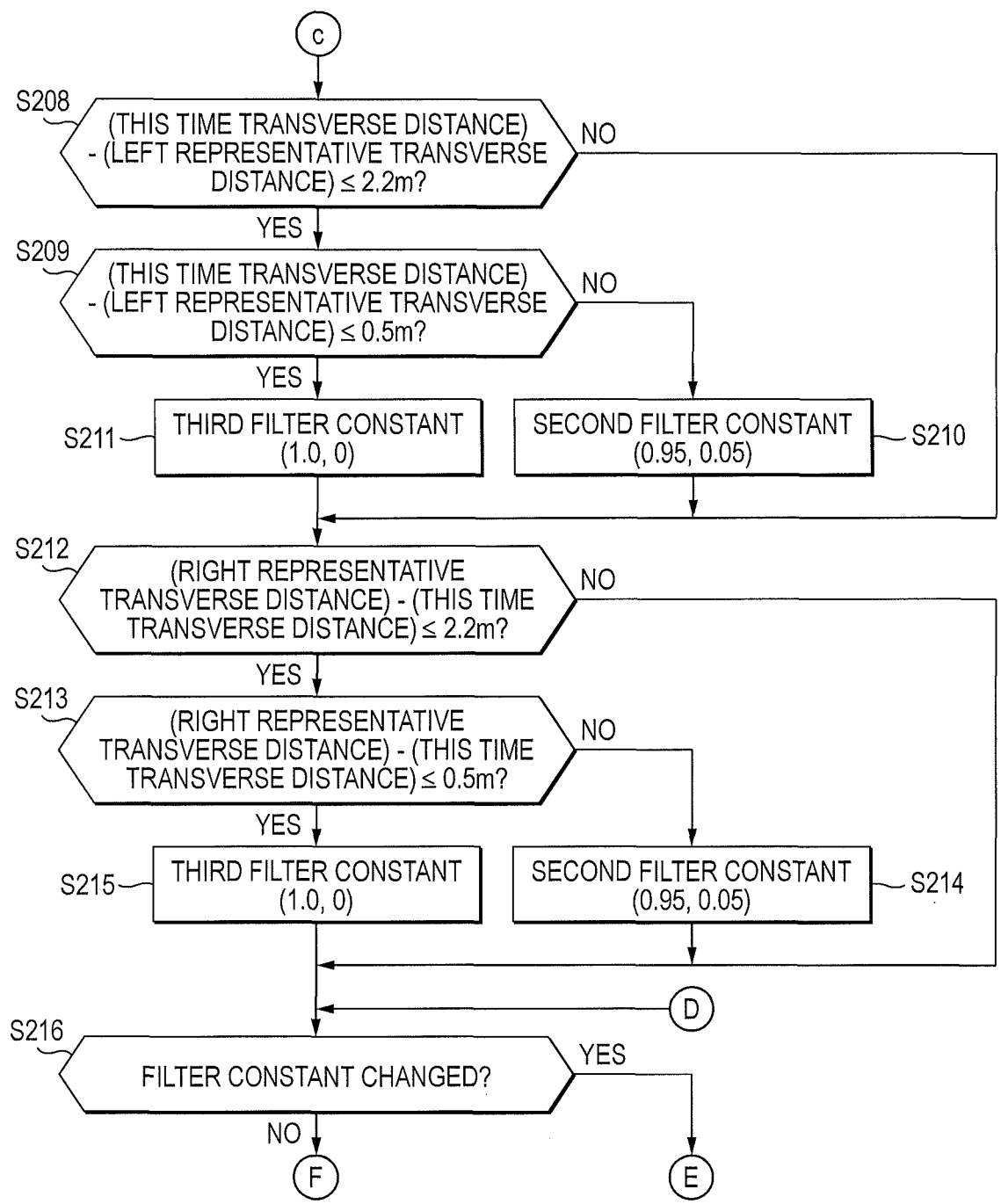
FIG. 8 is a flow chart showing the filtering processing according to the first illustrative embodiment.

In step S216 of FIG. 8, the signal processing unit 18 determines whether the filter constant has been changed. When the filter constant has not been changed in the processing of step S201 to S215 (No in step S216), if all conditions are satisfied in any one processing section of a processing section of steps S217 to S223 shown in FIG. 9 and a processing section of steps S217a to S223 shown in FIG. 11, the signal processing unit 18 filters the past correspondence paired data to be filter-processed to thereby change the filter constant that is used to derive this time-decided transverse distance.

Figure 10:
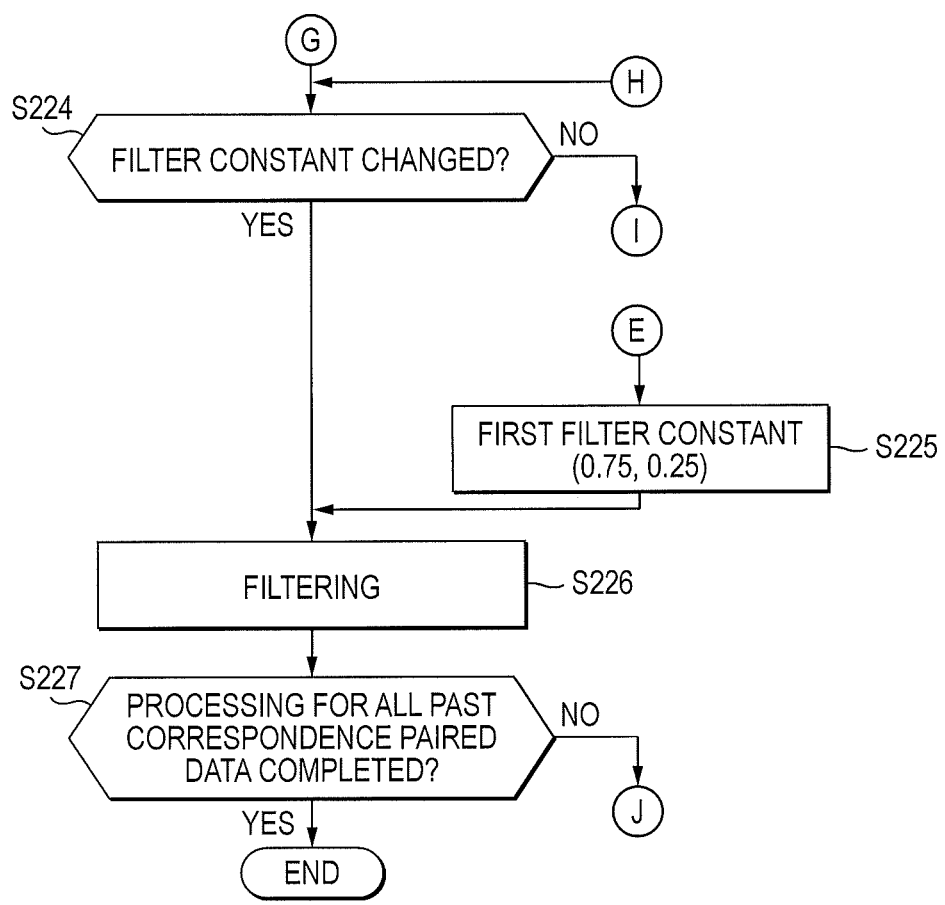
FIG. 10 is a flow chart showing the filtering processing according to the first illustrative embodiment.
Figure 12:
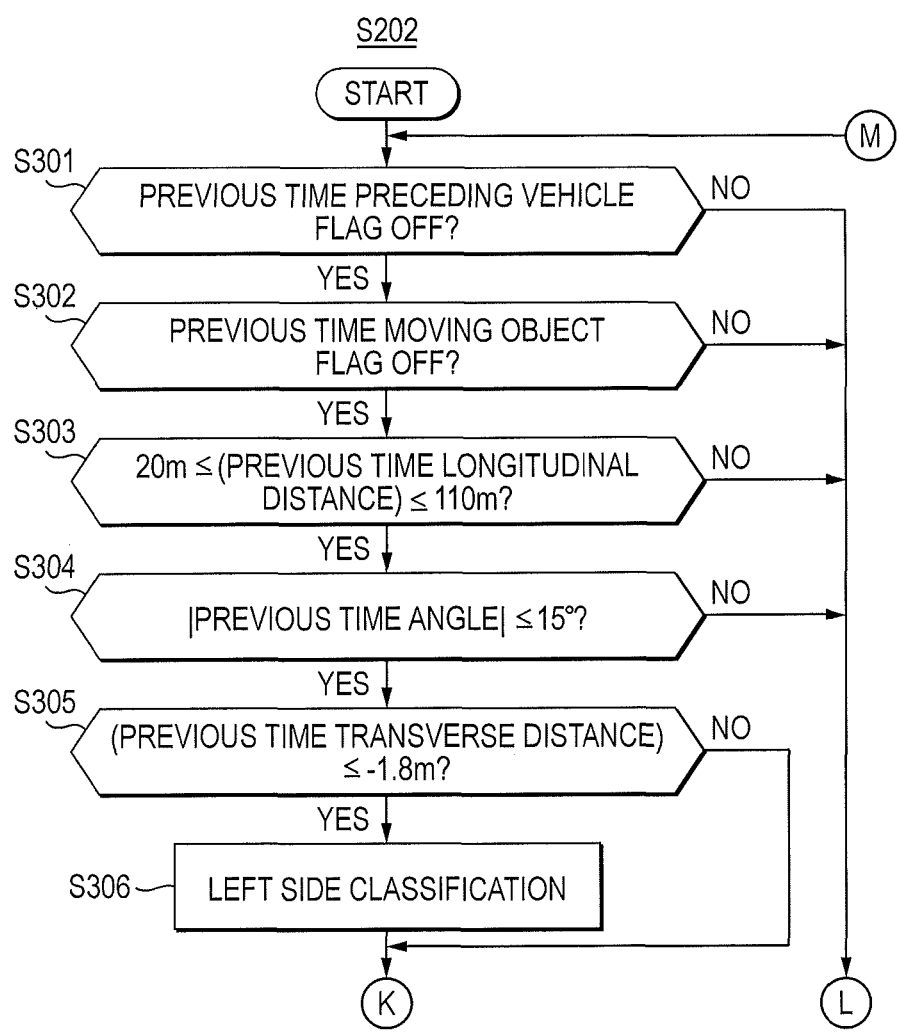
FIG. 12 is a flow chart showing processing of deriving representative relative transverse distances of left and right stationary targets.
Figure 13:
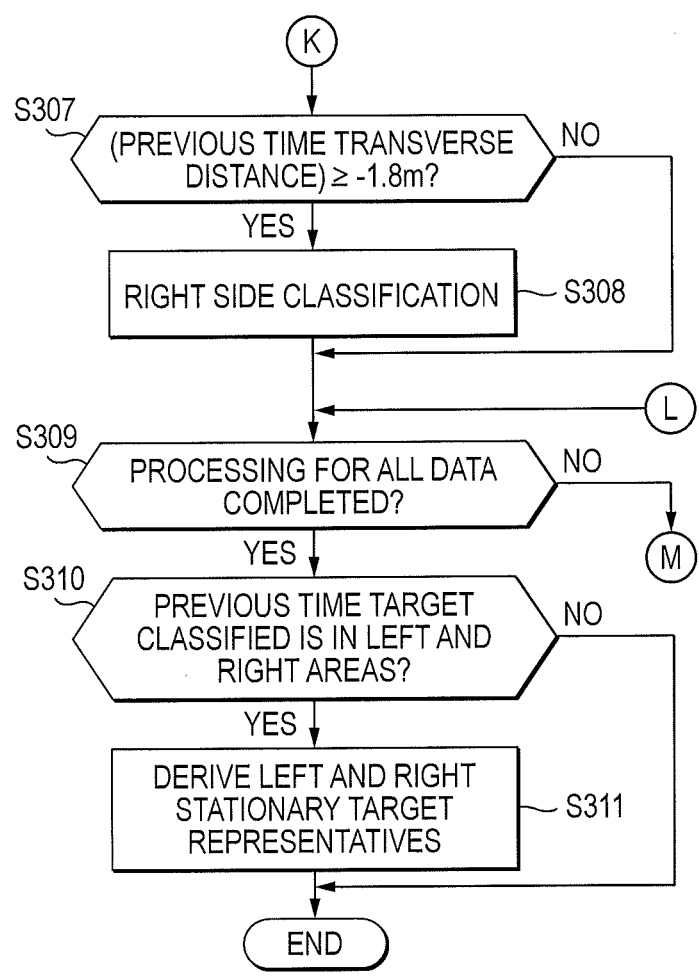
FIG. 13 is a flow chart showing the processing of deriving the representative relative transverse distances of the left and right stationary targets.

On the other hand, when any one condition is not satisfied in the above processing section, the signal processing unit 18 changes the filter constant to the first filter constant from the filter constant set in the previous time processing (step S225) and performs the filtering for the past correspondence paired data that is to be filter-processed (step S226), as shown in FIG. 10. For example, when the filter constant used to filter the first previous time in the previous time processing is the second filter constant, the signal processing unit 18 changes the filter constant filtering the past correspondence paired data having the temporal continuity with the first previous time target to the first filter constant. Then, the signal processing unit 18 filters the past correspondence paired data by using the first filter constant. Also, when the filter constant set for the first previous time target is the first filter constant, the signal processing unit 18 filters the past correspondence paired data by using the first filter constant of the same filter constant. Returning back to FIG. 7, the processing of step S202 deriving a representative transverse distance of the specific target at the left and right of the vehicle CR is specifically described with reference to FIGS. 12 and 13. FIGS. 12 and 13 are flow charts showing the processing of deriving a representative transverse distance of a stationary target that is a specific target at the left and right of the vehicle. The signal processing unit 18 determines whether the preceding vehicle flag of a target (hereinafter, referred to as a 'second previous time target'), which has temporal continuity with other past correspondence paired data and for which the target deriving processing has completed in the previous time processing, is OFF (step S301). When the preceding vehicle flag of the second previous time target is OFF (Yes in step S301), the signal processing unit 18 determines whether a moving target flag of the second previous time target is OFF (step S302). Here, the moving target flag is an index that becomes ON when the target described in step S109 of FIG. 5 is a moving target. In the processing of step S301 and S302, the signal processing unit 18 determines whether the second previous time target is a stationary target.

Then, when the moving target flag of the second previous time target is OFF (Yes in step S302), the signal processing unit 18 determines whether the longitudinal distance of the second previous time target is within a range of 20 m to 110 m (step S303). When the longitudinal distance of the second previous time target is within a range of 20 m to 110 m (Yes in step S303), the signal processing unit determines whether an absolute value of the angle of the second previous time target is smaller than 15° (step S304). When an absolute value of the angle of the second previous time target is smaller than 15° (Yes in step S304), the signal processing unit 18 executes processing of step S305. In the processing of steps S303 and S304, the signal processing unit 18 determines whether the second previous time target exists in the longitudinal distance and angle ranges within which the target information of the target can be normally derived. In the meantime, when any one condition is not satisfied in the processing of steps S301 to S304 (No in S301, No in S302, No in step S303 or No in step S304), the signal processing unit 18 executes processing of step S309 shown in FIG. 13. The processing of step S309 will be described later.

Then, the signal processing unit 18 determines whether the relative transverse distance of the second previous time target is −1.8 m or shorter (whether the relative transverse distance from the reference axis BL in the left vehicle width direction of the vehicle CR is −1.8 m or shorter) (step S305). When the relative transverse distance is −1.8 m or shorter (Yes in step S305), the signal processing unit 18 classifies the second previous time target as a stationary target that is a specific target existing in the left area at the front of the vehicle CR (step S306). On the other hand, when the relative transverse distance of the second previous time target is not −1.8 m or shorter (No in step S305), the signal processing unit 18 performs processing of step S307 shown in FIG. 13.

Then, the signal processing unit 18 determines whether the relative transverse distance of the second previous time target is 1.8 m or longer (whether the relative transverse distance from the reference axis BL in the right vehicle width direction of the vehicle CR is 1.8 m or longer) (step S307 in FIG. 13). When the relative transverse distance is 1.8 m or longer (Yes in step S307), the signal processing unit 18 classifies the second previous time target as a stationary target that is a specific target existing in the right area at the front of the vehicle CR (step S308). On the other hand, when the relative transverse distance of the second previous time target is not 1.8 m or longer (No in step S307), the signal processing unit 18 performs processing of step S309. In the processing of steps S305 to S308, the signal processing unit 18 classifies the second previous time target of other past correspondence paired data different from the past correspondence paired data to be filter-processed as the stationary target that is the left or right specific target existing at the front of the vehicle CR. In the meantime, when other past correspondence paired data is the stationary target but any one condition of steps S305 and S307 is not satisfied (for example, the stationary target is a stationary target existing on the own traffic lane and is a road marker of a cantilever or door-type provided above the own traffic lane), the second previous time target is not classified as the stationary target in the left or right area and is not subject to representative derivation processing of left and right stationary targets in processing of step S311 that will be described later.

Then, when there is a plurality of the second previous time targets having the temporal continuity with the other past correspondence paired data, the signal processing unit 18 also determines for the second previous time target of other past correspondence paired data, except for the second previous time target for which the processing of step S202 is completed, whether the processing of steps S301 to S308 is completed (step S309). When the processing is not completed for all the other second previous time targets (No in step S309), the signal processing unit 18 returns to the processing of step S301 of FIG. 12 and executes the repeating processing. Also, when the processing of steps S301 to S308 is completed for all the second previous time targets (Yes in step S309), the signal processing unit 18 determines whether at least one of the second previous time targets is classified in each of the left and right areas (step S310).

When at least one of the second previous time targets is classified in both the left and right areas (Yes in step S310), the signal processing unit 18 derives an average relative transverse distance of the second previous time targets classified in the left area. Also, the signal processing unit 18 derives an average relative transverse distance of the second previous time targets classified in the right area (step S311). That is, the signal processing unit 18 derives the average relative transverse distance of the left area as a representative relative transverse distance (hereinafter, referred to as 'left representative transverse distance') of the specific target existing in the left area at the front of the vehicle CR. Also, the signal processing unit 18 derives the average relative transverse distance of the right area as a representative relative transverse distance (hereinafter, referred to as 'right representative transverse distance') of the specific target existing in the right area at the front of the vehicle CR. In the processing of step S311, the signal processing unit 18 derives an average relative transverse distance of the specific target, which can be a factor causing the mis-pairing in the pairing processing of the past correspondence paired data at the periphery of the past correspondence paired data that is to be filter-processed. On the other hand, when at least one of the second previous time targets is not classified in both the left and right areas (No in step S310), the signal processing unit 18 ends the processing and performs processing of step S203 that is next processing.

Figure 7:
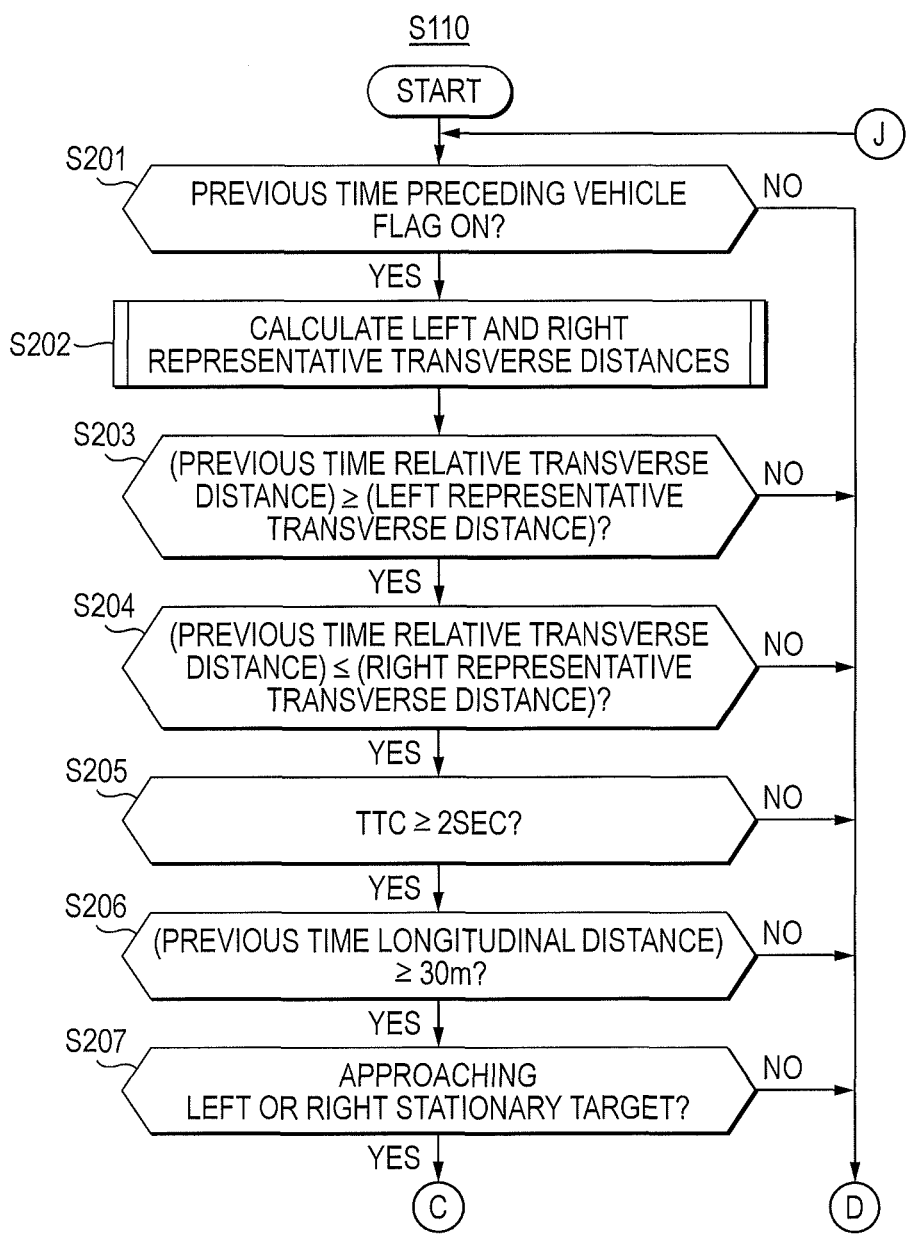
FIG. 7 is a flow chart showing filtering processing according to a first illustrative embodiment.
Figure 14:
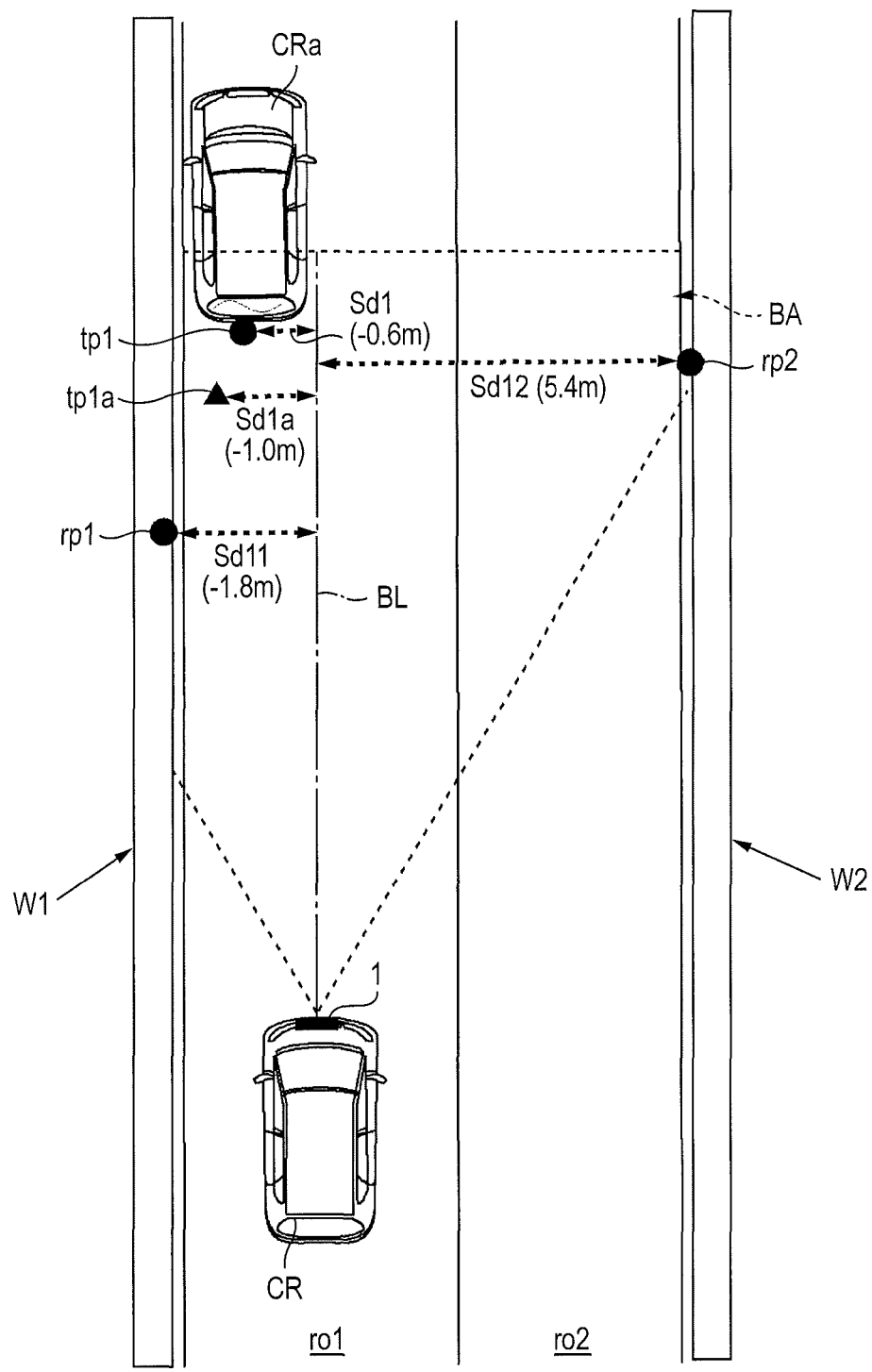
FIG. 14 is a view showing past correspondence paired data that is to be filter-processed and a first previous time target.
Figure 15:
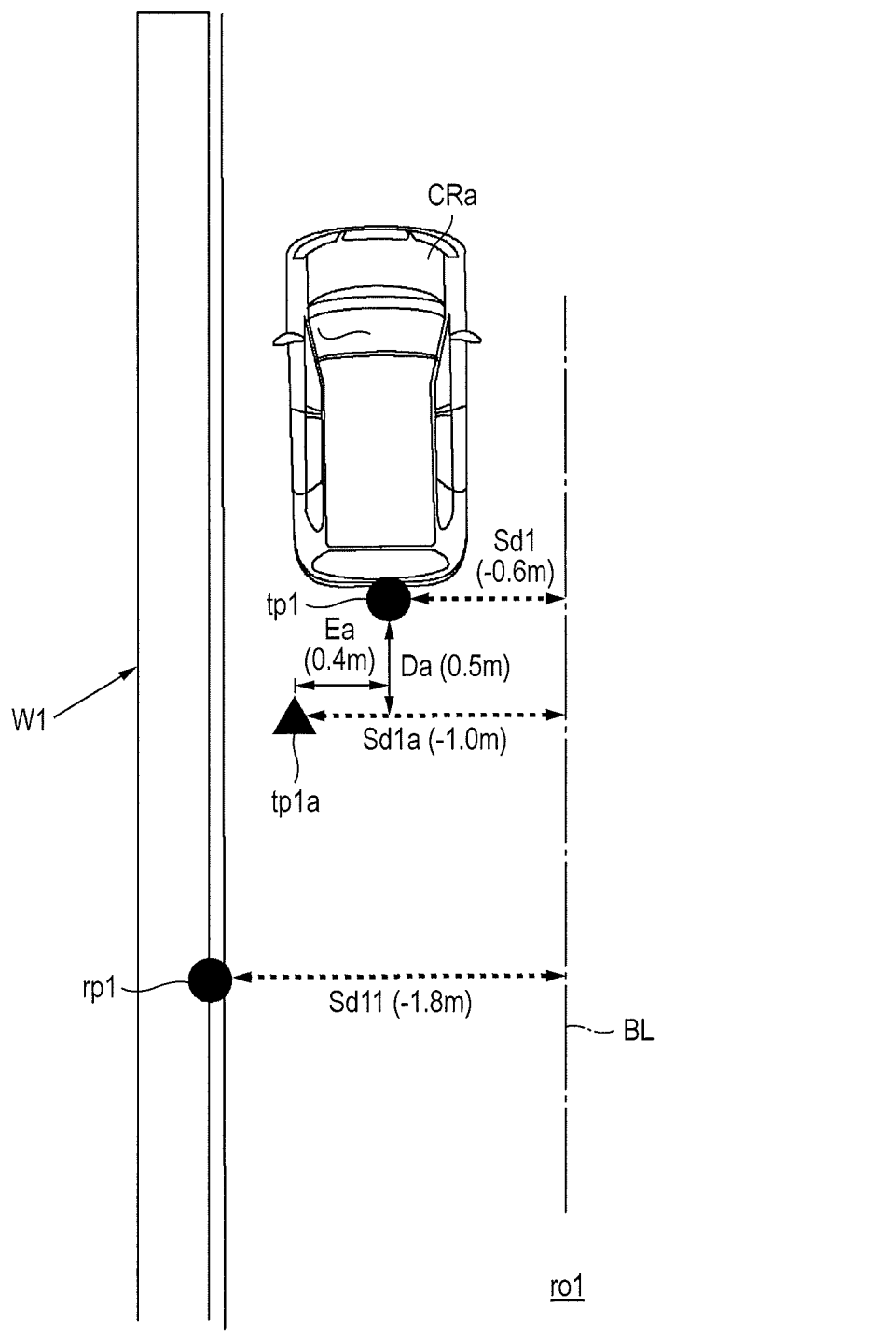
FIG. 15 is an enlarged view of a surrounding of a preceding vehicle.

Here, the respective targets in the processing of steps S201 and S202 of FIG. 7 (the processing from step S301 of FIG. 12 to step S311 of FIG. 13) are specifically exemplified with reference to FIGS. 14 and 15. FIG. 14 shows the past correspondence paired data to be filter-processed tp1a and the first previous time target tp1. FIG. 14 shows a plurality of targets in the area of the transmission wave of the beam pattern BA that is output from the transmission antenna 13 of the radar apparatus 1 mounted on the vehicle CR. In the meantime, a part of the beam pattern BA is missed. This indicates that the transmission wave is cut off by a left wall W1 and a right wall W2 existing at the left and right sides of the vehicle CR and thus does not penetrate the walls.

In FIG. 14, the first previous time target tp1 corresponding to the preceding vehicle CRa is shown at the front of the vehicle CR in the own traffic lane ro1 on which the vehicle CR is traveling and the relative transverse distance thereof is a relative transverse distance Sd1 (for example, −0.6 m) from the reference axis BL in the left vehicle width direction. Also, the past correspondence paired data tp1a that has the temporal continuity with the first previous time target tp1 and is to be filter-processed is shown at the left rear of the first previous time target tp1. Here, the position relation between the past correspondence paired data tp1a and the first previous time target tp1 is a relation shown in FIG. 15.

FIG. 15 is an enlarged view of the surrounding of the preceding vehicle CRa shown in FIG. 14. In FIG. 15, the relative transverse distance Sd1a (for example, −1.0 m) of the past correspondence paired data tp1a is smaller (and is larger as regards the absolute value) than the relative transverse distance Sd1 (for example, −0.6 m) of the first previous time target tp1. That is, the relative transverse distance of the past correspondence paired data tp1a has moved to the left position by a distance Ea (0.4 m) as time (for example, 50 msec) consumed to perform the target deriving processing of one time has elapsed from a time point at which the first previous time target tp1 is derived. Also, the longitudinal distance of the past correspondence paired data tp1a has moved to the rear position by a distance Da (0.5 m) as the time consumed to perform the target deriving processing of one time has elapsed from the time point at which the first previous time target tp1 is derived. That is, the preceding vehicle becomes closer to the vehicle CR.

Also, it is shown that the preceding vehicle CRa becomes closer to the left wall W1 than in the previous time processing, from the change in the relative transverse distance from the first previous time target tp1 corresponding to the preceding vehicle CRa to the past correspondence paired data tp1a. That is, it is shown that the preceding vehicle CRa becomes closer to a specific target rp1 (hereinafter, referred to as the 'left specific target rp1') (the left representative transverse distance Sd11, −1.8 m) existing at a position of the left representative transverse distance, as the time consumed to perform the target deriving processing of one time has elapsed. Meanwhile, in this case, as shown in FIG. 14, it is shown that the preceding vehicle CRa becomes distant from a specific target rp2 (hereinafter, referred to as the 'right specific target rp2')(the right representative transverse distance Sd12, 5.4 m) existing at a position of the right representative transverse distance of the right adjacent traffic lane ro2, as the time goes by.

Returning back to FIG. 7, after completing the derivation of the representative transverse distances of the left and right specific targets in the processing of step S202, the signal processing unit 18 determines whether the left representative transverse distance Sd11 of the left specific target rp1 is the relative transverse distance of the first previous time target tp1 or smaller (step S203). When the left representative transverse distance Sd11 is the relative transverse distance of the first previous time target tp1 or smaller (Yes in step S203) (for example, the relative transverse distance Sd1 (−0.6 m)>the left representative transverse distance Sd11 (−1.8 m)), the signal processing unit 18 executes processing of step S204. On the other hand, when the condition of step S204 is not satisfied, the signal processing unit 18 executes the processing of step S216.

Also, the signal processing unit 18 determines whether the right representative transverse distance Sd12 of the right specific target rp2 is the relative transverse distance of the first previous time target tp1 or larger (step S204). When the right representative transverse distance Sd12 of the right specific target rp2 is the relative transverse distance of the first previous time target tp1 or larger (Yes in step S204) (for example, the relative transverse distance S1 (−0.6 m)<the right representative transverse distance Sd12 (5.4 m)), the signal processing unit 18 executes processing of step S205. On the other hand, when the condition of step S204 is not satisfied, the signal processing unit 18 executes the processing of step S216. In the processing of step S203 and S204, the signal processing unit 18 determines whether the surrounding situation of the preceding vehicle CRa satisfies one (the specific targets exist at the left and right sides of the first previous time target) of the conditions determining the change of the filter constant of the past correspondence paired data tp1a to be filter-processed.

Then, the signal processing unit 18 determines whether the TIC of the first previous time target tp1 corresponding to the preceding vehicle CRa is 2 sec or longer (step S205). When the TTC is 2 sec or longer (Yes in step S205), the signal processing unit 18 determines whether the longitudinal distance of the first previous time target tp1 is 30 m or longer (step S206). In the processing of step S205, when the TTC of the first previous time target tp1 is shorter than 2 sec, since the time, which is consumed until the vehicle CR and the preceding vehicle CRa corresponding to the first previous time target tp1 collide with each other, is very short, the other conditions of changing the filter constant are satisfied, so that the signal processing unit 18 performs the filtering having high responsiveness by using the first filter constant. Also, when the TTC is 2 sec or longer, the signal processing unit 18 regards the collision possibility between the vehicle CR and the preceding vehicle CRa corresponding to the first previous time target tp1 to be small and determines that one (there is no target having a collision possibility in the vicinity of the vehicle CR) of the conditions determining the change of the filter constant is satisfied.

When the longitudinal distance of the first previous time target tp1 is 30 m or longer (Yes in step S206), the signal processing unit 18 performs processing of step S207. In the meantime, in the processing of step S206, the first previous time target tp1 having the longitudinal distance of 30 m or longer is an object moving target and the object moving target satisfies the other conditions of changing the filter constant, so that the filter constant is changed. Also, when the first previous time target tp1 is an object moving target, the past correspondence paired data tp1 a having the temporal continuity with the first previous time target tp1 becomes also the object moving target.

Then, the signal processing unit 18 determines whether the preceding vehicle CRa of this time processing becomes closer to the left or right specific target than in the previous time by using the 'relative transverse distance Sd1', the 'relative transverse distance Sd1a', the 'left representative transverse distance Sd11' and the 'right representative transverse distance Sd12', which are the relative transverse distances of the respective targets. Specifically, in the relation with the left specific target rp1, when the condition of '(the relative transverse distance Sd1a of the past correspondence paired data tp1a−the left representative transverse distance Sd11)<(the relative transverse distance Sd1 of the first previous time target tp1−the left representative transverse distance Sd11)' is satisfied, the signal processing unit 18 determines that the past correspondence paired data tp1a of this time processing is closer to the left specific target rp1 than in the previous time processing.

Also, in the relation with the right specific target rp2, when the condition of '(the right representative transverse distance Sd12−the relative transverse distance Sd1a of the past correspondence paired data tp1a)<(the right representative transverse distance Sd12−the relative transverse distance Sd1 of the first previous time target tp1)' is satisfied, the signal processing unit 18 determines that the past correspondence paired data tp1a of this time processing is closer to the right specific target rp2 than in the previous time processing.

Like this, in the processing of step S207 shown in FIG. 7, when the past correspondence paired data tp1a is closer to any one specific target (the left specific target rp1 or the right specific target rp2) in comparison to the first previous time target tp1 (Yes in step S207), the signal processing unit 18 executes processing of step S208 shown in FIG. 8. In the meantime, in the processing of step S207, when the relative transverse distances of the respective targets shown in FIG. 15 are applied, regarding the relation with the left specific target rp1, the condition of '(the relative transverse distance Sd1a of the past correspondence paired data tp1a−the left representative transverse distance Sd11)<(the relative transverse distance Sd1 of the first previous time target tp1−the left representative transverse distance Sd11)' is '−1.0 m−(−1.8 m)<−0.6 m−(−1.8 m)=0.8 m<1.2 m, so that the condition of the processing of step S207 is satisfied. On the other hand, when the condition of the processing of step S207 is not satisfied (No in step S207), the signal processing unit 18 executes the processing of step S216 shown in FIG. 9.

Then, the signal processing unit 18 derives a difference value of the relative transverse distances between the past correspondence paired data tp1a and the left specific target rp1, which corresponds to an interval value between the preceding vehicle CRa and the left wall W1. When the difference value is below a predetermined value that is the first value, the signal processing unit 18 changes the filter constant. Specifically, the signal processing unit 18 determines whether a value, which is obtained by subtracting the relative transverse distance Sd11 of the left specific target rp1 from the relative transverse distance Sd1a of the past correspondence paired data tp1a, is 2.2 m or smaller (step S208). When the difference value of the relative transverse distances is 2.2 m or smaller (Yes in step S208), the signal processing unit 18 executes processing of step S209. For example, in the position relation of the respective targets shown in FIG. 15, 'the relative transverse distance Sd1a−the left representative transverse distance Sd11' is −1.0−(−1.8)=0.8. That is, the difference value of the relative transverse distances satisfies the condition of 2.2 m or smaller. On the other hand, when the difference value of the relative transverse distances is larger than 2.2 m (No in step S208), the signal processing unit 18 executes processing of step S212. The processing of step S212 will be described later.

When the difference value of the relative transverse distances between the past correspondence paired data tp1a and the left specific target rp1, which is derived in the processing of step S208, is larger than a second value (for example, 0.5 m) smaller than the first value (No in step S209), the signal processing unit 18 changes the filter constant from the first filter constant to the second filter constant (step S210). That is, the filter constant (for example, the filter constant 0.95 of the predicted transverse distance and the filter constant 0.05 of this time transverse distance), which reduces the reflection amount of this time transverse distance in comparison to the first filter constant before the change, is set. By filtering the past correspondence paired data tp1a with the second filter constant, the signal processing unit 18 can securely derive the object moving target to be vehicle-controlled even when a stationary target exists in the surroundings. Here, in the position relation of the respective targets shown in FIG. 15, since the difference value between the past correspondence paired data tp1a and the left specific target rp1 is 0.8 m, the filter constant filtering the past correspondence paired data tp1a is changed from the first filter constant to the second filter constant.

Also, when the difference value of the relative transverse distances between the past correspondence paired data tp1a and the left specific target rp1 is 0.5 m or smaller (Yes in step S209), the signal processing unit 18 changes the filter constant from the first filter constant to a third filter constant (step S211). That is, the filter constant is changed to a filter constant (for example, the filter constant 1.0 of the predicted transverse distance and the filter constant 0 (zero) of this time transverse distance), which further reduces the reflection amount of this time transverse distance in comparison to the second filter constant. By filtering the past correspondence paired data tp1a with the third filter constant, the signal processing unit 18 can securely derive the object moving target to be vehicle-controlled even when a stationary target existing in the surrounding of the object moving target is closer to the object moving target.

Then, the signal processing unit 18 derives a difference value of the relative transverse distances between the 'past correspondence paired data tp1a' and the 'right specific target rp2', which corresponds to an interval value between the preceding vehicle CRa and the right wall W2, and changes the filter constant when the difference value of the relative transverse distances is a predetermined value or smaller, like the derivation of the difference value of the relative transverse distances between the 'relative transverse distance Sd1a of the past correspondence paired data tp1a' and the 'left representative transverse distance Sd11 of the left specific target rp1' in the processing of steps S208 and S209. Specifically, the signal processing unit 18 determines whether a value, which is obtained by subtracting the relative transverse distance Sd1a of the past correspondence paired data tp1a from the relative transverse distance Sd12 of the right specific target rp2, is below the first value (for example, 2.2 m or smaller) (step S212). When the difference value of the relative transverse distances is 2.2 m or smaller (Yes in step S212), the signal processing unit 18 executes processing of step S213. On the other hand, when the difference value of the relative transverse distances is larger than 2.2 m (No in step S212), the signal processing unit 18 performs processing of step S216.

When the difference value of the relative transverse distances between the past correspondence paired data tp1a and the right specific target rp2 is larger than the second value (for example, 0.5 m) smaller than the first value (No in step S212), the signal processing unit 18 changes the filter constant from the first filter constant to the second filter constant (step S214). That is, the filter constant (for example, the filter constant 0.95 of the predicted transverse distance and the filter constant 0.05 of this time transverse distance), which reduces the reflection amount of this time transverse distance in comparison to the first filter constant before the change, is set. By filtering the past correspondence paired data tp1a with the filter constant, the signal processing unit 18 can securely derive the object moving target to be vehicle-controlled such as the preceding vehicle CRa even when a stationary target exists in the surroundings.

Also, when the difference value of the relative transverse distances between the past correspondence paired data tp1a and the right specific target rp2 is 0.5 m or smaller (Yes in step S213), the signal processing unit 18 changes the filter constant from the first filter constant to the third filter constant (step S215). That is, the filter constant is changed to a filter constant (for example, the filter constant 1.0 of the predicted transverse distance and the filter constant 0 (zero) of this time transverse distance of the past correspondence paired data tp1a), which further reduces the reflection amount of this time transverse distance in comparison to the second filter constant. By filtering the past correspondence paired data tp1a corresponding to the object moving target with the third filter constant, the signal processing unit 18 can securely derive the object moving target to be vehicle-controlled even when a stationary target existing in the surrounding of the object moving target is closer to the object moving target.

Figure 16:
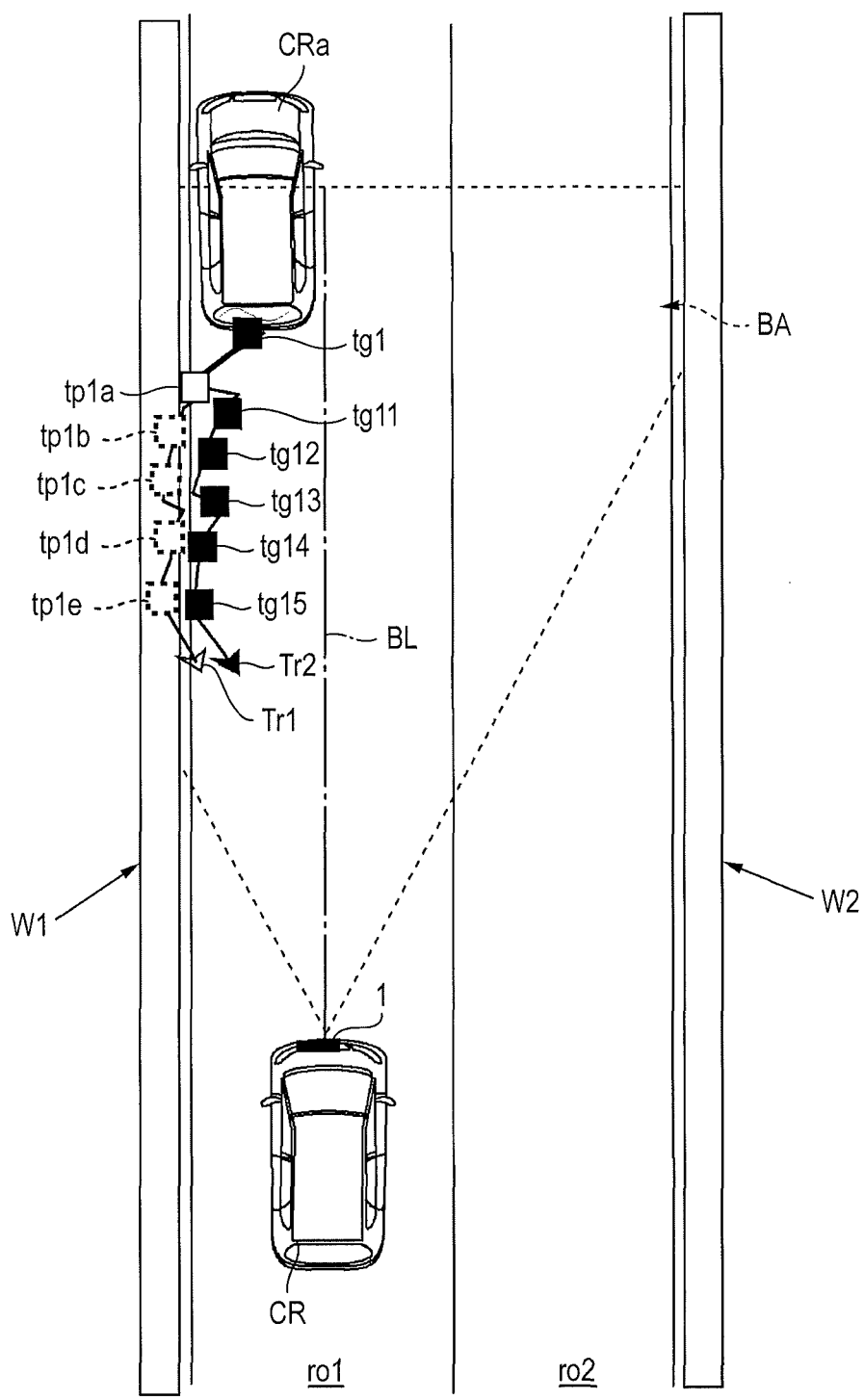
FIG. 16 is a view showing derivation situations of this time-decided target of a first filter constant and a this time-decided target of a second filter constant at each time.

Here, for example, as shown in FIG. 15, in the case where the interval between the past correspondence paired data tp1a of the preceding vehicle CRa and the left specific target rp1 of the left wall W1 is 0.8 m, an effect is described when the filter constant is changed from the first filter constant to the second filter constant with reference to FIG. 16. FIG. 16 shows derivation situations of a this time-decided target corresponding to the object moving target filtered by the first filter constant and a this time-decided target corresponding to the object moving target filtered by the second filter constant at each time. In FIG. 16, this time-decided target tg1 that is derived after the filtering processing, which corresponds to the preceding vehicle CRa, is shown in the area of the transmission wave of the beam pattern BA that is transmitted from the transmission antenna 13 of the radar apparatus 1 of the vehicle CR described in FIG. 15.

A trajectory Tr1 indicating a time-series moving path of this time-decided target shows a change in positions of this time-decided targets tg1a to tg1e derived by filtering the past correspondence paired data, which is derived in the processing after the derivation of this time-decided target tg1, with the first filter constant. Also, a trajectory Tr2 indicating a time-series moving path of this time-decided target, which is different from the trajectory Tr1, shows a change in positions of this time-decided targets tg11 to tg15 derived by filtering the past correspondence paired data, which is derived in the processing after the derivation of this time-decided target tg1, with the second filter constant. Here, as shown in FIG. 16, in the case of this time-decided target tg1a, the position of this time-decided target on the trajectory Tr1 is derived at a position adjacent to the left wall W1. However, in the processing thereafter, the transverse distances of this time-decided targets tg1b to tg1e are substantially the same as the transverse distance of the left wall W1. For this reason, the transverse distances of this time-decided targets tg1b to tg1e are not derived and the signal processing unit 18 of the radar apparatus 1 loses this time-decided targets tg1c to tg1e. Hence, the vehicle control device 2 cannot perform the appropriate vehicle control for a target that is to be controlled.

In contrast, as shown with the trajectory Tr2, the transverse distances of this time-decided targets tg11 to tg15 derived after this time-decided target tg1 are different from the transverse distance of the left wall W1. For this reason, the radar apparatus 1 can securely derive this time-decided targets tg11 to tg15 of the vehicle CRa and the vehicle control device 2 to which the target information of this time-decided target is input from the radar apparatus 1 can perform the appropriate vehicle control for a target that is to be controlled. Returning back to FIG. 8, when the filter constant is changed in the processing of step S216 (Yes in step S216), the signal processing unit 18 performs the filtering processing for the past correspondence paired data tp1a, based on the changed filter constant (step S225), as shown in FIG. 10. When the filter constant is not changed in step S216 of FIG. 8 (No in step S216), the signal processing unit 18 proceeds to processing of changing the filter constant on the basis of a condition different from the condition of the position relation between the past correspondence paired data tp1a and the specific targets (for example, the left specific target rp1) existing at the left and right side thereof. Specifically, when the position relation between the object moving target such as the preceding vehicle CRa and the adjacent moving target such as the adjacent vehicle, which is the specific target, satisfies the predetermined condition, the signal processing unit performs the processing of changing the filter constant.

<2-3. Filter Constant Change When Specific Target (Adjacent Moving Target) Exists>

Figure 9:
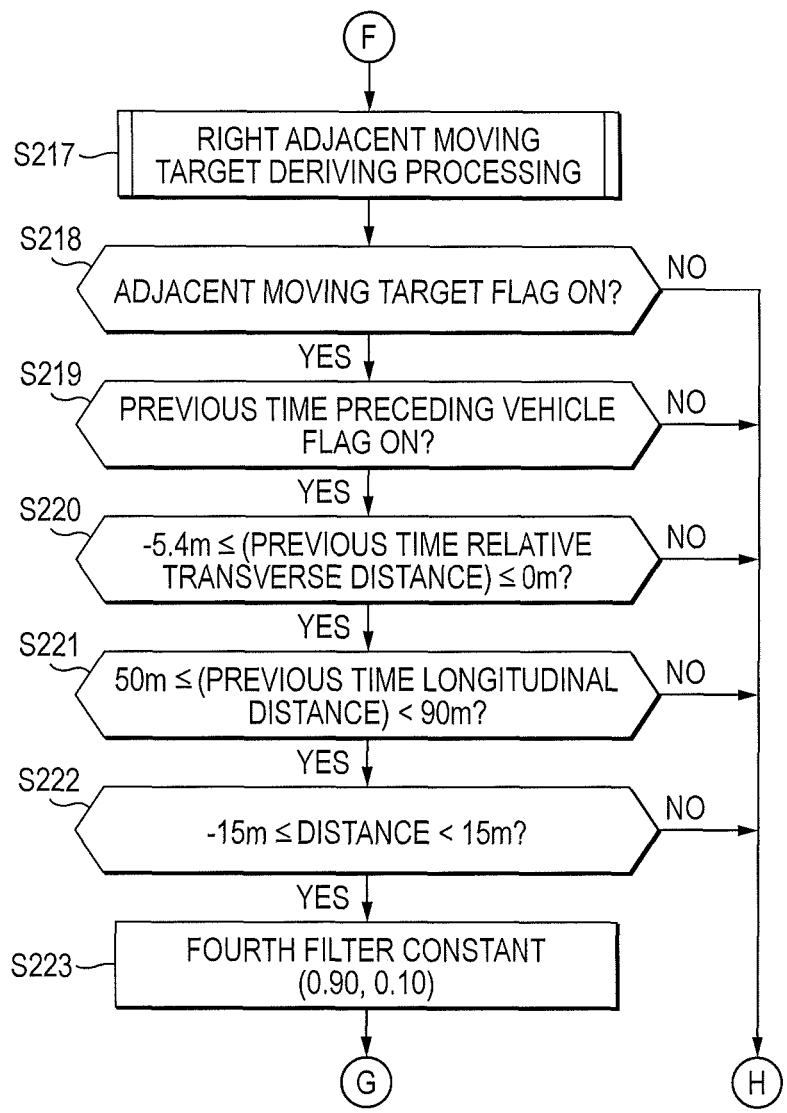
FIG. 9 is a flow chart showing the filtering processing according to the first illustrative embodiment.
Figure 17:
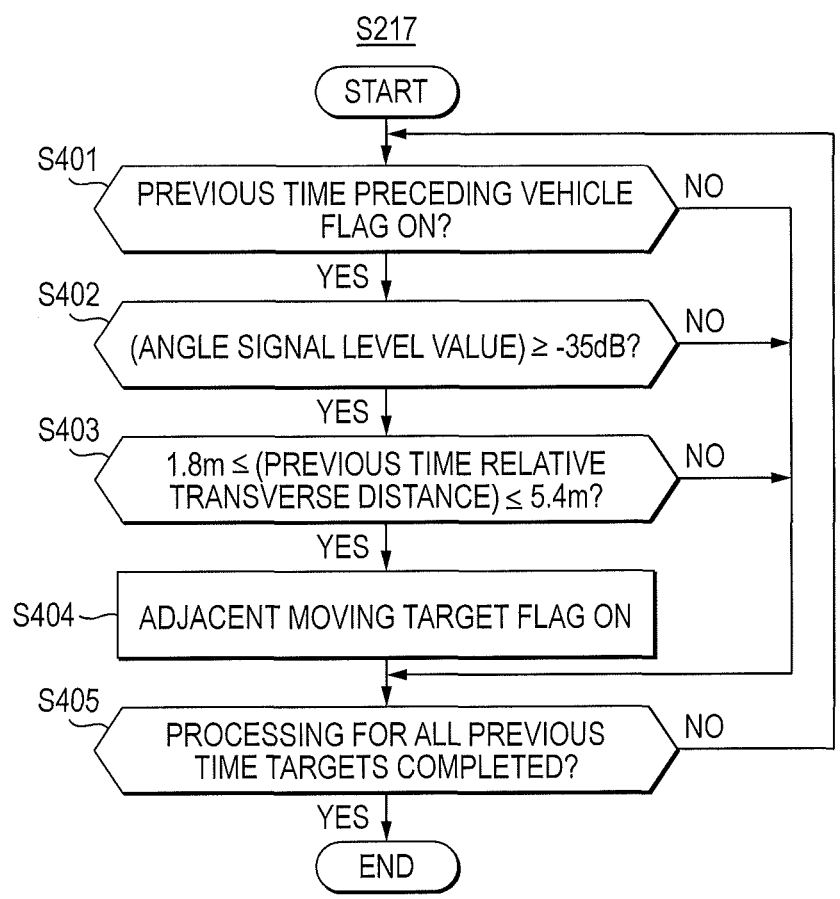
FIG. 17 is a flow chart showing processing of deriving an adjacent moving target in a right adjacent traffic lane.
Figure 18:
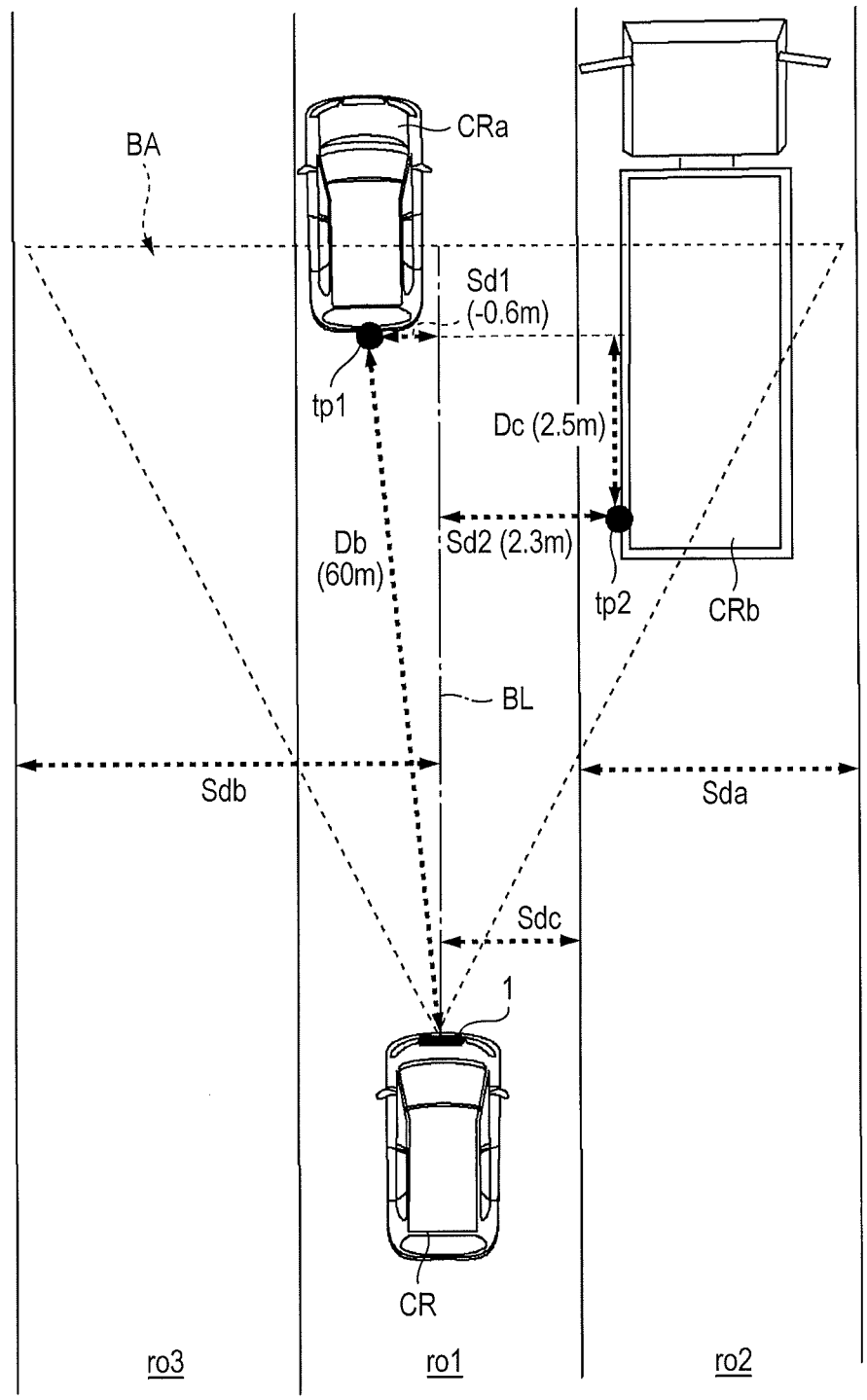
FIG. 18 is a view showing a position relation between a first previous time target and a second previous time target.

Then, the signal processing unit 18 performs processing of deriving the adjacent moving target, which is a specific target existing in the right adjacent traffic lane ro2 with respect to the own traffic lane ro1 on which the vehicle CR travels (step S217) (refer to FIG. 9). This processing is to determine whether an adjacent moving target (for example, an adjacent moving target corresponding to the adjacent vehicle CRb) exists in the right adjacent traffic lane ro2, as shown in FIG. 18. This processing is described with reference to a flow chart of FIG. 17. FIG. 17 is a flow chart showing processing of deriving an adjacent moving target in the right adjacent traffic lane (for example, the right adjacent traffic lane ro2 shown in FIG. 18).

As shown in FIG. 17, the signal processing unit 18 performs the processing for a second previous time target (for example, a second previous-time target tp2 shown in FIG. 18) having temporal continuity with another past correspondence paired data different from the past correspondence paired data that is to be filter-processed. That is, the signal processing unit performs the processing of determining whether the second previous time target having temporal continuity with another past correspondence paired data is an adjacent moving target.

The signal processing unit 18 determines whether a preceding vehicle flag of the second previous time target tp2 is ON (step S401). When a preceding vehicle flag of the second previous time target tp2 is ON (Yes in step S401), the signal processing unit 18 determines whether a signal level value of an angle spectrum of the second previous time target tp2 is −35 dB or higher (step S402).

When a signal level value of an angle spectrum of the second previous time target tp2 is −35 dB or higher (Yes in step S402), the signal processing unit 18 executes processing of step S403. In the processing of steps S401 and S402, the signal processing unit 18 determines whether there is a second previous time target having an angle spectrum of a predetermined signal level or higher in the moving targets at the front of the vehicle CR.

Then, the signal processing unit 18 determines whether the relative transverse distance of the second previous time target tp2 is within a range of 1.8 m to 5.4 m (step S403). When the relative transverse distance of the second previous time target tp2 satisfies the condition of the range of 1.8 m to 5.4 m (Yes in step S403), the signal processing unit 18 turns on an adjacent moving target flag of another past correspondence paired data having temporal continuity with the second previous time target tp2 (step S404). In the processing of steps S403 and S404, when each traffic lane width of the own traffic lane ro1 and the right adjacent traffic lane ro2 is 3.6 m and the vehicle CR is traveling at the substantial center of the own traffic lane ro1, the signal processing unit 18 determines whether the second previous time target tp2, which is a moving target (for example, a truck) having an angle spectrum of a predetermined signal level or higher, exists in the right adjacent traffic lane ro2.

When the second previous time target tp2 satisfies the conditions of steps S401 to S403 and one of the conditions of changing the filter constant is thus satisfied (the second previous time target tp2 corresponding to the adjacent moving target exists in the right adjacent traffic lane ro2), the signal processing unit 18 turns on an adjacent moving target flag of another past correspondence paired data having temporal continuity with the second previous time target tp2. On the other hand, when any one condition of steps S401 to S403 is not satisfied (No in step S401, No in step S402 or No in step S403), the signal processing unit 18 performs processing of step S405.

The signal processing unit 18 determines whether the processing of deriving the adjacent moving target is performed for all the second previous time targets (step S405). When the processing is completed for all the second previous time targets (Yes in step S405), the signal processing unit 18 ends the processing of step S217 and executes processing of step S218. On the other hand, when the processing is not completed for all the second previous time targets (No in step S405), the signal processing unit 18 returns to the processing of step S401 and executes the repeating processing.

Then, in the processing of step S217 shown in FIG. 9, the signal processing unit 18 determines whether there is the past correspondence paired data having the adjacent moving target flag of an ON state (step S218). When there is the past correspondence paired data having the adjacent moving target flag of an ON state (Yes in step S218), the signal processing unit 18 performs processing of step S219.

Here, the processing of step S217 and S218 is to determine whether the second previous time target tp2 having the temporal continuity with another past correspondence paired data is a target of the adjacent moving target. In contrast, processing of steps S219 to S222 is performed for the first previous time target tp1 having the temporal continuity with the past correspondence paired data that is to be filter-processed. The signal processing unit 18 determines whether the preceding vehicle flag of the first previous time target tp1 is ON (step S219). When the preceding vehicle flag of the first previous time target tp1 is ON (Yes in step S219), the signal processing unit 18 determines whether the relative transverse distance of the first previous time target tp1 is within a range of −5.4 m to 0 m (step S220). For example, as shown in FIG. 18, when the traffic lane width of the left adjacent traffic lane ro3 is 3.6 m and the vehicle CR is traveling at the substantial center of the own traffic lane ro1, the signal processing unit 18 determines that a condition is satisfied when the first previous time target tp1 exists within a range of a relative transverse distance Sdb from the reference axis BL (±0 m) to the right end (−5.4 m) of the left adjacent traffic lane ro3. In the meantime, the first previous time target having the preceding vehicle flag of an ON state in the processing of step S219 becomes an object moving target and the object moving target satisfies the other conditions of changing the filter constant, so that the filter constant is changed. Also, when the first previous time target is the object moving target, the past correspondence paired data having the temporal continuity with the first previous time target becomes also the object moving target.

Then, as shown in FIG. 9, the signal processing unit 18 determines whether the longitudinal distance of the first previous time target tp1 is within a range of 50 m to 90 m (step S221). When the longitudinal distance of the first previous time target tp1 is within a range of 50 m to 90 m (Yes in step S221), the signal processing unit determines whether the first previous time target tp1 exists within a range of −15 m to 15 m in the longitudinal direction with respect to the second previous time target tp2 (step S222). In the processing of step S222, the signal processing unit 18 determines whether the first previous time target tp1 exists at a position somewhat close to the second previous time target tp2 in the transverse direction and in the longitudinal direction. In the meantime, a distance of the longitudinal direction is a distance in which a traveling direction of the second previous time target is +(plus) and an opposite direction to the traveling direction of the second previous time target is −(minus), on the basis of the position of the second previous time target tp2 of ±0 m.

When the first previous time target tp1 exists within a range of ±15 m in the longitudinal direction with respect to the second previous time target tp2 (Yes in step S222), the signal processing unit 18 changes the filter constant to a filter constant (hereinafter, referred to as a 'fourth filter constant') (for example, the filter constant 0.90 of the predicted transverse distance and the filter constant 0.10 of this time transverse distance), which reduces the reflection amount of this time transverse distance in comparison to the first filter constant before the change and increases the reflection amount of this time transverse distance in comparison to the second filter constant. The fourth filter constant is a filter constant different from the second and third filter constants. However, the filter constants are compatible values that are derived by an experiment depending on the surrounding situations of the preceding vehicle corresponding to the past correspondence paired data.

When the determination condition in the respective processing of steps S218 to S222 is not satisfied (No in step S218, No in step S219, No in step S220, No in step S221 or No in step S222), the signal processing unit 18 executes processing of step S224 shown in FIG. 10.

Here, a specific condition of changing the filter constant is described with reference to FIG. 18 when the adjacent moving target exists. FIG. 18 shows a position relation between the first previous time target tp1 and the second previous time target tp2. An adjacent vehicle CRb of a truck traveling in the right adjacent traffic lane ro2 is shown in the beam pattern BA of the radar apparatus 1 of the vehicle CR. At a state where the preceding vehicle flag is ON (which correspond to Yes in step S401 shown in FIG. 17), the second previous time target tp2 of the adjacent vehicle CRb has a signal level value−35 dB or higher of the angle spectrum (which corresponds to Yes in step S402). When the reference axis BL of the radar apparatus 1 of the vehicle CR is positioned at the substantial center of the own traffic lane ro1, the relative transverse distance Sd2 (2.3 m) of the second previous time target tp2 satisfies a condition of the relative transverse distance 1.8 m or larger to 5.4 m or smaller (a range of a transverse distance Sda) (which corresponds to Yes in step S403).

In this case, the adjacent moving target flag of another past correspondence paired data having the temporal continuity with the second previous time target tp2 becomes ON (which corresponds to step S404). Since the adjacent moving target flag of the past correspondence paired data having the temporal continuity with the second previous time target tp2 is ON (Yes in step S218 shown in FIG. 9), the signal processing unit 18 determines whether the other conditions of changing the filter constant are satisfied, based on the first previous time target tp1 corresponding to the preceding vehicle CRa.

That is, since the preceding vehicle flag of the first previous time target tp1 is ON (which corresponds to Yes in step S219), the past correspondence paired data having the temporal continuity with the first previous time target tp1 becomes the past correspondence paired data of the object moving target. Also, the relative transverse distance Sd1 (−0.6 m) of the first previous time target tp1 satisfies the condition of the relative transverse distance−5.4 m or larger and 0 m or smaller (a range of the relative transverse distance Sdb) (which corresponds to Yes in step S220). Also, a longitudinal distance Db (60 m) of the first previous time target tp1 satisfies the condition of the longitudinal distance 50 m or larger and 90 m or smaller (which corresponds to Yes in step S221) and a distance Dc (2.5 m) between the first previous time target tp1 and the second previous time target tp2 satisfies the condition of the longitudinal distance of −15 m or larger and 15 m or smaller between the first previous time target and the second previous time target (which corresponds to Yes in step S222). Like this, when the second previous time target tp2 corresponding to the adjacent moving target exists at a position more spaced in the transverse distance with respect to the vehicle CR than the first previous time target tp1 corresponding to the first previous time target tp1 and the first previous time target tp1 exists in the vicinity of the second previous time target tp2, the signal processing unit 18 changes the filter constant from the first filter constant to the fourth filter constant that reduces the reflection amount of this time transverse distance (which corresponds to step S223), so that it can securely derive the object moving target without being influenced by the adjacent moving target.

Here, in the description of the processing of FIG. 9, in step S220, the condition of the relative transverse distance of the first previous time target is −5.4 m or larger and 0 m or smaller (the range of the relative transverse distance Sdb shown in FIG. 18). That is, the relative transverse distance 0 m or larger and 1.8 m or smaller shown in FIG. 18 (a range of a relative transverse distance Sdc) does not satisfy the condition. The reason is described with reference to FIG. 19.

Figure 19:
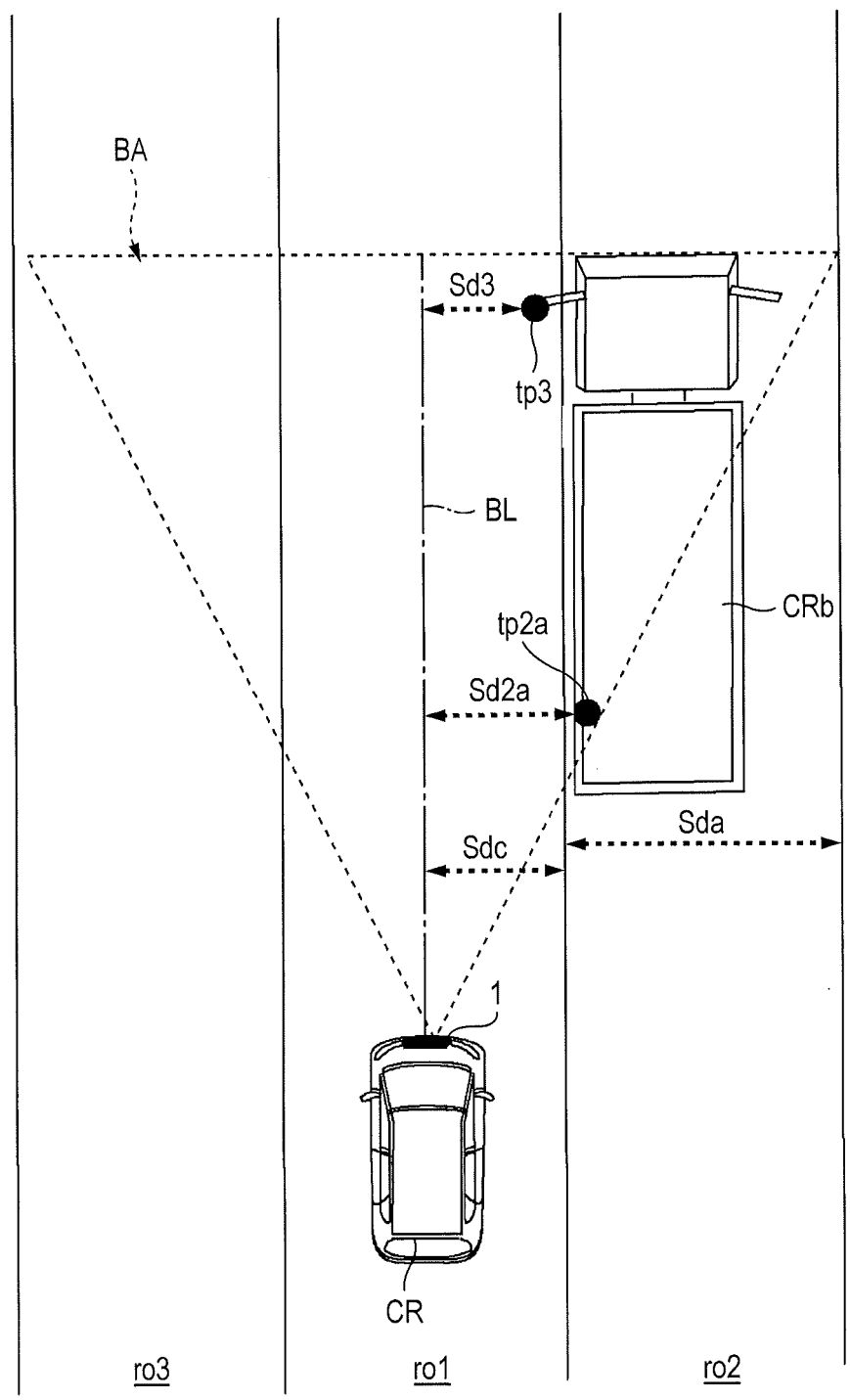
FIG. 19 shows a case where a target corresponding to a side mirror part of an adjacent vehicle exists in an own traffic lane.

FIG. 19 shows a case where a target tp3 corresponding to a side mirror part of the adjacent vehicle CRb exists in the own traffic lane ro1. As shown in FIG. 19, in a case where the adjacent vehicle CRb, which is traveling in the right adjacent traffic lane ro2, is traveling near to the own traffic lane ro1, when an attachment (for example, a side mirror) to the vehicle body of the adjacent vehicle CRb enters the own traffic lane ro1, a relative transverse distance of the target tp3 of previous time processing corresponding to the side mirror does not originally satisfy the condition of the processing of step S220 shown in FIG. 9. However, if the range of the relative transverse distance satisfying the condition of the processing of step S220 includes a range of the relative transverse distance 0 m or larger and 1.8 m or smaller and the relative transverse distance Sd3 satisfies the condition of step S220, the target tp3 also satisfies the other conditions of changing the filter constant (step S219, S221 and S222), so that the filter constant is changed to the fourth filter constant (step S223).

As a result, when the filter constant of the target (for example, the past correspondence paired data having the temporal continuity with a target tp2a of the previous time processing), which is another target of the adjacent vehicle CRb and does not satisfy the condition of changing the filter constant, is the first filter constant, the past correspondence paired data corresponding to the target tp3 is filtered with a filter constant (for example, the fourth filter constant) different from the target tp2a.

Also, even when the adjacent vehicle CRb moves from the position (refer to FIG. 19) slanting to the own traffic lane ro1 to a substantially central position of the right adjacent traffic lane ro2, this time-decided target corresponding to the target tp3 of the previous time processing may be derived at the position in the own traffic lane ro1 and this time-decided target corresponding to the adjacent vehicle CRb actually existing at the substantially central position of the right adjacent traffic lane ro2 may be erroneously derived as this time-decided target corresponding to the preceding vehicle and the like having a possibility that it exists in the own traffic lane ro1. As a result, the control that is not originally necessary as regards the control of the vehicle control device 2 such as the ACC may be performed. Hence, the range of the relative transverse distance 0 m or larger and 1.8 m or smaller including the relative transverse distance Sd3 is excluded from the range of changing the filter constant.

Like this, when the transverse distance of the second previous time target tp2 corresponding to the adjacent moving target is within the relative transverse distance Sda that is a first distance range and the relative transverse distance of the first previous time target tp1 corresponding to the moving target is within the relative transverse distance Sdb that is a second distance range, which is not included in the relative transverse distance Sda that is the first distance range, the signal processing unit 18 changes the filter constant from the first filter constant to the fourth filter constant. Thereby, the signal processing unit 18 can securely derive the object moving target existing within the predetermined range without being influenced by the adjacent moving target.

Returning back to the flow chart shown in FIG. 10, the signal processing unit 18 determines whether the filter constant has been changed (step S224). When the filter constant has been changed (Yes in step S224), the signal processing unit 18 filters the predicted transverse distance and this time transverse distance by the changed fourth filter constant (step S226). Thereby, the radar apparatus 1 can securely derive the object moving target and the vehicle control device 2 to which the target information of the object moving target is input from the radar apparatus 1 can perform the appropriate vehicle control for the target that is to be controlled.

Then, the signal processing unit 18 determines whether the filtering processing has been performed for all the past correspondence paired data that is to be filter-processed (step S227). When the processing has been performed for all the past correspondence paired data (Yes in step S227), the signal processing unit 18 ends the processing and performs the up-down object processing (step S111) that is next processing of the filtering processing (step S110) (refer to FIG. 5). On the other hand, when the processing has not been performed for all the past correspondence paired data (No in step S227), the signal processing unit 18 returns to the processing of step S201 shown in FIG. 7 and executes the repeating processing.

Figure 20:
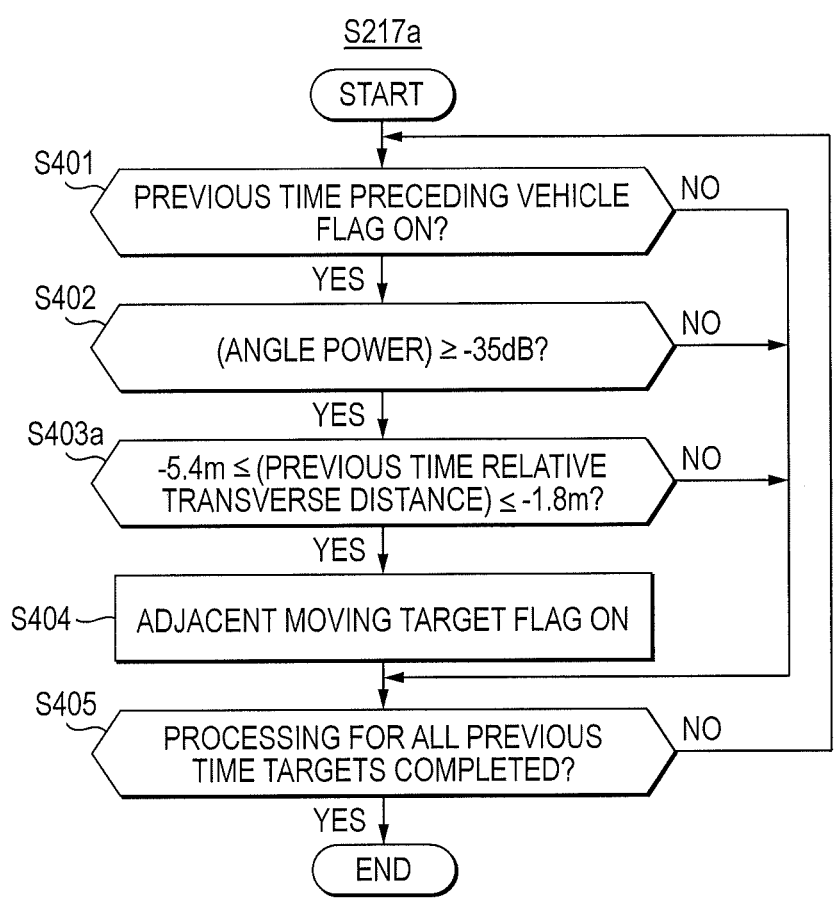
FIG. 20 is a flow chart showing processing of deriving an adjacent moving target in a left adjacent traffic lane.

On the other hand, when it is determined in step S224 of FIG. 10 that the filter constant has not been changed (No in step S224), the signal processing unit 18 performs processing of deriving the adjacent moving target existing in the left adjacent traffic lane ro3 with respect to the own traffic lane ro1 in which the vehicle CR is traveling (refer to FIG. 11) (step S217a). The detailed processing of deriving the adjacent moving target in the left adjacent traffic lane ro3 is shown in a flow chart of FIG. 20. FIG. 20 is a flow chart showing the processing of deriving the adjacent moving target in the left adjacent traffic lane ro3. The processing of FIG. 20 is substantially the same as the processing of deriving the adjacent moving target in the right adjacent traffic lane ro2 of FIG. 17, except for a range of the relative transverse distance (the relative transverse distance−5.4 m or larger and −1.8 m or smaller) of the adjacent moving target in step S403a. The processing is performed so as to derive the adjacent moving target in the left adjacent traffic lane ro3 opposite to the right adjacent traffic lane ro2 with respect to the own traffic lane ro1. The other processing is the same as that of FIG. 17.

Figure 11:
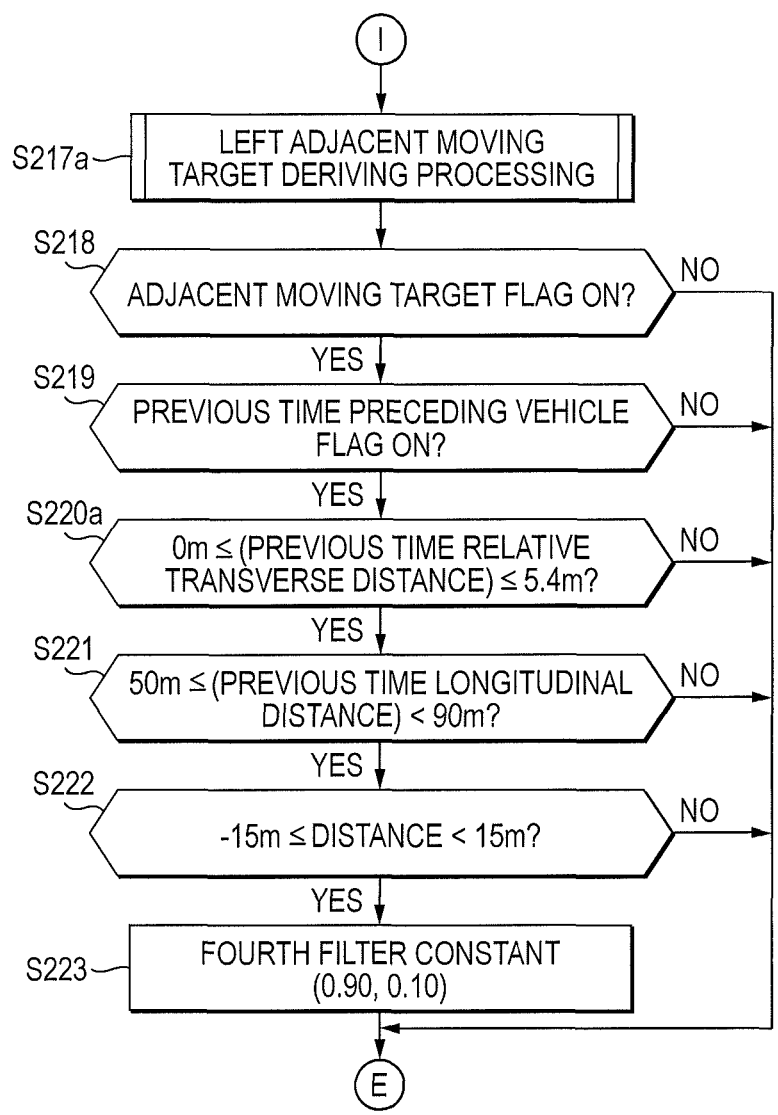
FIG. 11 is a flow chart showing the filtering processing according to the first illustrative embodiment.

Then, in the processing of step S217a shown in FIG. 11, the signal processing unit 18 determines whether the past correspondence paired data having the adjacent moving target flag of an ON state is derived (step S218a). When the past correspondence paired data having the adjacent moving target flag of an ON state exists (Yes in step S218a), the signal processing unit 18 executes the processing of step S219.

Here, the processing of steps S217a and S218a is to determine whether the second previous time target tp2 having the temporal continuity with another past correspondence paired data is a target of an adjacent moving target. In contrast, processing of steps S219 to S222 to be described below is performed for the first previous time target tp1 having the temporal continuity with the past correspondence paired data that is to be filter-processed. The signal processing unit 18 determines whether the preceding vehicle flag of the first previous time target tp1 is ON (step S219). When the preceding vehicle flag of the first previous time target tp1 is ON (Yes in step S219), the signal processing unit 18 determines whether the relative transverse distance of the first previous time target tp1 is within a range of 0 m to 5.4 m (step S220a). This range is a sum of the relative transverse distance Sdc (0 m to 1.8 m) and the relative transverse distance Sda (1.8 m to 3.6 m) shown in FIG. 18.

Then, the signal processing unit 18 determines whether the longitudinal distance of the first previous time target tp1 is 50 m or larger and smaller than 90 m (step S221). When the longitudinal distance of the first previous time target tp1 is 50 m or larger and smaller than 90 m (Yes in step S221), the signal processing unit 18 determines whether the first previous time target tp1 exists in a range of −15 m to 15 m in the longitudinal direction with respect to the adjacent vehicle (step S222). In the processing of step S222, the signal processing unit 18 determines whether the first previous time target tp1 exists at a position somewhat close to the second previous time target tp2 in the transverse direction and in the longitudinal direction.

When the first previous time target tp1 exists within a range of ±15 m in the longitudinal direction with respect to the second previous time target tp2 (Yes in step S222), the signal processing unit 18 changes the filter constant to the fourth filter constant, which reduces the reflection amount of this time transverse distance in comparison to the first filter constant before the change and increases the reflection amount of this time transverse distance in comparison to the second filter constant (step S223). On the other hand, when the determination condition in the respective processing of steps S218a to S222 is not satisfied (No in step S218a, No in step S219, No in step S220a, No in step S221 or No in step S222), the signal processing unit 18 executes processing of step S225. That is, since the condition of changing the filter constant is not satisfied, the signal processing unit changes the filter constant from the filter constant set in the previous time processing to the first filter constant (step S225) and performs the filtering for the past correspondence paired data that is to be filter-processed.

<Second Illustrative Embodiment>

In the below, a second illustrative embodiment is described. In the second illustrative embodiment, based on a change condition different from the change condition of the filter constant described in the first illustrative embodiment, when the corresponding condition is satisfied, the filter constant that is set as the first filter constant in advance is changed to another filter constant. For example, as a main condition, the signal processing unit 18 compares the relative transverse distance of this time processing of the object moving target and the relative transverse distance of the previous time processing and changes the filter constant from the first filter constant to another filter constant when the relative transverse distance of this time processing is shorter than the relative transverse distance of the previous time processing. The second illustrative embodiment is substantially the same as the first illustrative embodiment as regards the configuration and the processing but the processing thereof is partially different.

In the second illustrative embodiment, the filtering processing is described with reference to processing flow charts shown in FIGS. 21 to 26.

<3. Processing Flow Chart>
<3.1. Filter Constant Change Based on Relative Transverse Distance of Previous Time Processing and Relative Transverse Distance of This Time Processing>

FIGS. 21 to 26 are processing flow charts of the second illustrative embodiment. The signal processing unit 18 determines whether a flag (hereinafter, referred to as a 'representative flag') is on, which becomes on when the first previous time target (for example, a first previous time target tp101 shown in FIG. 27) having temporal continuity with the past correspondence paired data (for example, past correspondence paired data tp101a shown in FIG. 27 (which will be described later)) that is to be filter-processed is a moving target that has the shortest longitudinal distance to the vehicle CR in the previous time processing and the absolute transverse distance within a range of the own traffic lane ro1 (for example, within the absolute transverse distance±1.8 m) (step S501). When the representative flag of the first previous time target tp101 is ON (Yes in step S501), the signal processing unit 18 executes processing of step S502.

Also, when the representative flag of the first previous time target tp101 is OFF (No in step S501), the signal processing unit 18 turns off a filter change flag (step S520), which is an index indicative of the past correspondence paired data for which the processing of changing the filter constant is performed, and executes processing of step S506. That is, when the filter change flag of the first previous time target tp101 of the previous time processing having the temporal continuity with the past correspondence paired data tp101a that is to be filter-processed is ON, since the past correspondence paired data tp101a that is to be filter-processed does not satisfy one (for example, step S501) of the conditions of changing the filter constant in this time processing, the signal processing unit turns off the filter change flag. Also, when the filter change flag of the first previous time target tp101 is OFF, the signal processing unit 18 turns off the filter change flag of the past correspondence paired data tp101a.

The signal processing unit 18 determines whether the own traffic lane probability of the first previous time target tp101 is 50% or higher by using the map data of the own traffic lane probability stored in the memory 182 through the information on the longitudinal distance and relative transverse distance of the first previous time target (step S502). Then, when the own traffic lane probability of the first previous time target tp101 is 50% or higher (Yes in step S502), the signal processing unit 18 executes processing step S503. Here, the reason to derive the own traffic lane probability for the first previous time target tp101 having the representative flag of an ON state (the absolute transverse distance is within ±1.8 m) is as follows: since there is a case (for example, when a value of a curve radius is smaller than a predetermined value, a target may not exist in the own traffic lane ro1) where a target within a range of the absolute transverse distance±1.8 m may not exist in the own traffic lane ro1, depending on a value of a curve radius of the traffic lane in which the vehicle CR is traveling, the signal processing unit determines whether the first previous time target tp101 exists in the own traffic lane ro1, by using the own traffic lane probability value based on the relative transverse distance. Thereby, it is possible to precisely determine whether the first previous time target tp101 having the temporal continuity with the past correspondence paired data tp101a to be filter-processed exists in the own traffic lane ro1.

On the other hand, when the own traffic lane probability of the first previous time target tp101 is below 50% (No in step S502), the signal processing unit 18 determines whether an absolute value of the transverse distance difference, which is obtained by subtracting the predicted transverse distance from this time transverse distance of the past correspondence paired data tp101a to be filter-processed, is 1.5 m or smaller (step S503).

When an absolute value of the transverse distance difference is 1.5 m or smaller (Yes in step S503), the signal processing unit 18 executes processing of step S504. When an absolute value of the transverse distance difference is larger than 1.5 m (No in step S503), the signal processing unit performs processing of step S505. Meanwhile, in the processing of step S503, even though the first previous time target tp101 exists in the own traffic lane ro1, when the longitudinal distance of the first previous time target tp101 is a somewhat spaced distance (for example, 90 m or larger), the signal processing unit 18 may determine that the own traffic lane probability is below 50%. Therefore, in order to avoid a situation where the processing of changing the filter constant is not performed despite the past correspondence paired data for which the filter constant is changed, even when the own traffic lane probability of the first previous time target tp101 is determined to be below 50%, the past correspondence paired data tp101a having the temporal continuity with the first previous time target tp101 having the absolute value of the transverse distance difference between this time transverse distance and the predicted transverse distance within a predetermined range is set as an object for which the processing of changing the filter constant is performed.

Then, the signal processing unit 18 turns on the filter change flag, which is an index indicative of an object for which the processing of changing the filter constant is performed, for the past correspondence paired data tp101a that satisfies the condition (any one condition of steps S502 and S503) and is to be filter-processed (step S504).

When the longitudinal distance of the first previous time target tp101 is 50 m or larger and smaller than 100 m (Yes in step S505), the signal processing unit 18 determines whether the first previous time target tp101 is a target that is continuously derived during the scanning of 40 scans (for example, 50 msec/scan) in the target deriving processing up to now (step S506). When the target satisfying the condition of the filter constant changing processing is derived, if the signal processing unit 18 immediately performs the filter constant changing processing for the target, the filter constant changing processing may be performed for a wrong object (for example, a ghost target that does not actually exist at the derived position) for which the filter constant changing processing should not be performed. In order to avoid this situation, the processing of step S506 is executed. That is, the signal processing unit determines whether the condition of changing the filter constant is satisfied, for the target that is continuously derived in the plurality of number of times of the target deriving processing.

When the target having the temporal continuity with the first previous time target tp101 is continuously derived during the scanning of 40 scans up to now (Yes in step S506), the signal processing unit 18 determines whether the mirror flag of the first previous time target tp101 is OFF (step S507). When the mirror flag is OFF (Yes in step S507), the signal processing unit executes processing of step S508 shown in FIG. 22.

On the other hand, when the condition is not satisfied in the processing of steps S505 to 507 (No in step S505, No in step S506 or No in step S507), the signal processing unit 18 executes processing of step S801 shown in FIG. 26, which will be described later.

Figure 22:
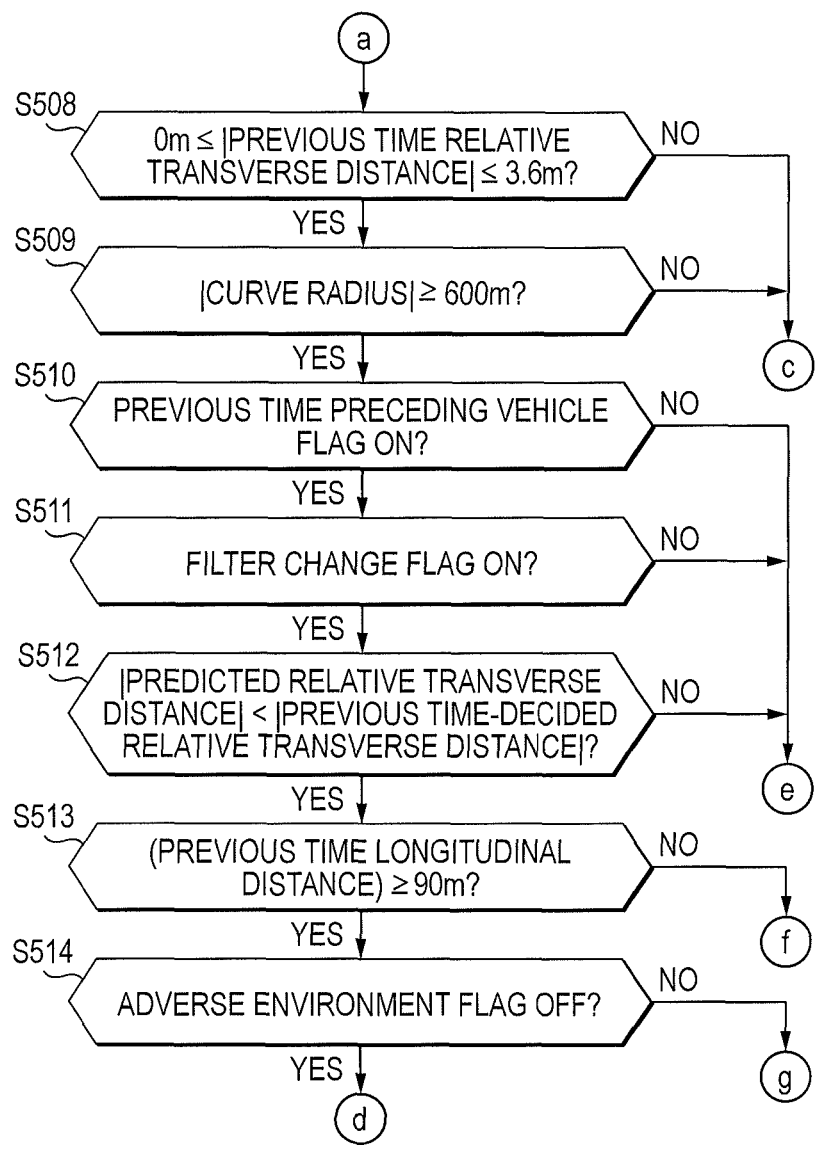
FIG. 22 is a processing flow chart of the second illustrative embodiment.

Then, the signal processing unit 18 determines whether the absolute value of the relative transverse distance of the first previous time target tp101 is within a range of 0 m to 3.6 m (step S508 shown in FIG. 22). When the absolute value of the relative transverse distance is within a range of 0 m to 3.6 m (Yes in step S508), the signal processing unit 18 acquires the information on the curve radius of the traffic lane in which the vehicle CR is traveling upon performing the processing of deriving the first previous time target tp101 and determines whether an absolute value of the curve radius is 600 m or larger (step S509). When the absolute value of the curve radius is 600 m or larger (Yes in step S509), the signal processing unit 18 executes processing of step S510.

In the processing of step S509, when the traffic lane in which the vehicle CR is traveling is one of a relatively gentle curve and a line, the signal processing unit 18 determines that the condition is satisfied. When the traffic lane is a relatively sharp curve, the signal processing unit determines that the condition is not satisfied. In the case of the relatively sharp curve, since a curve radius of the traffic lane in which the vehicle CR is traveling is different from a curve radius of the traffic lane in which the preceding vehicle existing at the front of the vehicle CR is traveling, in many cases, it is necessary to use the first filter constant, which increases the filter constant of the predicted transverse distance based on the previous time-decided transverse distance, based on the determination results of the other change conditions of the filter constant.

On the other hand, when the condition is not satisfied in the processing of steps S508 and S509 (No in step S508 or No in step S509), the signal processing unit 18 executes processing of step S801 shown in FIG. 26, which will be described later.

Then, the signal processing unit 18 determines whether the preceding vehicle flag of the first previous time target tp101 is ON (step S510). When the preceding vehicle flag of the first previous time target tp101 is ON (Yes in step S510), the signal processing unit 18 executes processing of step S511. In the meantime, in the processing of step S509, the first previous time target tp101 having the preceding vehicle flag of an ON state becomes an object moving target and the object moving target satisfies the other change conditions of the filter constant, so that the filter constant is changed. Also, when the first previous time target tp101 is an object moving target, the past correspondence paired data tp101a having the temporal continuity with the first previous time target tp101 becomes also the object moving target.

Then, the signal processing unit 18 determines whether the filter change flag of the first previous time target tp101 is ON (step S511). When the filter change flag of the first previous time target tp101 is ON (Yes in step S511), the signal processing unit executes processing of step S513 if an absolute value of the predicted relative transverse distance (this time transverse distance−previous time-decided transverse distance+previous time-decided relative transverse distance), which is obtained by subtracting the previous time-decided transverse distance from this time transverse distance and then adding the relative transverse distance of the target of the previous time processing (hereinafter, referred to as 'previous time-decided relative transverse distance'), is smaller than an absolute value of the previous time-decided relative transverse distance (Yes in step S512). That is, the signal processing unit 18 determines that the condition is satisfied when the transverse distance of this time processing of the first previous time target tp101 is shorter than the transverse distance of the previous time processing.

Figure 25:
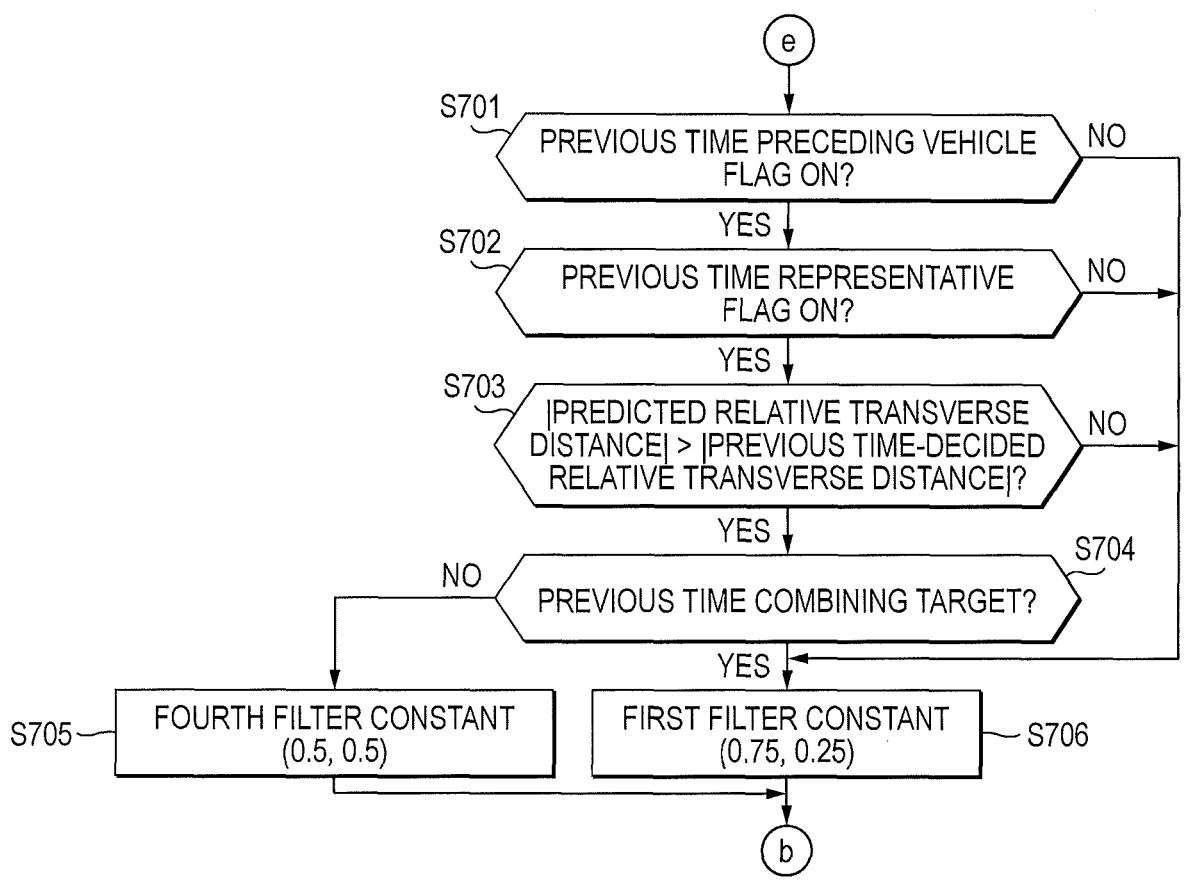
FIG. 25 is a processing flow chart of the second illustrative embodiment.

On the other hand, when any one condition is not satisfied in the processing of steps S510, S511 and S512 (No in step S510, No in step S511 or No in step S512), the signal processing unit 18 executes processing of step S701 shown in FIG. 25, which will be described later.

Returning back to FIG. 22, the signal processing unit 18 determines whether the longitudinal distance of the first previous time target tp101 is 90 m or longer (step S513).

When the longitudinal distance of the first previous time target tp101 is 90 m or longer (Yes in step S513), the signal processing unit 18 executes processing of step S514. On the other hand, when the longitudinal distance of the first previous time target tp101 is shorter than 90 m (No step S513), the signal processing unit 18 executes processing of step S601 shown in FIG. 24, which will be described later.

Then, the signal processing unit 18 determines whether an adverse environment flag, which is an index indicative of whether the surrounding environment of the first previous time target tp101 is an environment in which there are relatively many stationary targets (specific targets), is OFF (step S514). The adverse environment flag becomes ON for the first previous time target tp101 so as to indicate that, when 80 or more peak signals corresponding to the stationary target of the UP section are extracted in the stationary object peak extraction of step S105 of FIG. 4, the target deriving processing is executed in the environment, in which there are relatively many stationary targets, in the unwanted matter determination processing of step S114 of FIG. 6.

Figure 23:
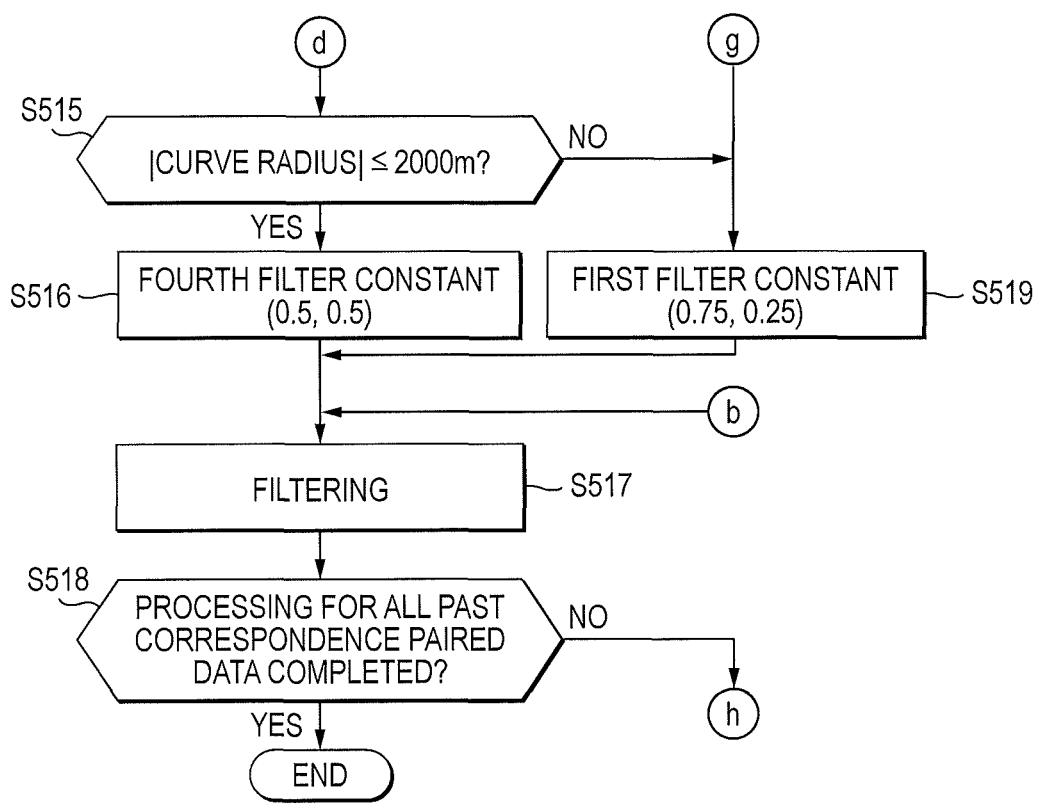
FIG. 23 is a processing flow chart of the second illustrative embodiment.

When the adverse environment flag of the first previous time target tp101 is OFF (Yes in step S514), the signal processing unit 18 executes processing of step S515 shown in FIG. 23. On the other hand, when the adverse environment flag is ON (No in step S514), the signal processing unit 18 changes the filter constant from the filter constant set in the previous time processing to the first filter constant, as shown in FIG. 23 (step S519) and then executes the filtering for the past correspondence paired data tp101a that is to be filter-processed (step S517). Like this, when the adverse environment flag is ON, since there is a possibility that the past correspondence paired data tp101a to be filter-processed is derived by the mis-pairing, the signal processing unit 18 performs the filtering with the first filter constant having increased the reflection amount of the predicted transverse distance in comparison to the filter constant of this time transverse distance.

Then, the signal processing unit 18 determines whether the absolute value of the curve radius is 2000 m or larger (step S515), based on the information (acquired from the vehicle control device 2) on the curve radius of the traffic lane, in which the vehicle CR is traveling, in the previous time processing. When the absolute value of the curve radius is 2000 m or larger (Yes in step S515), the signal processing unit changes the filter constant from the first filter constant to the fourth filter constant (step S516). That is, the signal processing unit 18 changes the filter constant to the filter constant (for example, the filter constant 0.5 of the predicted transverse distance and the filter constant 0.5 of this time transverse distance) that increases the reflection amount of this time transverse distance in comparison to the first filter constant before the change. By filtering the past correspondence paired data with the fourth filter constant (step S517), the signal processing unit 18 can securely derive the object moving target corresponding to the preceding vehicle CRa and the vehicle control device 2 to which the target information of the object moving target is input from the radar apparatus 1 can perform the appropriate vehicle control for the target that should be to be controlled.

Then, the signal processing unit 18 determines whether the processing is completed for all the past correspondence paired data that is to be filter-processed (step S518). When the processing is completed (Yes in step S518), the signal processing unit ends the processing. On the other hand, when the processing is not completed (No in step S518), the signal processing unit returns to the processing of step S501 shown in FIG. 21 and executes the repeating processing.

Also, in step S515, when the absolute value of the curve radius is smaller than 2000 m, the signal processing unit 18 executes the filtering by the first filter constant (step S517). That is, when the curve radius is smaller than a predetermined value (for example, 2000 m) and the longitudinal distance is a predetermined value (for example, 90 m) or larger, an error is apt to occur as regards the own traffic lane probability value derived in step S502. For this reason, since there is a high possibility that the first previous time target tp101 having the temporal continuity with the past correspondence paired data that is to be filter-processed is not the object moving target, the filtering processing is performed on the basis of the first filter constant (step S517).

Figure 27:
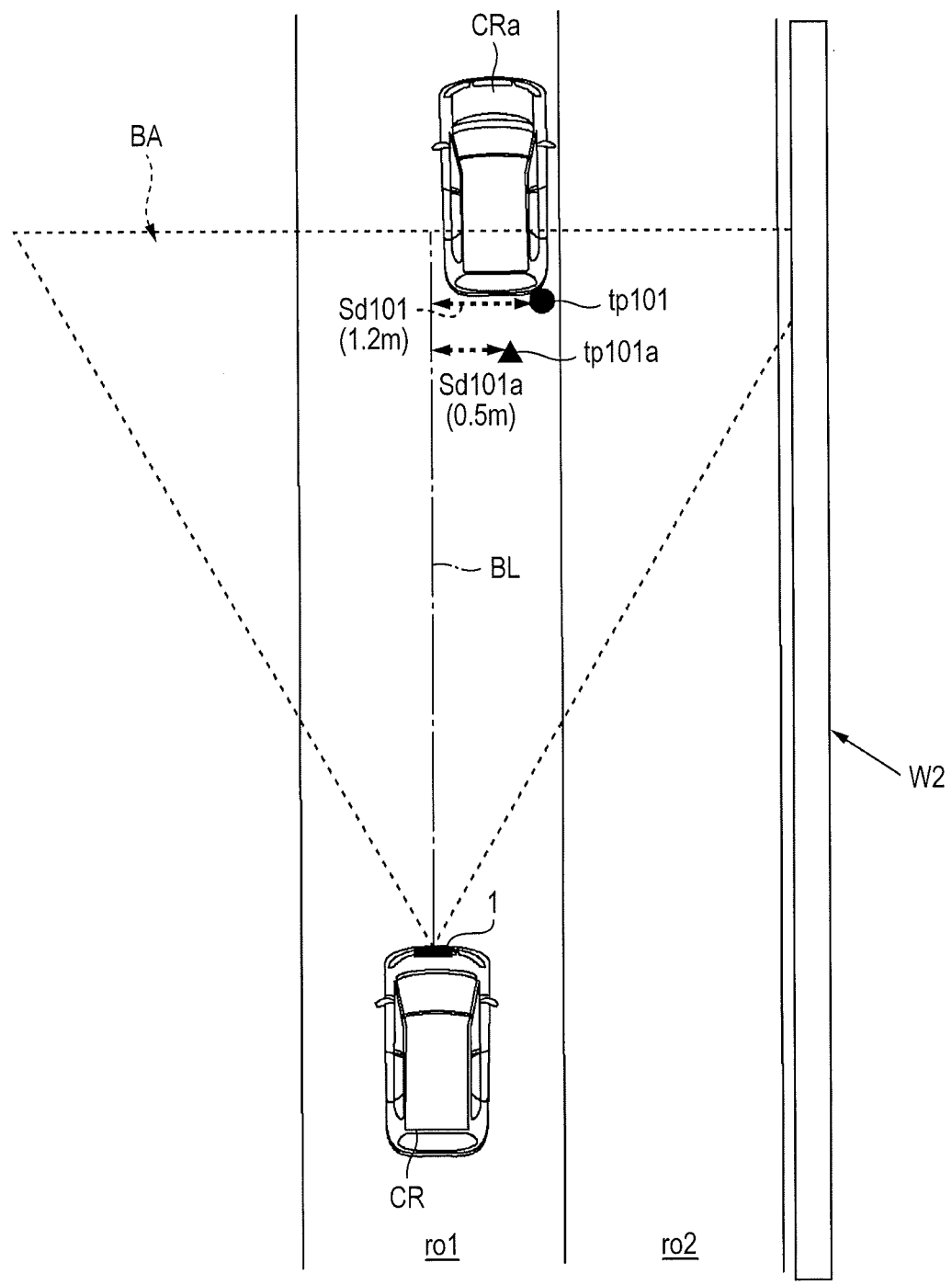
FIG. 27 is a view showing past correspondence paired data and a first previous time target.

Here, when the filter constant is changed (for example, the filter constant is changed from the first filter constant to the fourth filter constant), a specific position relation of the object moving target and the like are described with reference to FIG. 27. FIG. 27 shows the past correspondence paired data tp101a and the first previous time target tp101. FIG. 27 shows a part of the target that is derived in the area of the transmission wave of the beam pattern BA output from the transmission antenna 13 of the radar apparatus 1 mounted on the vehicle CR. In the meantime, the right wall W2 exists at the right of the right adjacent traffic lane ro2.

The previous time-decided transverse distance Sd101 of the first previous time target tp101 and this time transverse distance Sd101a of the past correspondence paired data tp101a are compared. When this time transverse distance Sd101a is shorter than the previous time-decided transverse distance Sd101, the signal processing unit 18 changes the filter constant from the first filter constant to the fourth filter constant. Specifically, the first previous time target tp101 of the preceding vehicle CRa is shown at the front of the vehicle CR in the own traffic lane ro1 in which the vehicle CR is traveling, and the transverse distance thereof is the previous time-decided transverse distance Sd101 (for example, 1.2 m) from the reference axis BL to the first previous time target tp101 in the right vehicle width direction. Also, the past correspondence paired data tp101a that has the temporal continuity with the first previous time target tp101 and is to be filter-processed is shown at the left rear of the first previous time target tp101. That is, this time transverse distance Sd101a (for example, 0.5 m) of the past correspondence paired data tp101a is set to be smaller than the previous time-decided transverse distance Sd101 (for example, 1.2 m) of the first previous time target tp101. In other words, the transverse distance of this time processing of the object moving target is set to be shorter than the transverse distance of the previous time processing (which corresponds to Yes in step S512). When the other conditions of changing the filter constant are satisfied, the signal processing unit 18 changes the filter constant from the first filter constant to the fourth filter constant.

Figure 28:
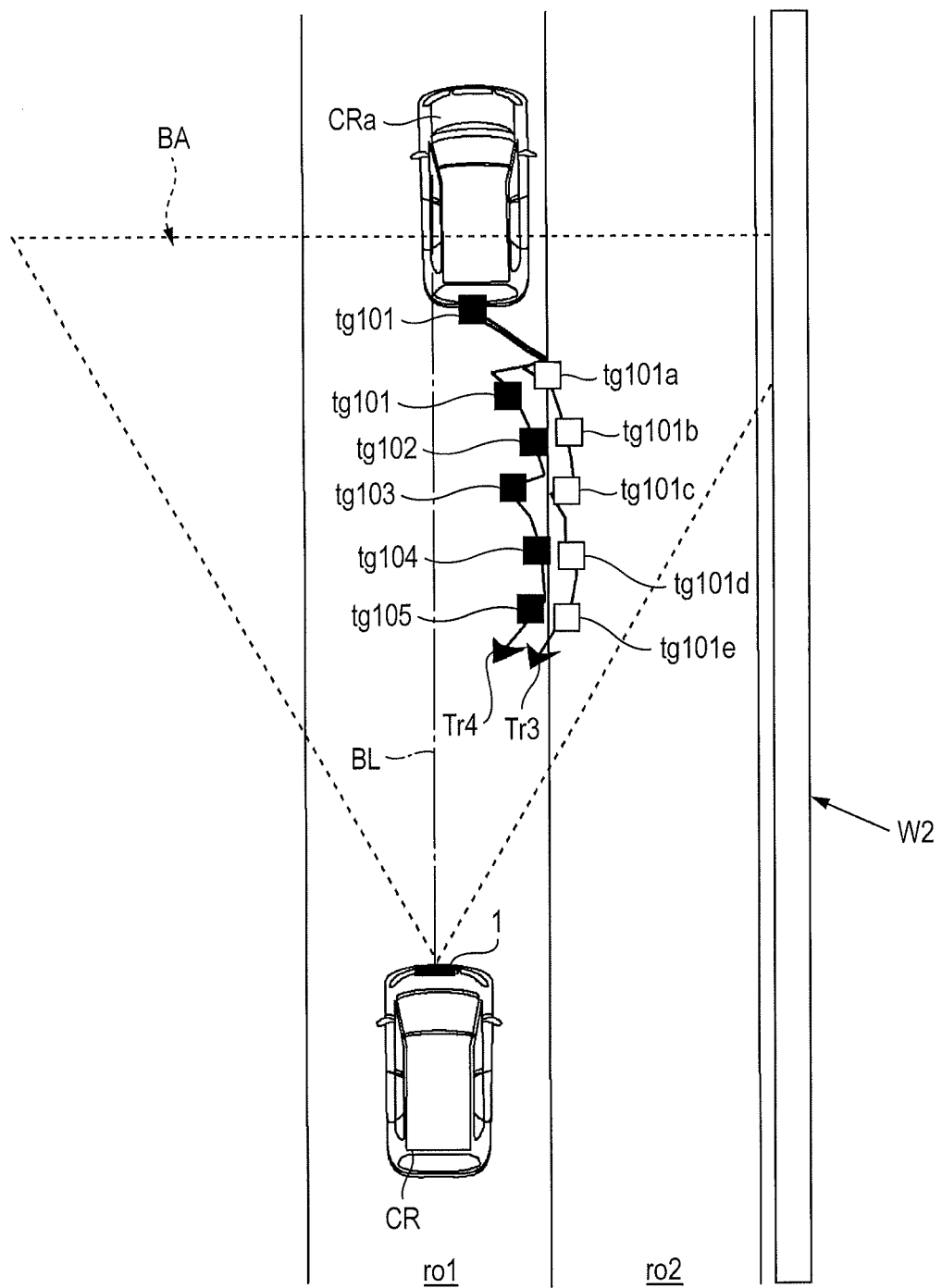
FIG. 28 is a view showing derivation situations of this time-decided target of a first filter constant and this time-decided target of a fourth filter constant at each time.

Here, for example, an effect is described when the filter constant is changed from the first filter constant to the fourth filter constant with reference to FIG. 28. FIG. 28 shows derivation situations of this time-decided target filtered with the first filter constant and this time-decided target filtered with the fourth filter constant at each time.

In FIG. 28, this time-decided target tg101 after the filtering processing, which corresponds to the preceding vehicle CRa, is shown in the area of the transmission wave of the beam pattern BA that is transmitted from the transmission antenna 13 of the radar apparatus 1 of the vehicle CR described in FIG. 27.

A trajectory Tr3 indicating a time-series moving path of this time-decided target shows a change in positions of this time-decided targets tg101a to tg101e derived by filtering the past correspondence paired data, which is derived in the processing after the derivation of this time-decided target tg101, with the first filter constant. Also, a trajectory Tr4 indicating a time-series moving path of this time-decided target, which is different from the trajectory Tr3, shows a change in positions of this time-decided targets tg101 to tg105 derived by filtering the past correspondence paired data, which is derived in the processing after the derivation of this time-decided target tg101, with the fourth filter constant.

Here, as shown in FIG. 28, this time-decided target on the trajectory Tr3 has a tendency that this time-decided targets tg101a to tg101e are positioned in the right adjacent traffic lane ro2. As a result, the transverse distance of this time-decided target that is derived by the signal processing unit 18 is 1.8 m or larger with respect to the reference axis BL, and this time-decided target may not be a control target of the ACC although the preceding vehicle CRa corresponding to this time-decided target actually exists in the own traffic lane ro1. As a result, the vehicle control device cannot perform the appropriate vehicle control for a target that is to be controlled.

In contrast, as shown with the trajectory Tr4, regarding this time-decided target filtered with the fourth filter constant and derived, the transverse distances of this time-decided targets tg101 to tg105 derived after this time-decided target tg101 are in the own traffic lane ro1 and the transverse distance of this time-decided target derived by the signal processing unit 18 is below 1.8 m with respect to the reference axis BL. As a result, the radar apparatus 1 can securely derive this time-decided target corresponding to the preceding vehicle CRa existing in the own traffic lane ro1. Also, the vehicle control device 2 to which the target information of this time-decided target is input from the radar apparatus 1 can perform the appropriate vehicle control for a target that is to be controlled.

Figure 24:
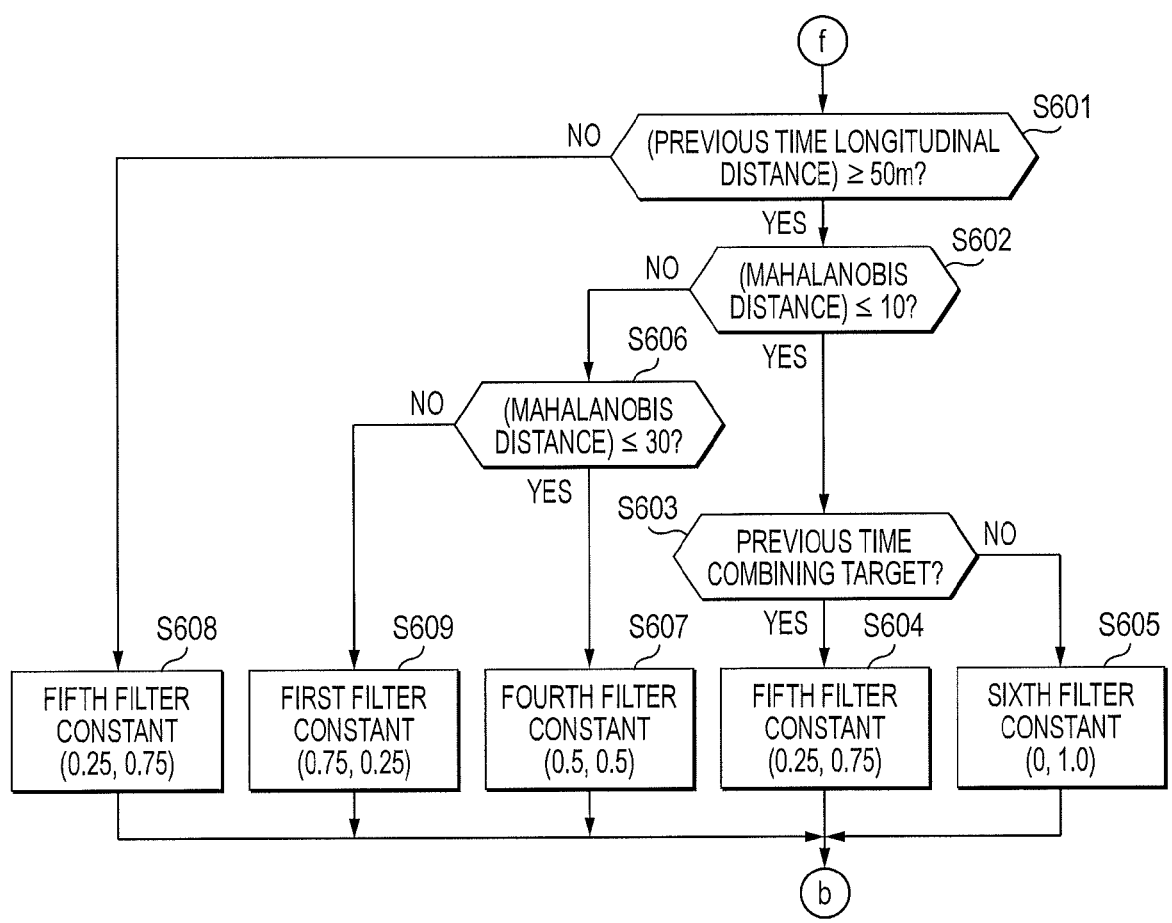
FIG. 24 is a processing flow chart of the second illustrative embodiment.

Then, returning back to FIG. 22, in the processing of step S513, the processing that is performed when the longitudinal distance of the first previous time target tp101 is smaller than 90 m (No in step S514) is described. When the longitudinal distance of the first previous time target tp101 is smaller than 90 m (No in step S514), the signal processing unit 18 determines whether the longitudinal distance of the first previous time target tp101 is 50 m or longer (step S601), as shown in FIG. 24. When the longitudinal distance of the first previous time target is 50 m or longer (Yes in step S601), the signal processing unit executes processing of step S602.

On the other hand, when the longitudinal distance of the first previous time target tp101 is below 50 m (No in step S601), the signal processing unit 18 changes the filter constant from the first filter constant to a fifth filter constant (step S608). That is, the filter constant (for example, the filter constant 0.25 of the predicted transverse distance and the filter constant 0.75 of this time transverse distance), which further increases the reflection amount of this time transverse distance in comparison to the fourth filter constant, is set. By filtering the past correspondence paired data tp101a with the fifth filter constant, the signal processing unit 18 can securely derive the object moving target when the object moving target corresponding to the preceding vehicle CRa exists in the traffic lane ro1 in which the vehicle CR is traveling.

When the longitudinal distance of the first previous time target tp101 is 50 m or longer and below 90 m, the derivation precision of the own traffic lane probability value is improved, in comparison to a case where the longitudinal distance is 90 m or longer. Therefore, when the other conditions of changing the filter constant are satisfied, the signal processing unit 18 increases the reflection amount of the filter constant of this time transverse distance in comparison to the fourth filter constant.

Returning back to the processing of step S602, when a Mahalanobis distance is 10 or smaller when the past correspondence paired data tp101a is paired (Yes in step S602) and the first previous time target tp101 is a combining target that is to be combined in the combining processing (Yes in step S603), the signal processing unit 18 changes the filter constant from the first filter constant to the fifth filter constant (step S604). That is, the filter constant (for example, the filter constant 0.25 of the predicted transverse distance and the filter constant 0.75 of this time transverse distance), which further increases the reflection amount of this time transverse distance in comparison to the fourth filter constant, is set. Then, the signal processing unit 18 filters the past correspondence paired data tp101a with the fifth filter constant (step S517).

On the other hand, when it is determined in the processing of step S603 that the first previous time target tp101 is a not-combined target that is not a combining object (No in step S603), the signal processing unit 18 changes the filter constant from the first filter constant to a sixth filter constant (step S605). That is, the filter constant (for example, the filter constant 0 (zero) of the predicted transverse distance and the filter constant 1.0 of this time transverse distance), which further increases the reflection amount of this time transverse distance in comparison to the fifth filter constant, is set. Then, the signal processing unit 18 filters the past correspondence paired data tp101a with the sixth filter constant (step S517).

Here, the reason to make the filter constant different depending on whether the first previous time target tp101 is the combining target or not-combined target is as follows: for example, when the first previous time target tp101 is a combining object, the first previous time target tp101 is a target corresponding to one of the reflection points at one object and another target corresponding to the one object exists. When deriving the transverse distance of the one object, an average value of the previous time-decided transverse distance of the first previous time target tp101 and the previous time-decided transverse distances of the other targets becomes the previous time-decided transverse distance of one target. As a result, a deviation from the transverse distance corresponding to the central part of one object in the transverse direction may occur. In contrast, when there is one reflection point corresponding to one object (the reflection point from one object is only the first previous time target tp101), it is thought that a deviation from the transverse distance corresponding to the central part of one object in the transverse direction is small. For this reason, when the first previous time target is a not-combined target, the filter constant of this time transverse distance is set to be larger than the filter constant of this time transverse distance that is set when the first previous time target is a combining target.

Then, when it is determined in the processing of step S602 that a Mahalanobis distance is above 10 when the past correspondence paired data tp101a is paired (No in step S602), the signal processing unit 18 determines whether the Mahalanobis distance is 30 or smaller (step S606). When the Mahalanobis distance is 30 or smaller (Yes in step S606), the signal processing unit 18 changes the filter constant from the first filter constant to the fourth filter constant (step S607). That is, the filter constant (for example, the filter constant 0.5 of the predicted transverse distance and the filter constant 0.5 of this time transverse distance), which further increases the reflection amount of this time transverse distance in comparison to the first filter constant, is set. On the other hand, when the Mahalanobis distance is above 30 (No in step S606), the signal processing unit 18 changes the filter constant from the filter constant set in the previous time processing to the first filter constant (step S609) and executes the filtering for the past correspondence paired data tp101a that is to be filter-processed (step S517).

Here, the reason to set the filter constant depending on the Mahalanobis distance is as follows: the smaller the Mahalanobis distance, the pairing precision is improved, so that the reliability of the pairing of the past correspondence paired data tp101a of this time processing is improved. For this reason, the smaller the Mahalanobis distance, the reflection amount of the filter constant of this time transverse distance is increased.

Then, returning back to FIG. 22, the processing is described which is performed when any one condition of the processing of steps S510 to S512 is not satisfied (No in step S510, No in step S511 or No in step S512). When any one condition of the processing of steps S510 to S512 is not satisfied (No in step S510, No in step S511 or No in step S512), the signal processing unit 18 determines whether the preceding vehicle flag of the first previous time target (for example, the first previous time target tp102 shown in FIG. 29, which will be described later) is ON (step S701), as shown in FIG. 25. When the preceding vehicle flag of the first previous time target tp102 is ON (Yes in step S701), the signal processing unit 18 executes processing of step S702. In the meantime, in the processing of step S701, the first previous time target tp102 having the preceding vehicle flag of an ON state is an object moving target and the object moving target satisfies the other conditions of changing the filter constant, so that the filter constant is changed. Also, when the first previous time target tp102 is the object moving target, the past correspondence paired data (for example, the past correspondence paired data tp102a shown in FIG. 29) having the temporal continuity with the first previous time target tp102 becomes also the object moving target.

Then, the signal processing unit 18 determines whether the representative flag of the first previous time target tp102 is ON (step S702). When the representative flag of the first previous time target tp102 is ON (Yes in step S702), the signal processing unit 18 determines whether an absolute value of the predicted relative transverse distance is larger than an absolute value of the previous time-decided relative transverse distance (step S703). That is, when the transverse distance of this time processing of the object moving target is longer than the transverse distance of the previous time processing, the signal processing unit 18 determines that the condition is satisfied. When an absolute value of the predicted relative transverse distance is larger than an absolute value of the previous time-decided relative transverse distance (Yes in step S703), the signal processing unit 18 determines whether the first previous time target tp102 is a combining target in the combining processing (step S704).

When the first previous time target tp102 is a combining target (Yes in step S704), the signal processing unit 18 changes the filter constant from the filter constant set in the previous time processing to the first filter constant (step S706) and performs the filtering for the past correspondence paired data tp102a that is to be filter-processed (step S517).

Also, when the first previous time target tp102 is the not-combined target (No in step S704), the signal processing unit 18 changes the filter constant from the first filter constant to the fourth filter constant (step S705). That is, the filter constant (for example, the filter constant 0.5 of the predicted transverse distance and the filter constant 0.5 of this time transverse distance), which further increases the reflection amount of this time transverse distance in comparison to the first filter constant, is set. Thereby, even when the object moving target corresponding to the preceding vehicle CRa exists in a traffic lane (for example, the right adjacent traffic lane ro2) different from the own traffic lane ro1 in which the vehicle CR is traveling, it is possible to securely derive the object moving target.

On the other hand, when any one condition in the processing of steps S701 to S703 is not satisfied (No in step S701, No in step S702 or No in step S703), the signal processing unit 18 changes the filter constant from the filter constant set in the previous time processing to the first filter constant (step S706) and executes the filtering for the past correspondence paired data tp102a that is to be filter-processed (step S517).

Figure 29:
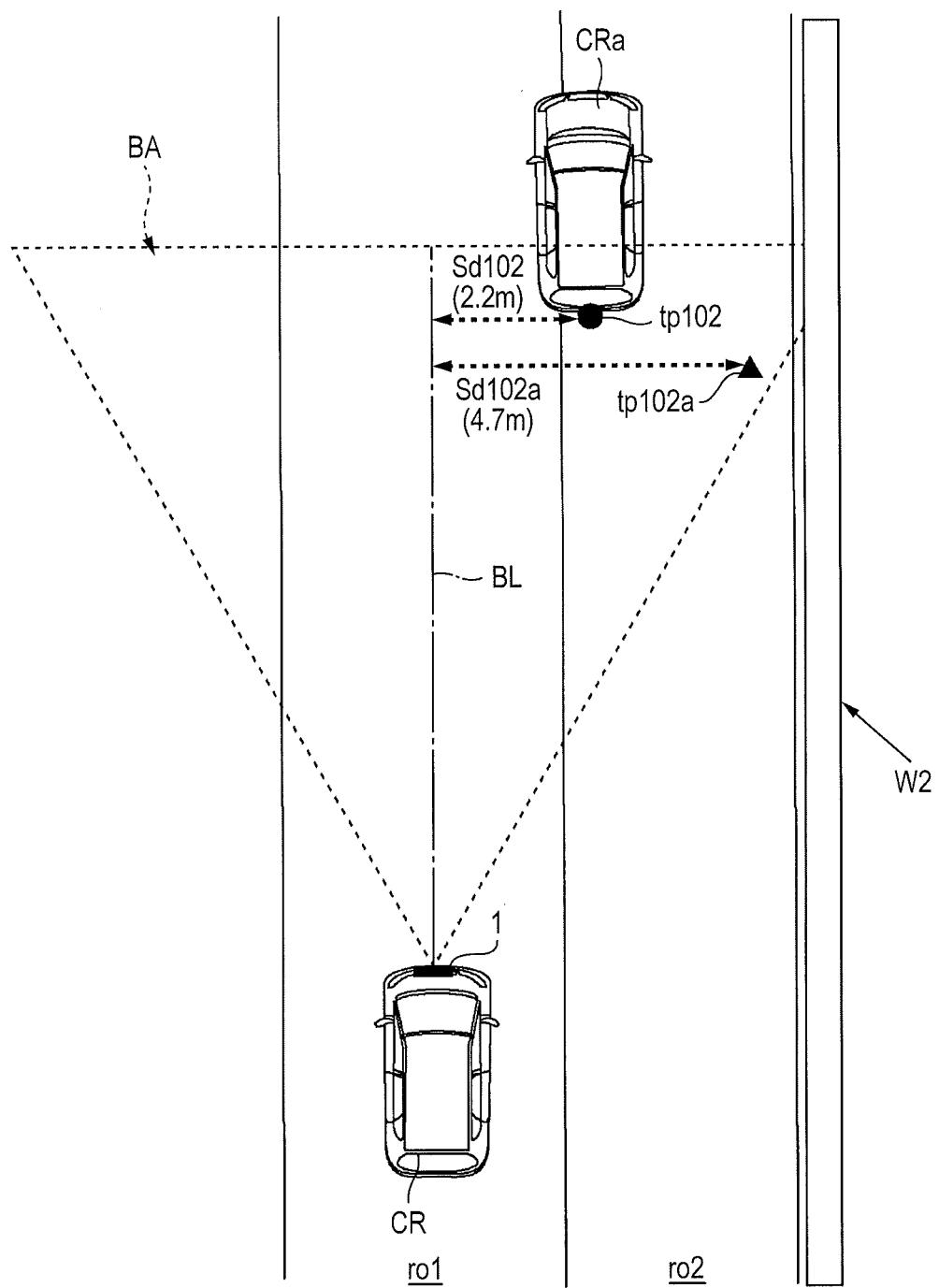
FIG. 29 is a view showing past correspondence paired data and a first previous time target.

Here, when the filter constant is changed (for example, the filter constant is changed from the first filter constant to the fourth filter constant), a specific position relation of the object moving target and the like are described with reference to FIG. 29. FIG. 29 shows the past correspondence paired data tp102a and the first previous time target tp102. FIG. 29 shows a part of the target that is derived in the area of the transmission wave of the beam pattern BA output from the transmission antenna 13 of the radar apparatus 1 mounted on the vehicle CR. In the meantime, the right wall W2 exists at the right of the right adjacent traffic lane ro2.

The previous time-decided transverse distance Sd102 of the first previous time target tp102 and this time transverse distance Sd102a of the past correspondence paired data tp102a are compared. A condition that this time transverse distance Sd102a is longer than the previous time-decided transverse distance Sd102 is set as one of the conditions of changing the filter constant, and the other conditions of changing the filter constant are satisfied, so that the signal processing unit 18 changes the filter constant from the first filter constant to the fourth filter constant. Specifically, the first previous time target tp102 of the preceding vehicle CRa is shown at the front of the vehicle CR in the own traffic lane ro1 in which the vehicle CR is traveling, and the transverse distance thereof is the previous time-decided transverse distance Sd102 (for example, 2.2 m) from the reference axis BL to the first previous time target tp102 in the right vehicle width direction. Also, the past correspondence paired data tp102a that has the temporal continuity with the first previous time target tp102 and is to be filter-processed is shown at the right rear of the first previous time target tp102.

That is, this time transverse distance Sd102a (for example, 4.7 m) of the past correspondence paired data tp102a is set to be larger than the previous time-decided transverse distance Sd102 (for example, 2.2 m) of the first previous time target tp102. In other words, this time transverse distance of the object moving target is set to be longer than the transverse distance of the previous time processing (which corresponds to Yes in step S703). When the first previous time target is not a combining object in the combining processing (which corresponds to Yes in step S704) and the other conditions of changing the filter constant are satisfied, the signal processing unit 18 changes the filter constant from the first filter constant to the fourth filter constant.

Figure 21:
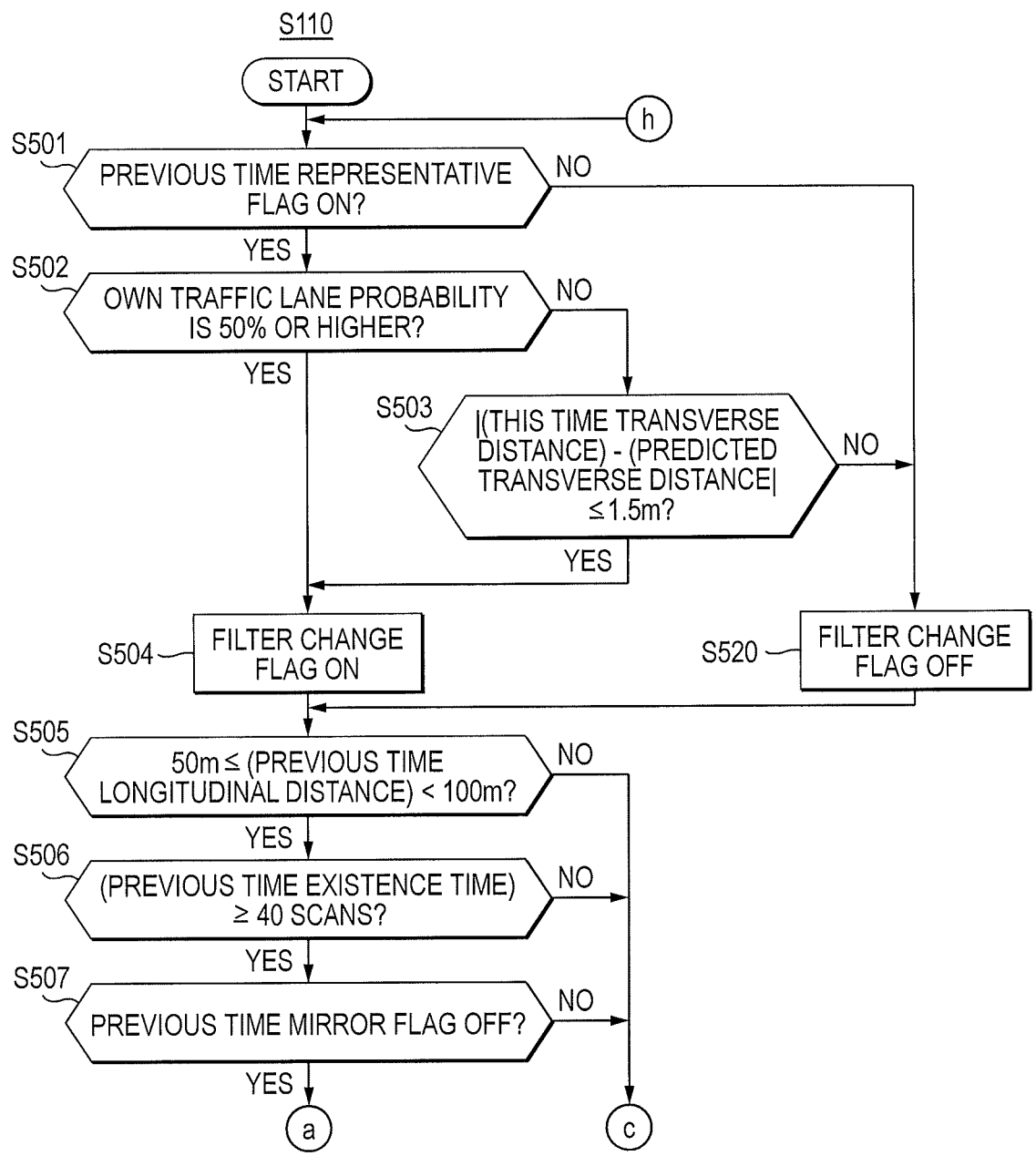
FIG. 21 is a processing flow chart of a second illustrative embodiment.
Figure 26:
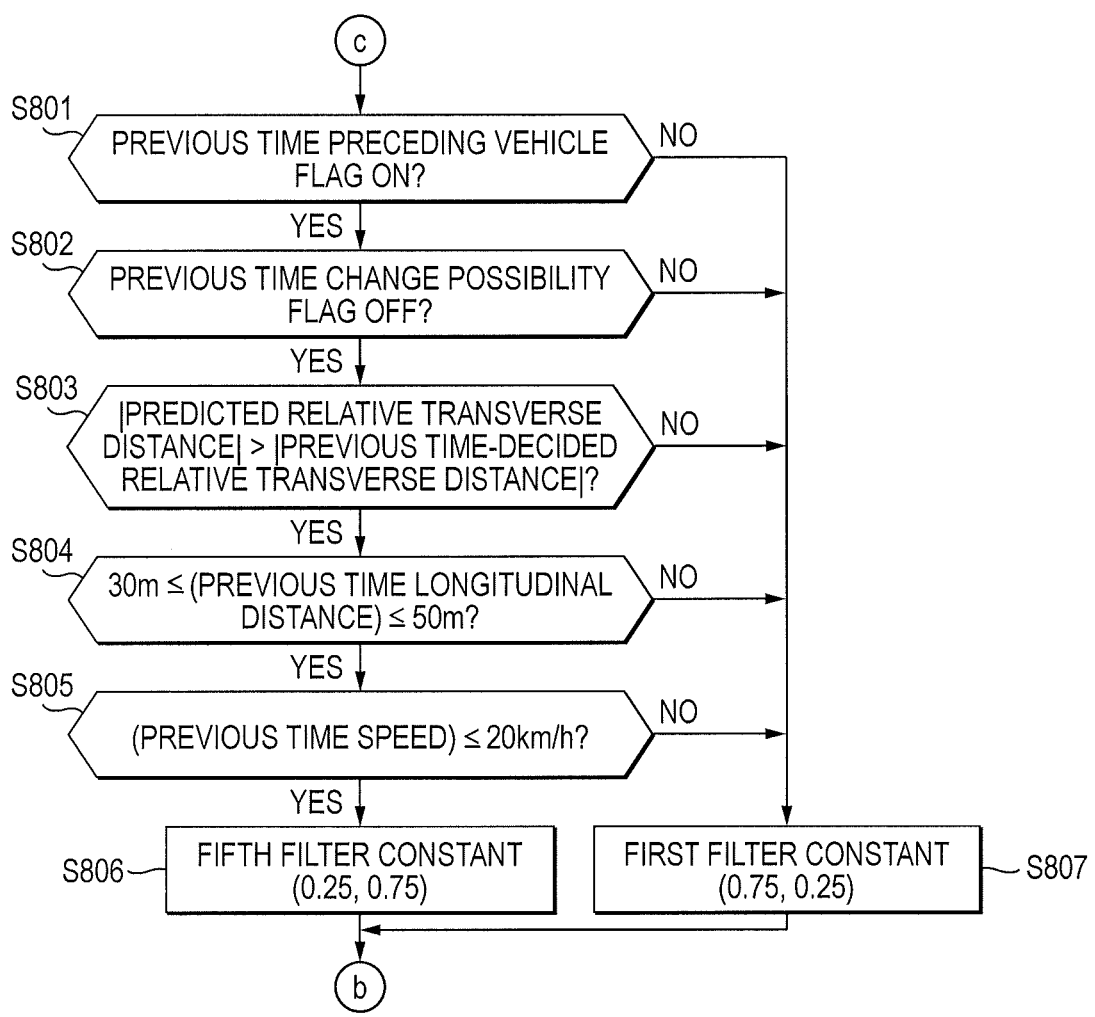
FIG. 26 is a processing flow chart of the second illustrative embodiment.

Then, when the condition is not satisfied in the processing of steps S505 to S509 shown in FIGS. 21 and 22 (No in step S505, No in step S506, No in step S507, No in step S508 or No in step S509), the signal processing unit 18 determines whether the preceding vehicle flag of the first previous time target is ON (step S801), as shown in FIG. 26. When the preceding vehicle flag of the first previous time target is ON (Yes step S801), the signal processing unit 18 determines whether the object moving target flag of the first previous time target is OFF (step S802). In the meantime, the first previous time target having the preceding vehicle flag of an ON state in the processing of step S801 becomes an object moving target and the object moving target satisfies the other conditions of changing the filter constant, so that the filter constant is changed.

Then, when the filter change flag of the first previous time target is OFF (Yes in step S802), the signal processing unit 18 determines whether an absolute value of the predicted relative transverse distance is larger than an absolute value of the previous time-decided relative transverse distance (step S803). That is, the signal processing unit 18 determines that the condition is satisfied when the transverse distance of this time processing of the object moving target is longer than the transverse distance of the previous time processing.

When an absolute value of the predicted relative transverse distance is larger than an absolute value of the previous time-decided relative transverse distance (Yes in step S803), the signal processing unit 18 determines whether the longitudinal distance of the first previous time target is within a range of 30 m to 50 m (step S804). When the longitudinal distance of the first previous time target is within a range of 30 m to 50 m (Yes in step S804), the signal processing unit 18 determines whether the speed of the first previous time target is 20 km/h or lower (step S805).

Then, when the speed of the first previous time target is 20 km/h or lower (Yes in step S805), the signal processing unit 18 changes the filter constant from the first filter constant to the fifth filter constant (step S806). That is, the filter constant (for example, the filter constant 0.25 of the predicted transverse distance and the filter constant 0.75 of this time transverse distance), which further increases the reflection amount of this time transverse distance in comparison to the fourth filter constant, is set. The signal processing unit 18 filters the past correspondence paired data by the fifth filter constant (step S517).

The reason to perform the processing as described above is as follows: for example, in a case where the preceding vehicle CRa, which is traveling at the front of the vehicle CR, slows down to thus change the traffic lane such as right turn and left turn, if the filter constant of the predicted transverse distance such as the first filter constant is set to be larger than the filter constant of this time transverse distance, although the preceding vehicle CRa turns left and thus deviates from the traffic lane (for example, the own traffic lane ro1) in which the vehicle CR is traveling, since the value of the filter constant of the predicted transverse distance corresponding to the previous time-decided transverse distance of the previous time processing is large, the vehicle control may be performed while considering that the object moving target of the preceding vehicle CRa still exists in the own traffic lane ro1. For this reason, when the speed of the first previous time target of the preceding vehicle CRa is below the predetermined speed (for example, 20 km/h), the signal processing unit changes the filter constant to the fifth filter constant that more increases the reflection amount of this time transverse distance in comparison to the first filter constant. Thereby, even when the preceding vehicle CRa corresponding to the object moving target slows down and then moves to another traffic lane from the own traffic lane ro1 in which the vehicle CR is traveling, it is possible to securely derive the object moving target.

On the other hand, when the condition is not satisfied in the processing of steps S801 to S805 (No in step S801, No in step S802, No in step S803, No in step S804 or No in step S805), the signal processing unit changes the filter constant from the filter constant set in the previous time processing to the first filter constant (step S807) and executes the filtering for the past correspondence paired data that is to be filter-processed (step S517).

<Modified Embodiments>

Although the illustrative embodiments of the invention have been described, the invention is not limited to the illustrative embodiments and can be variously modified. In the below, modified embodiments are described. In the meantime, all forms including the forms described in the illustrative embodiments and forms to be described in the below can be appropriately combined.

In the above illustrative embodiments, the object moving target is the preceding vehicle CRa. In addition to this, while setting a moving target that moves in the same direction as the traveling direction of the vehicle CR and exists at the rear of the vehicle CR as the object moving target, the processing of changing the filter constant may be performed.

Also, in the above illustrative embodiments, in the processing in which one of the value (for example, the transverse distance) of this time processing and the value (for example, the transverse distance) of the previous time processing is used, the value of this time processing may be replaced with the value of the previous time processing and the value of the previous time processing may be replaced with the value of this time processing. Specifically, the curve radius of the previous time processing of the respective processing may be replaced with the curve radius of this time processing and the Mahalanobis distance of the previous time processing may be used in the processing using the Mahalanobis distance of this time processing.

Also, in the above illustrative embodiments, the angle direction is estimated using the ESPRIT. In addition to this, any one algorithm of a DBF (Digital BeamForming), a PRISM (Propagator method based on an Improved Spatial-smoothing Matrix) and MUSIC (Multiple Signal Classification) may be used.

Also, in the above illustrative embodiments, the radar apparatus 1 may be used for other utilities (for example, a utility for monitoring an airplane while in-flight or a ship under way) in addition to the vehicle mounting.

Also, in the first illustrative embodiment, the processing of changing the filter constant that is performed when the specific target (the stationary target) exists (refer to 2.2. section) and the processing of changing the filter constant that is performed when the specific target (the adjacent moving target) exists (refer to 2.3. section) have been described as a series of processing. However, the signal processing unit 18 may perform the respective processing of changing the filter constant as separate processing.

What is claimed is:

1. A radar apparatus configured to emit a transmission wave relating to a transmission signal to be frequency-modulated, to receive a reflected wave coming from a target at which the transmission wave is reflected as a reception signal, and to derive target information including at least a transverse distance of the target from peak signals based on the reception signal, the radar apparatus comprising:

a derivation unit configured to derive this time-decided transverse distance which is a transverse distance of the target of this time processing, by filtering, with a predetermined filter constant, this time transverse distance which is a transverse distance of paired data of this time processing, obtained by pairing the peak signals, and a predicted transverse distance which is obtained by predicting a transverse distance of the target of this time processing from a previous time-decided transverse distance which is a transverse distance of the target of previous time processing; and a change unit configured to change, when the transverse distance of an object moving target moving in a traveling direction of a vehicle mounted with the radar apparatus and the transverse distance of a specific target which is a target except for the object moving target satisfy a predetermined relation, the filter constant for filtering this time transverse distance and the predicted transverse distance of the object moving target so that a reflection amount of this time transverse distance is reduced in comparison to before the change.

2. The radar apparatus according to claim 1, wherein when the specific target is a stationary target and a difference value between the transverse distance of the object moving target and the transverse distance of the stationary target is below a first value, the change unit changes the filter constant.

3. The radar apparatus according to claim 2, wherein when the difference value between the transverse distance of the object moving target and the transverse distance of the stationary target is below a second value which is smaller than the first value, the change unit changes the filter constant of this time transverse distance to zero.

4. The radar apparatus according to claim 2, wherein when the difference value between the transverse distance of the object moving target and the transverse distance of the stationary target in this time processing is smaller than the difference value between the transverse distance of the object moving target and the previous time transverse distance of the stationary target in the previous time processing, the change unit changes the filter constant.

5. The radar apparatus according to claim 1, wherein when the specific target is an adjacent moving target which is a moving target more distant from the vehicle than the object moving target with respect to a transverse distance relative to the vehicle and the object moving target exists in the vicinity of the adjacent moving target, the change unit changes the filter constant.

6. The radar apparatus according to claim 5, wherein when the transverse distance of the adjacent moving target is within a first distance range and the transverse distance of the object moving target is within a second distance range that is not included in the first distance range, the change unit changes the filter constant.

7. A signal processing method of emitting a transmission wave relating to a transmission signal to be frequency-modulated, receiving a reflected wave coming from a target at which the transmission wave is reflected as a reception signal, and deriving target information including at least a transverse distance of the target from peak signals based on the reception signal, the signal processing method comprising:

deriving this time-decided transverse distance which is a transverse distance of the target of this time processing, by filtering, with a predetermined filter constant, this time transverse distance which is a transverse distance of paired data of this time processing, obtained by pairing the peak signals, and a predicted transverse distance which is obtained by predicting a transverse distance of the target of this time processing from a previous time-decided transverse distance which is a transverse distance of the target of previous time processing; and when the transverse distance of an object moving target moving in a traveling direction of a vehicle mounted with the radar apparatus and the transverse distance of a specific target which is a target except for the object moving target satisfy a predetermined relation, changing the filter constant for filtering this time transverse distance and the predicted transverse distance of the object moving target so that a reflection amount of this time transverse distance is reduced in comparison to before the change.

8. A radar apparatus configured to emit a transmission wave relating to a transmission signal to be frequency-modulated, to receive a reflected wave coming from a target at which the transmission wave is reflected as a reception signal, and to derive target information including at least a transverse distance of the target from peak signals based on the reception signal, the radar apparatus comprising:

a derivation unit configured to derive this time-decided transverse distance which is a transverse distance of the target of this time processing, by filtering, with a predetermined filter constant, this time transverse distance which is a transverse distance of paired data of this time processing, obtained by pairing the peak signals, and a predicted transverse distance which is obtained by predicting a transverse distance of the target of this time processing from a previous time-decided transverse distance which is a transverse distance of the target of previous time processing; and a change unit configured to change, when the transverse distance of this time processing of an object moving target moving in a traveling direction of a vehicle mounted with the radar apparatus is shorter than the transverse distance of the previous time processing, the filter constant for filtering this time transverse distance and the predicted transverse distance of the object moving target so that a reflection amount of this time transverse distance is increased in comparison to before the change.

9. The radar apparatus according to claim 8, wherein when an in-traffic lane existence value indicating a degree that the object moving target exists in a traveling traffic lane of the vehicle is above a predetermined value, the change unit changes the filter constant.

10. The radar apparatus according to claim 8, wherein when the in-traffic lane existence value is below the predetermined value and a difference value between this time transverse distance and the predicted transverse distance of the object moving target is smaller than a predetermined value, the change unit changes the filter constant.

11. The radar apparatus according to claim 8, wherein when a speed of the object moving target is below a predetermined speed, the change unit changes the filter constant.

12. A signal processing method of emitting a transmission wave relating to a transmission signal to be frequency-modulated, receiving a reflected wave coming from a target at which the transmission wave is reflected as a reception signal, and deriving target information including at least a transverse distance of the target from peak signals based on the reception signal, the signal processing method comprising:

deriving this time-decided transverse distance which is a transverse distance of the target of this time processing, by filtering, with a predetermined filter constant, this time transverse distance which is a transverse distance of paired data of this time processing, obtained by pairing the peak signals, and a predicted transverse distance which is obtained by predicting a transverse distance of the target of this time processing from a previous time-decided transverse distance which is a transverse distance of the target of previous time processing, and when the transverse distance of this time processing of an object moving target moving in a traveling direction of a vehicle mounted with the radar apparatus is shorter than the transverse distance of the previous time processing, changing the filter constant for filtering this time transverse distance and the predicted transverse distance of the object moving target so that a reflection amount of this time transverse distance is increased in comparison to before the change.

* * * * *